United States Patent
Bacher et al.

(10) Patent No.: US 9,057,020 B2
(45) Date of Patent: Jun. 16, 2015

(54) BLACK DICHROIC DYE

(75) Inventors: Jean-Pierre Bacher, Buschwiller (FR); Gerardus De Keyzer, Riehen (CH); Urs Lehmann, Basel (CH)

(73) Assignee: BASF SE, Ludwigshafen (DE)

( * ) Notice: Subject to any disclaimer, the term of this patent is extended or adjusted under 35 U.S.C. 154(b) by 52 days.

(21) Appl. No.: 13/704,020

(22) PCT Filed: Jun. 9, 2011

(86) PCT No.: PCT/EP2011/059545
§ 371 (c)(1),
(2), (4) Date: Dec. 13, 2012

(87) PCT Pub. No.: WO2011/157614
PCT Pub. Date: Dec. 22, 2011

(65) Prior Publication Data
US 2013/0092874 A1  Apr. 18, 2013

Related U.S. Application Data

(60) Provisional application No. 61/354,272, filed on Jun. 14, 2010.

(30) Foreign Application Priority Data

Jun. 14, 2010 (EP) .................................. 10165830
Jun. 21, 2010 (EP) .................................. 10166666

(51) Int. Cl.
| | | |
|---|---|---|
| C09K 19/60 | (2006.01) | |
| G02B 5/30 | (2006.01) | |
| C09B 31/043 | (2006.01) | |
| C09B 31/053 | (2006.01) | |
| C09B 31/14 | (2006.01) | |
| C09B 31/18 | (2006.01) | |
| C09B 31/28 | (2006.01) | |
| C09B 67/22 | (2006.01) | |
| G02B 5/22 | (2006.01) | |

(52) U.S. Cl.
CPC .............. *C09K 19/601* (2013.01); *C09B 31/043* (2013.01); *C09B 31/18* (2013.01); *C09B 31/28* (2013.01); *C09B 67/0055* (2013.01); *G02B 5/223* (2013.01); *G02B 5/3033* (2013.01)

(58) Field of Classification Search
CPC .... C09B 31/043; C09B 31/053; C09B 31/14; C09B 31/18; C09B 31/28; C09B 67/0055; C09K 19/601; G02B 5/3033
USPC ................ 252/299.01, 299.1, 299.5; 428/1.1, 428/1.31; 534/755, 756
See application file for complete search history.

(56) References Cited

U.S. PATENT DOCUMENTS

| | | | |
|---|---|---|---|
| 4,565,424 A | 1/1986 | Huffman et al. | |
| 4,668,050 A | 5/1987 | Aoki et al. | |
| 6,039,893 A | 3/2000 | Arakawa et al. | |
| 2008/0094549 A1 | 4/2008 | Sadamitsu | |
| 2010/0055353 A1 | 3/2010 | Cho et al. | |
| 2010/0134726 A1 | 6/2010 | Morishima et al. | |

FOREIGN PATENT DOCUMENTS

| | | |
|---|---|---|
| CN | 101065451 A | 10/2007 |
| CN | 101578348 A | 11/2009 |
| JP | 2 090 274 A | 7/1982 |
| JP | 57-123258 | 7/1982 |
| JP | 59 152957 | 8/1984 |
| JP | 61 133268 | 6/1986 |
| JP | 61-166859 | 7/1986 |
| JP | 62-000555 | 1/1987 |
| JP | 63-301850 | 12/1988 |
| JP | 05-132628 | 5/1993 |
| JP | 05-230385 | 9/1993 |
| JP | 07-224282 | 8/1995 |
| JP | 08-278409 | 10/1996 |

(Continued)

OTHER PUBLICATIONS

Caplus 2011: 261775.*
International Search Report Issued Sep. 5, 2011 in PCT/EP11/59545 Filed Jun. 9, 2011.
U.S. Appl. No. 14/123,530, filed Dec. 3, 2013, Koenemann, et al.
U.S. Appl. No. 14/115,934, filed Nov. 6, 2013, Wagenblast, et al.
U.S. Appl. No. 14/115,878, filed Nov. 6, 2013, Lehmann, et al.
European Search Report issued Dec. 9, 2010, in Patent Application No. EP 10 16 5830.
Taiwan Search Report issued Dec. 10, 2014, in Taiwanese Patent Application No. 100120580 filed Jun. 13, 2011.

(Continued)

*Primary Examiner* — Shean C Wu
(74) *Attorney, Agent, or Firm* — Oblon, McClelland, Maier & Neustadt, L.L.P.

(57) ABSTRACT

Described is a black dichroic dye composition comprising 2 or more dyes, wherein at least one dye, generally a red dye and optionally a yellow dye, conforms to the formula A and at least one dye, usually a blue dye, conforms to the formula B $Ar_1$—N=N—$[Ar_2$—N=N—$]_q Ar_3$—N=N—$Ar_4$ (B) with symbols as defined in present claims. The dye composition is well suited for combination with liquid crystal material for use, inter alia, as polarizing film and/or in liquid crystal displays, showing, inter alia, high dichroic ratio and excellent compatibility with the LC material.

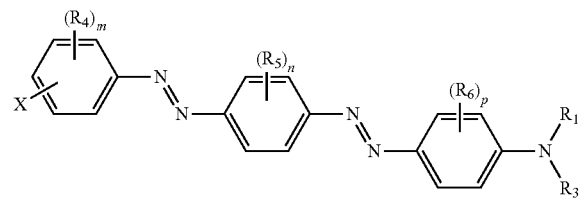

(A)

18 Claims, 1 Drawing Sheet

(56) References Cited

FOREIGN PATENT DOCUMENTS

| | | |
|---|---|---|
| JP | 10-088142 | 4/1998 |
| JP | 10-231437 | 9/1998 |
| JP | 11-172252 | 6/1999 |
| WO | 2010/038818 A1 | 4/2010 |
| WO | 2011 024891 | 3/2011 |
| WO | 2011 024892 | 3/2011 |

OTHER PUBLICATIONS

Notification of Reasons for Refusal issued Apr. 7, 2015, in Japanese Patent Application No. 2013-514643 filed Jun. 9, 2011 (with English translation).

* cited by examiner

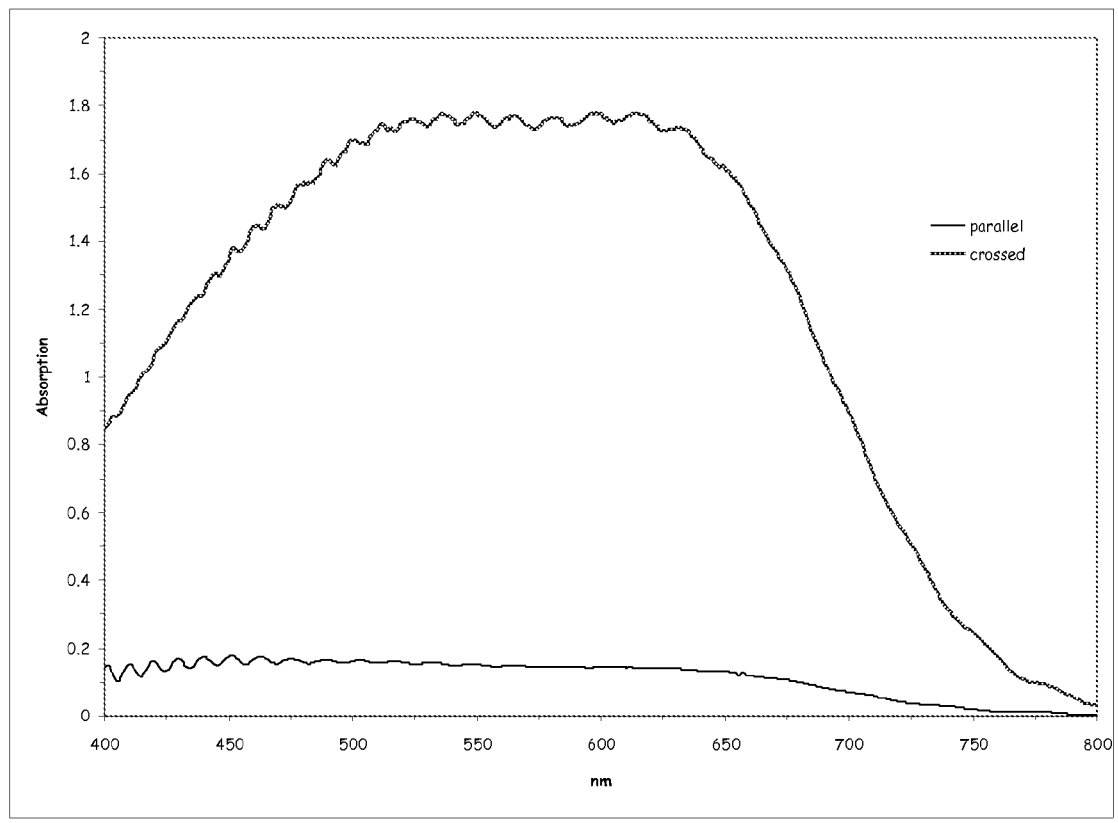

BLACK DICHROIC DYE

The present invention relates to a black dichroic dye composition and its use in display technology, and to certain novel blue dyes for this purpose.

With the rapid development of displays based on liquid crystal (LC) technology over the last years dichroic dyes gain more and more interest for many different applications in this field like e.g.

Guest-host LC materials such as polymer dispersed, or polymer network dispersed LC materials (PDLC or PNLC) for
  Contrast enhancement films
  Reflective displays
etc.

Using polymerizable LC materials (for example, LC molecules containing one or two alkyl(oxy) acrylate groups on one or both ends, such as compounds of the formula Alkyl-O—[LC]—O—(CH$_2$)$_n$—O—CO—C(R)
    =CH$_2$, wherein [LC] stands for the mesogenic part of the molecule, Alkyl is an alkyl group e.g. of 1 to 12 carbon atoms, R is H or methyl, n ranges from 1 to 12); these applications often include anisotropic films for
  (In-cell) polarizers
  Color correction films
  Brightness enhancement films (BEF)
etc.

As it is well known in the art, addition of dyes to the LC in the liquid crystal display (LCD) leads to polarizer-free LCDs (so-called guest-host LCD system already noted above).

Suitable black mixtures of dichroic dyes (e.g. yellow, red, blue) are of special interest.

Today most polarizers for LCDs are based on uniaxially stretched polyvinylalcohol (PVA) films impregnated with iodine or dichroic colorants. Corresponding dichroic colorants must be compatible with PVA. Thus, they bear solubilizing substituents like e.g. sulfo groups. Such polarizer films usually cannot be used inside of a LC cell, whereas coatable materials based on a polymerizable liquid crystal are suited for this application. Corresponding dichroic dyes have to be compatible (high solubility) with the liquid crystal material, so dyes with e.g. sulfo groups cannot be applied for this type of polarizers.

Especially good solubility of the dichroic dyes in the LC medium, without negative influence on the order parameter of the LC, is a big challenge.

Known dichroic black dye mixtures for the applications mentioned above (see, for example, U.S. Pat. No. 4,565,424) are of limited color strength. In consequence, a relatively high concentration of these dye mixtures has to be applied for a black with good saturation. Such a high concentration can disturb the orientation of the liquid crystalline phase.

WO 2011/024891 A1 discloses a dichroic dye composition containing at least one dye of formula Ar$^1$—N=N—Ar$^2$-L$^1$-Ar$^3$-L$^2$-Ar$^4$, wherein L$^1$ and L$^2$ are each an azo, ester, imino or vinylene group, with the proviso that L$^1$ and L$^2$ are not both azo groups. Further, said composition may contain a thienyl-substituted dis- or trisazo dye. WO 2011/024892 A1 discloses a dichroic dye composition containing a thienyl-substituted dis- or trisazo dye.

Certain dyes have now been found, which provide a black with high color strength, high saturation, and good dichroic ratio and general properties.

In addition, some new blue dichroic dyes have been found with high dichroic ratio. These are very well suited as components for the present dichroic black mixtures.

The invention thus primarily pertains to a composition comprising 2 or more dyes, wherein at least one dye conforms to the formula A

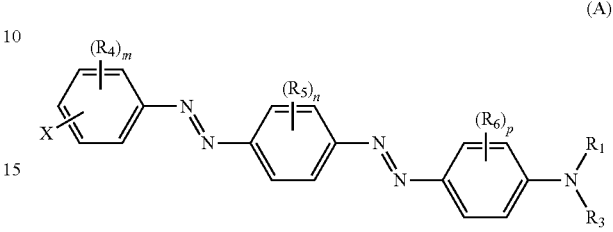

(A)

and at least one dye conforms to the formula B

Ar$_1$—N=N—[Ar$_2$—N=N—]$_q$Ar$_3$—N=N—Ar$_4$    (B)

wherein
each of n, m, p is a number from 0 to 2;
q is 0 or 1;
Ar$_1$ is a residue of one of the formulae

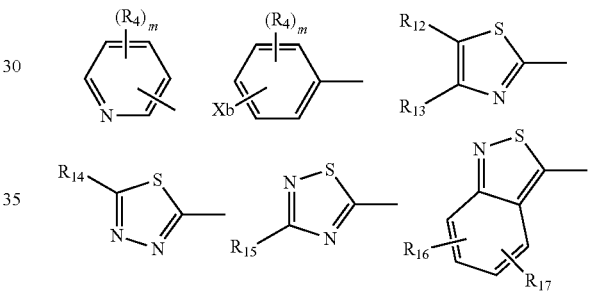

Ar$_2$ is 1,4-phenylene, 1,4-phenylene substituted by one or two residues R$_5$, or is 1,4-naphthylene;
A$_3$ is 1,4-phenylene, 1,4-phenylene substituted by one or two residues R$_5$, or is 1,4-naphthylene;
Ar$_4$ is naphthyl substituted by one or two residues C$_1$-C$_8$alkylamino or di(C$_1$-C$_8$alkyl)amino or di(C$_1$-C$_8$alkyl)amino whose alkyl groups are linked together to form one common bridging group C$_1$-C$_8$alkylene or C$_2$-C$_8$alkylene interrupted by O, S and/or NR'$_3$, or by two residues C$_1$-C$_8$alkylamino whose alkyl groups are linked together to form one common bridging group C$_1$-C$_8$alkylene or C$_2$-C$_8$alkylene interrupted by O, S and/or NR'$_3$; or Ar$_4$ is thiophenyl substituted by R$_{11}$ and optionally further substituted by C$_1$-C$_8$alkyl or phenyl or halogen or CN, Ar$_4$ especially conforming to the formula

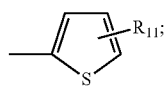

R$_1$ is C$_1$-C$_{12}$alkyl, C$_3$-C$_{12}$cycloalkyl, or C$_3$-C$_{12}$cycloalkyl interrupted by O or NR'$_3$, each of which alkyl or cycloalkyl is unsubstituted or substituted;
R$_3$ is H or is as defined for R$_1$;
or R$_1$ and R$_3$ together are C$_2$-C$_{12}$alkylene or C$_2$-C$_8$alkylene interrupted by O and/or NR'$_3$, each of which is unsubstituted or substituted, $R_1$ and $R_3$ thus forming, together with the nitrogen atom they are attached to, an aliphatic N-heterocyclic residue of 2 to 12 carbon atoms;

$R'_3$ is H or $C_1$-$C_8$alkyl;

each of the residues $R_4$, $R_5$ and $R_6$, if present, are independently selected from unsubstituted or substituted $C_1$-$C_4$alkyl, $C_1$-$C_4$alkoxy, halogen, or CN;

X is selected from H, Hal, or $COOR_2$;

Xb is Hal, $COOR_2$, CN, phenyl, $R_5$-substituted phenyl, $C_3$-$C_{12}$cycloalkyl, $C_1$-$C_{12}$alkyl-cyclohexyl, Hal is $CF_3$ or halogen, especially $CF_3$ or fluoro;

$R_2$ is unsubstituted or substituted $C_1$-$C_{12}$alkyl;

$R_8$ is $C_1$-$C_{12}$alkyl, $C_1$-$C_{12}$alkoxy, $C_1$-$C_{12}$alkyl-phenyl, $C_1$-$C_{12}$alkyl-cyclohexyl, $C_1$-$C_{12}$alkoxy-cyclohexyl, each of whose alkyl moieties are unsubstituted or substituted; or is $C_3$-$C_{12}$cycloalkyl, phenyl, CN, Hal;

$R_{11}$ is NR'R", with R' and R" independently selected from H or $C_1$-$C_4$alkyl or $C_3$-$C_{12}$cycloalkyl or phenyl or substituted phenyl; or R' and R" together forming one common bridging group $C_1$-$C_8$alkylene or $C_2$-$C_8$alkylene interrupted by O, S and/or $NR'_3$; $R_{11}$ especially being pyrrolidinyl or piperidinyl or di($C_1$-$C_4$alkyl)amino or morpholinyl;

$R_{12}$ and $R_{13}$ independently are H; Hal; nitro; formyl; SCN; CN; $COOR_2$; $COR_2$; $C_1$-$C_{12}$alkyl; $C_1$-$C_{12}$alkoxy; $C_1$-$C_{12}$alkylthio; $C_1$-$C_{12}$alkyl-$SO_2$; phenyl; phenoxy; phenyl-$SO_2$; phenyl or phenoxy or phenyl-$SO_2$ each of which is substituted by phenyl or $C_1$-$C_8$alkyl or cyclohexyl or $C_1$-$C_8$alkoxy or $C_1$-$C_8$alkylthio; $C_2$-$C_{12}$alkyl or $C_3$-$C_{12}$alkoxy or $C_3$-$C_{12}$alkylthio each of which is interrupted by O; $C_1$-$C_8$alkyl or $C_2$-$C_3$alkenyl or $C_1$-$C_8$alkoxy or $C_1$-$C_8$alkylthio each of which is substituted by CN or $COOR_2$ or phenyl or fluoro or $CF_3$; or $R_{12}$ and $R_{13}$ together are $C_3$-$C_4$alkylene;

$R_{14}$ is H; Hal; CN; SCN; $COOR_2$; $COR_2$; $C_1$-$C_{12}$alkyl; $C_3$-$C_{12}$cycloalkyl $C_1$-$C_{12}$alkoxy; $C_1$-$C_{12}$alkylthio; $C_1$-$C_{12}$alkylamino; di($C_1$-$C_{12}$alkyl)amino; pyrrolidinyl; piperidinyl; morpholinyl; phenyl; phenyl-$SO_2$; phenyl substituted by phenyl or $C_1$-$C_8$alkyl or cyclohexyl or $C_1$-$C_8$alkoxy or $C_1$-$C_8$alkylthio; $C_2$-$C_{12}$alkyl or $C_3$-$C_{12}$alkoxy or $C_3$-$C_{12}$alkylthio each of which is interrupted by O; $C_1$-$C_8$alkyl or $C_2$-$C_3$alkenyl or $C_1$-$C_8$alkoxy or $C_1$-$C_8$alkylthio each of which is substituted by CN or $COOR_2$ or phenyl or fluoro or $CF_3$;

$R_{15}$ is H; Hal; $OCF_3$; CN; $COOR_2$; $COR_2$; $C_1$-$C_{12}$alkyl; $C_1$-$C_{12}$alkoxy; $C_1$-$C_{12}$alkylthio; $C_1$-$C_{12}$alkylamino; di($C_1$-$C_{12}$alkyl)amino; $C_1$-$C_{12}$alkyl-CONH; $C_1$-$C_{12}$alkyl-$SO_2$; pyrrolidinyl; di($C_1$-$C_4$alkyl)amino; morpholinyl; phenyl; phenyl-$SO_2$; phenyl or phenyl-$SO_2$ substituted by phenyl or $C_1$-$C_8$alkyl or cyclohexyl or $C_1$-$C_8$alkoxy or $C_1$-$C_8$alkylthio or CN or $CF_3$ or $OCF_3$; $C_2$-$C_{12}$alkyl or $C_3$-$C_{12}$alkoxy or $C_3$-$C_{12}$alkylthio each of which is interrupted by O; $C_1$-$C_8$alkyl or $C_2$-$C_3$alkenyl or $C_1$-$C_8$alkoxy or $C_1$-$C_8$alkylthio or $C_1$-$C_8$alkyl-$SO_2$ each of which is substituted by CN or $COOR_2$ or or $COR_2$ or phenyl or $R_8$-substituted phenyl or fluoro or $CF_3$;

$R_{16}$ and $R_{17}$ independently are H, halogen, nitro, $C_1$-$C_{12}$alkyl, $C_1$-$C_{12}$alkoxy;

where any substituent of alkyl moieties mentioned is preferably selected from halogen, $CF_3$, CN, OH, $C_1$-$C_4$alkyl, $C_1$-$C_4$alkoxy, phenyl; $C_2$-$C_8$dialkylamino, or a N-bonded aliphatic or aromatic heterocyclic ring containing 2 to 5 carbon ring atoms and optionally one oxygen ring atom besides the bonding nitrogen atom.

Alkyl stands for any acyclic saturated monovalent hydrocarbyl group; alkenyl denotes such a group but containing at least one carbon-carbon double bond (such as in allyl). In case that an alkenyl group contains more than one double bond, these bonds usually are not cumulated, but may be arranged in an alternating order, such as in —[CH=CH—]$_n$ or —[CH=C(CH$_3$)—]$_n$, wherein n may be, for example, from the range 2-50. Where not defined otherwise, preferred alkyl contains 1-12 carbon atoms; preferred alkenyl contains 2-3 carbon atoms.

Where indicated as interrupted, any alkyl moiety of more than one, especially more than 2 carbon atoms, or such alkyl or alkylene moieties which are part of another moiety, may be interrupted by a heterofunction such as O, S, COO, $OCNR_{10}$, OCOO, $OCONR_{10}$, $NR_{10}CNR_{10}$, or $NR_{10}$ or $NR'_3$, where $R'_3$ is as defined above and $R_{10}$ is, for example, H, $C_1$-$C_{12}$alkyl, $C_3$-$C_{12}$cycloalkyl, phenyl. They can be interrupted by one or more of these spacer groups, one group in each case being inserted, in general, into one carbon-carbon bond of the alkyl or alkylene moiety or a carbon-carbon bond the moiety is bonding to. Hetero-hetero bonds, for example O—O, S—S, NH—NH, etc., usually do not occur; if the interrupted alkyl is additionally substituted, the substituents are generally not a to the heteroatom; interrupted alkoxy or alkylthio contain interrupting heteroatoms within the carbon chain. If two or more interrupting groups of the type —O—, —$NR_{10}$—, —S— occur in one radical, they often are identical. Examples for interrupted cycloalkyls are dioxanyl, morpholinyl, piperidinyl, piperazinyl.

Residues morpholinyl, piperidinyl, pyrrolidinyl are preferably N-bonded, i.e.

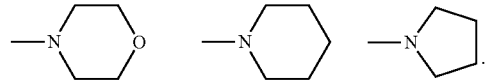

The term alkyl, wherever used, thus mainly embraces linear or branched, especially uninterrupted and, where appropriate, substituted $C_1$-$C_{22}$alkyl such as methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl. Alkoxy is alkyl-O—; alkylthio is alkyl-S—.

The term alkenyl, wherever used, thus mainly embraces uninterrupted and, where appropriate, substituted $C_2$-$C_{22}$alkyl such as vinyl, allyl, etc.

Cycloalkyl such as $C_3$-$C_{12}$cycloalkyl or said cycloalkyl substituted e.g. by one to three $C_1$-$C_4$alkyl groups includes cyclopropyl, cyclobutyl, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl, cyclooctyl, cyclononyl, cyclodecyl, cyclododecyl, 1-adamantyl, or 2-adamantyl. Cyclohexyl, 1-adamantyl and cyclopentyl are most preferred. $C_3$-$C_{12}$cycloalkyl includes cyclopropyl, cyclobutyl, cyclopentyl, cyclohexyl, cycloheptyl, cyclooctyl, cyclononyl, cyclodecyl, cycloundecyl, cyclododecyl; preferred among these residues are $C_3$-$C_6$cycloalkyl as well as cyclododecyl, especially cyclohexyl. Further ring structures occurring are heterocyclic aliphatic rings (heterocycloalkyl) usually containing 5 to 7 ring members, among them at least 1, especially 1-3, heteromoieties, usually selected from O, S, $NR'_3$, $NR_{10}$, where $R_{10}$ is as explained above for interrupting $NR_{10}$-groups; examples include $C_4$-$C_{18}$cycloalkyl, which is interrupted by S, O, or $NR_{10}$, such as piperidyl, tetrahydrofuranyl, piperazinyl and morpholinyl; examples for $C_2$-$C_4$heterocycloalkyl include oxiranyl, oxetanyl, piperazinyl, morpholinyl. Unsaturated variants may be derived from these structures by abstraction of a hydrogen atom on 2 adjacent ring members with formation of a double bond between them; an example for such a moiety is cyclohexenyl.

Alkoxy such as $C_1$-$C_{24}$alkoxy is a straight-chain or branched radical, e.g. methoxy, ethoxy, n-propoxy, isopropoxy, n-butoxy, sec-butoxy, tert-butoxy, amyloxy, isoamyloxy or tert-amyloxy, heptyloxy, octyloxy, isooctyloxy, nonyloxy, decyloxy, undecyloxy, dodecyloxy, tetradecyloxy, pentadecyloxy, hexadecyloxy, heptadecyloxy and octadecyloxy.

$C_1$-$C_{12}$alkylthio radicals are straight-chain or branched alkylthio radicals, such as e.g. methylthio, ethylthio, propylthio, isopropylthio, n-butylthio, isobutylthio, pentylthio, isopentylthio, hexylthio, heptylthio, octylthio, decylthio.

Naphthyl is in most cases 1-naphthyl; 1,4-naphthylene is the residue

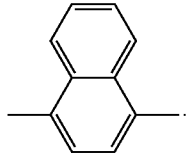

Halogen denotes I, Br, Cl, F, preferably F, CI, Br, especially F.

$Ar_4$ as naphthyl substituted by one or two residues $C_1$-$C_8$alkylamino or di($C_1$-$C_8$alkyl)amino or di($C_1$-$C_8$alkyl)amino whose alkyl groups are linked together to form one common bridging group $C_1$-$C_8$alkylene or $C_2$-$C_8$alkylene interrupted by O, S and/or $NR'_3$, or by two residues $C_1$-$C_8$alkylamino whose alkyl groups are linked together to form one common bridging group $C_1$-$C_8$alkylene or $C_2$-$C_8$alkylene interrupted by O, S and/or $NR'_3$, is preferably

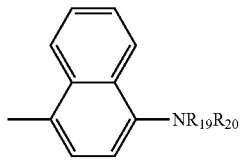

with $R_{19}$ being $C_1$-$C_8$alkyl and $R_{20}$ being H or $C_1$-$C_8$alkyl, or $R_{19}$ and $R_{20}$ forming a common bridging group $C_1$-$C_8$alkylene or $C_2$-$C_8$alkylene interrupted by O, S and/or $NR'_3$, especially O, e.g pyrrolidinyl, piperidinyl or morpholinyl; or

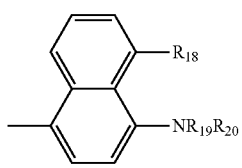

with $R_{18}$ and $R_{19}$ being $C_1$-$C_8$alkylamino whose alkyl groups form a common bridging group $C_1$-$C_3$alkylene and $R_{20}$ being H.

$NR_1R_3$, with $R_1$ and $R_3$ together forming, with the nitrogen atom they are attached to, an aliphatic heterocyclic residue of 2 to 12 carbon atoms, or a N-bonded aliphatic heterocyclic ring containing 2 to 12 carbon ring atoms and optionally interrupted by O, S and/or $NR'_3$, each of which is unsubstituted or substituted, is in preferred cases morpholinyl, piperidinyl, pyrrolidinyl or, where appropriate, a $C_1$-$C_4$alkyl substituted variant thereof.

In a preferred aspect, the invention relates to a composition, wherein the at least one dye of formula A comprises a red dye and optionally a yellow dye, and the dye of formula B comprises a blue dye, which composition is a black dichroic dye composition.

Preferably, the invention relates to a composition comprising 3 or more dyes, wherein at least 2 dyes conform to the formula A

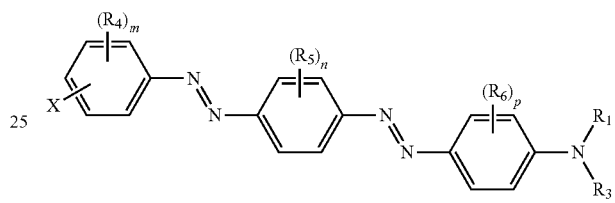

and at least one dye conforms to the formula B

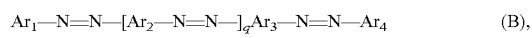

wherein X, $R_1$, $R_3$, $R_4$, $R_5$, $R_6$, n, m and p are defined as above.

In general, the black dichroic dye of the invention essentially consists of the dye of formulae A (usually one yellow and one red dye or only one red dye) and B (blue), i.e. no other dye is contained in amounts effective to significantly alter the color and/or the dichroic effect in the LC material. Accordingly, the dichroic dye of the invention is present in at least 90%, preferably 95% by weight, based on the total weight of the dicroic dyes.

In the dye compositions of the invention, the 2 dyes of formula A usually are a yellow dye and a red dye, and the dye of formula B is a blue dye, their mixture forming the black dichroic dye composition.

Compounds of the formula A often conform to the formula A1

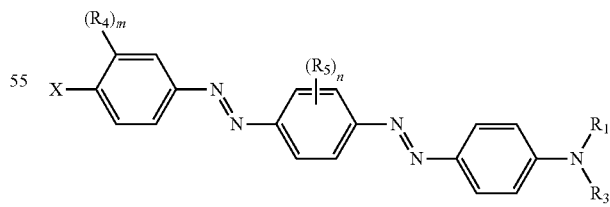

wherein m is 0 or 1, $R_4$ and $R_5$, if present, are selected from $C_1$-$C_4$alkyl, Hal is F or $CF_3$, and the other symbols are defined as above.

The optional yellow dye preferably conforms to formula A or A1 with the moiety —$N(R_1)R_3$ being morpholinyl and any of $R_4$, $R_5$, $R_6$, if present, being methyl.

The red dye preferably conforms to formula A or A1 with the moiety —N(R$_1$)R$_3$ being pyrrolidinyl or piperidinyl or di(C$_1$-C$_4$alkyl)amino, and any of R$_4$, R$_5$, R$_6$, if present, being methyl.

The dye of formula B generally denotes the blue dye, which is preferably conforming to one of the formulae B1, B2, B3, B4

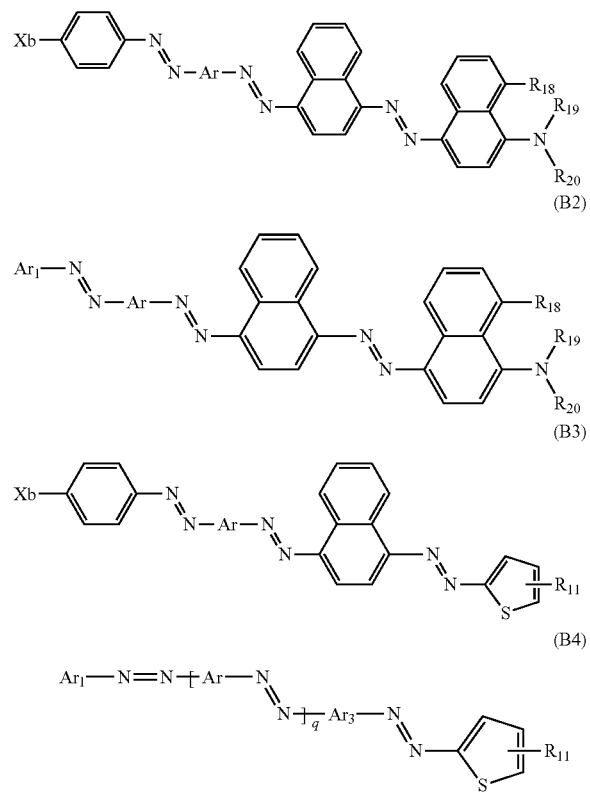

wherein, in any of the formulae B1, B2, B3 and B4,
q is 0 or 1;
Ar is 1,4-phenylene; 1,4-phenylene substituted by methyl; or is 1,4-naphthylene;
Ar$_1$ is a residue of one of the formulae

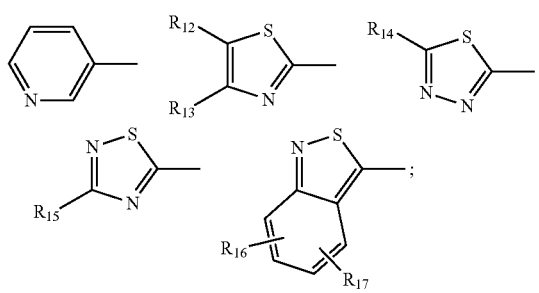

Ar$_3$ is 1,4-phenylene, 1,4-phenylene substituted by one or two methyl, or is 1,4-naphthylene;
Xb is Hal, COOR$_2$, CN, phenyl, R$_8$-substituted phenyl, cyclohexyl, C$_1$-C$_{12}$alkyl-cyclohexyl;
Hal is CF$_3$ or fluoro;

R$_2$ is C$_1$-C$_8$alkyl;
R$_8$ is C$_1$-C$_8$alkyl, cyclohexyl, C$_1$-C$_8$alkyl-cyclohexyl;
R$_{11}$ is pyrrolidinyl or piperidinyl or di(C$_1$-C$_8$alkyl)amino or morpholinyl;
R$_{12}$ and R$_{13}$ independently are H; Hal; CN; COOR$_2$; C$_1$-C$_8$alkyl; phenyl; phenyl substituted by phenyl or C$_1$-C$_8$alkyl or cyclohexyl or C$_1$-C$_8$alkoxy; C$_2$-C$_8$alkyl or C$_3$-C$_8$alkylthio each of which is interrupted by O; C$_1$-C$_8$alkyl or vinyl each of which is substituted by CN or COOR$_2$; or R$_{12}$ and R$_{13}$ together are C$_3$-C$_4$alkylene;
R$_{14}$ is CF$_3$; CN; COOR$_2$; C$_1$-C$_8$alkyl; C$_1$-C$_8$alkoxy; C$_1$-C$_8$alkylthio; pyrrolidinyl; di(C$_1$-C$_8$alkyl)amino; morpholinyl; phenyl; phenyl substituted by phenyl or C$_1$-C$_8$alkyl; C$_2$-C$_8$alkyl interrupted by O; C$_1$-C$_8$alkyl or vinyl or C$_1$-C$_8$alkylthio each of which is substituted by CN or COOR$_2$ or phenyl or CF$_3$;
R$_{15}$ is CF$_3$, OCF$_3$; CN; COOR$_2$; C$_1$-C$_8$alkyl; C$_1$-C$_8$alkoxy; C$_1$-C$_8$alkylthio; C$_1$-C$_8$alkyl-SO$_2$; pyrrolidinyl; di(C$_1$-C$_4$alkyl)amino; morpholinyl; phenyl; phenyl substituted by phenyl or C$_1$-C$_8$alkyl; C$_2$-C$_8$alkyl interrupted by O; C$_1$-C$_8$alkyl or vinyl or C$_1$-C$_8$alkylthio or C$_1$-C$_8$alkyl-SO$_2$ each of which is substituted by CN or COOR$_2$ or phenyl or CF$_3$;
R$_{16}$ and R$_{17}$ independently are H, halogen, nitro;
R$_{18}$ is H or C$_1$-C$_8$alkylamino;
R$_{19}$ is C$_1$-C$_8$alkyl;
R$_{20}$ is H or C$_1$-C$_8$alkyl;
or the alkyl groups of R$_{18}$ and R$_{19}$ form a common bridging group C$_1$-C$_3$alkylene;
and all other symbols are as defined further above.

Accordingly, a preferred composition is a composition, wherein the yellow dye conforms to formula A or A1 with the moiety —N(R$_1$)R$_3$ being morpholinyl and any of R$_4$, R$_5$, R$_6$, if present, being methyl; and the red dye conforms to formula A or A1 with the moiety —N(R$_1$)R$_3$ being pyrrolidinyl or piperidinyl or di(C$_1$-C$_4$alkyl)amino, and any of R$_4$, R$_5$, R$_6$, if present, being methyl; and the dye of formula B is a blue dye conforming to one of the formulae B1, B2, B3, B4, as described herein-before.

A particularly preferred composition is a composition containing a compound A2

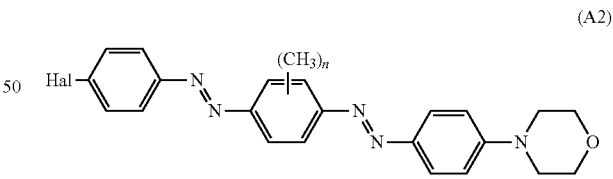

and a compound A3

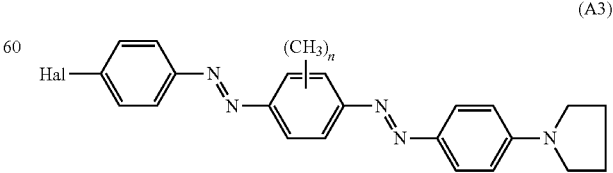

and at least one of the compounds B6, B6', B7, B8, B10

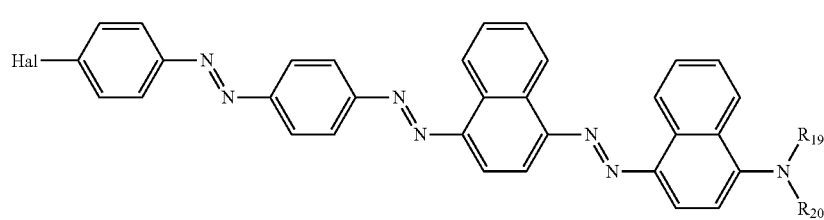
(B6)

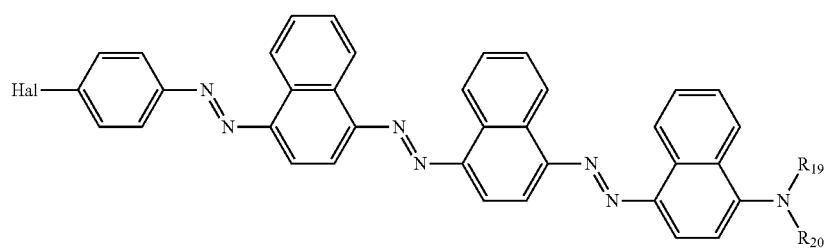
(B6')

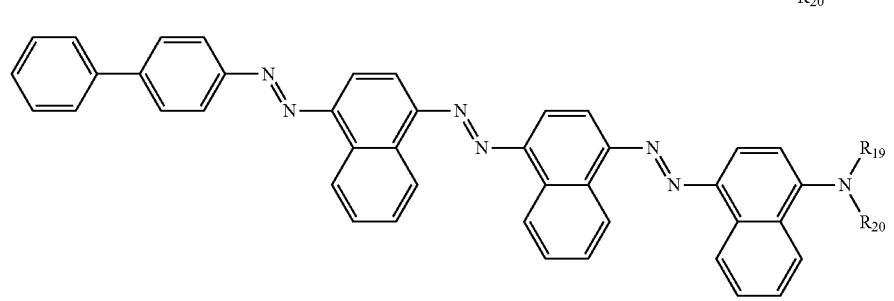
(B7)

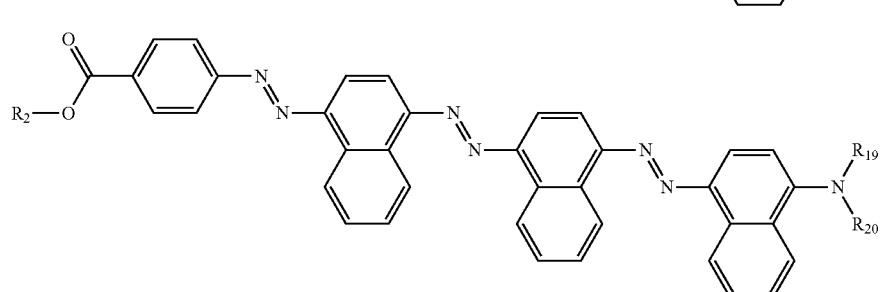
(B8)

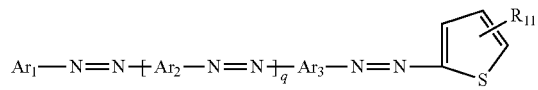 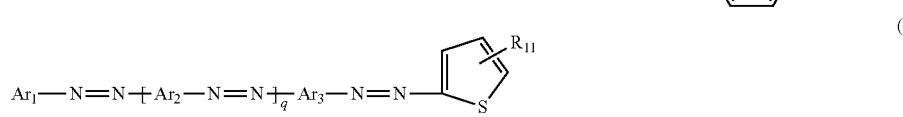
(B10)

wherein Hal is fluoro or $CF_3$;

n is a number from 0 to 2;

$R_{19}$ is branched $C_3$-$C_8$alkyl and $R_{20}$ is H, or $R_{19}$ and $R_{20}$ are $C_1$-$C_4$alkyl; and $R_2$ is linear or branched $C_1$-$C_8$alkyl;

q is 0 or 1;

$Ar_1$ is phenyl substituted by Xb, or is a heterocyclic residue of one of the formulae

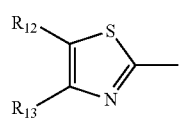 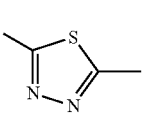

-continued

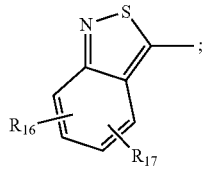

$Ar_2$ is 1,4-phenylene, 1,4-phenylene substituted by $C_1$-$C_4$alkyl, or is 1,4-naphthylene;

$Ar_3$ is 1,4-phenylene, 1,4-phenylene substituted by $C_1$-$C_4$alkyl, or is 1,4-naphthylene;

Xb is Hal, $COOR_2$, CN, phenyl, $R_8$-substituted phenyl, $C_3$-$C_{12}$cycloalkyl, $C_1$-$C_{12}$alkyl-cyclohexyl, $C_1$-$C_{12}$alkoxy-cyclohexyl;

Hal is $CF_3$ or fluoro;

$R_2$ is $C_1$-$C_8$alkyl;

$R_8$ is $C_1$-$C_{12}$alkyl, $C_1$-$C_{12}$alkoxy, $C_3$-$C_{12}$cycloalkyl, phenyl, $C_1$-$C_{12}$alkyl-phenyl, $C_1$-$C_{12}$alkyl-cyclohexyl, $C_1$-$C_{12}$alkoxy-cyclohexyl;

$R_{11}$ is pyrrolidinyl or piperidinyl or di($C_1$-$C_{12}$alkyl)amino or morpholinyl;

$R_{12}$ and $R_{13}$ independently are H; Hal; CN; $COOR_2$; $C_1$-$C_{12}$alkyl; $C_1$-$C_{12}$alkoxy; $C_1$-$C_{12}$alkylthio; phenyl; phenyl substituted by phenyl or $C_1$-$C_8$alkyl or cyclohexyl or $C_1$-$C_8$alkoxy or $C_1$-$C_8$alkylthio; $C_2$-$C_{12}$alkyl or $C_3$-$C_{12}$alkoxy $C_3$-$C_{12}$alkylthio each of which is interrupted by O; $C_1$-$C_8$alkyl or $C_2$-$C_3$alkenyl or $C_1$-$C_8$alkoxy or $C_1$-$C_8$alkylthio each of which is substituted by CN or $COOR_2$ or phenyl or fluoro or $CF_3$; or $R_{12}$ and $R_{13}$ together are $C_3$-$C_4$alkylene;

$R_{14}$ is H; $CF_3$; CN; $COOR_2$; $C_1$-$C_{12}$alkyl; $C_1$-$C_{12}$alkoxy; $C_1$-$C_{12}$alkylthio; pyrrolidinyl; piperidinyl; di($C_1$-$C_4$alkyl)amino; morpholinyl; phenyl; phenyl substituted by phenyl or $C_1$-$C_8$alkyl or cyclohexyl or $C_1$-$C_8$alkoxy or $C_1$-$C_8$alkylthio; $C_2$-$C_{12}$alkyl or $C_3$-$C_{12}$alkoxy $C_3$-$C_{12}$alkylthio each of which is interrupted by O; $C_1$-$C_8$alkyl or $C_2$-$C_3$alkenyl or $C_1$-$C_8$alkoxy or $C_1$-$C_8$alkylthio each of which is substituted by CN or $COOR_2$ or phenyl or fluoro or $CF_3$;

$R_{15}$ is H; $CF_3$; $OCF_3$; CN; $COOR_2$; $C_1$-$C_{12}$alkyl; $C_1$-$C_{12}$alkoxy; $C_1$-$C_{12}$alkylthio; $C_1$-$C_{12}$alkyl-$SO_2$; pyrrolidinyl; di($C_1$-$C_4$alkyl)amino; morpholinyl; phenyl; phenyl substituted by phenyl or $C_1$-$C_8$alkyl or cyclohexyl or $C_1$-$C_8$alkoxy or $C_1$-$C_8$alkylthio; $C_2$-$C_{12}$alkyl or $C_3$-$C_{12}$alkoxy $C_3$-$C_{12}$alkylthio each of which is interrupted by O; $C_1$-$C_8$alkyl or $C_2$-$C_3$alkenyl or $C_1$-$C_8$alkoxy or $C_1$-$C_8$alkylthio or $C_1$-$C_8$alkyl-$SO_2$ each of which is substituted by CN or $COOR_2$ or phenyl or fluoro or $CF_3$;

$R_{16}$ and $R_{17}$ independently are H, halogen, nitro, $C_1$-$C_{12}$alkyl, $C_1$-$C_{12}$alkoxy.

An example for a black dichroic dye mixture of the invention for the use in polarizing film of LC display is the combination of the 3 azo compounds A2a, A3a and one of B6a or B7a or B8a, as black dyestuff:

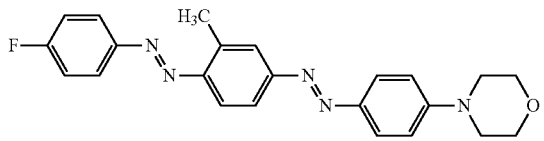 (A2a)

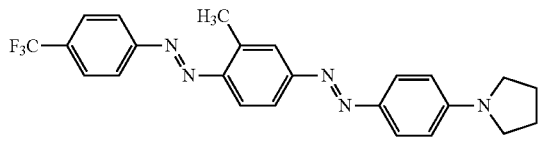 (A3a)

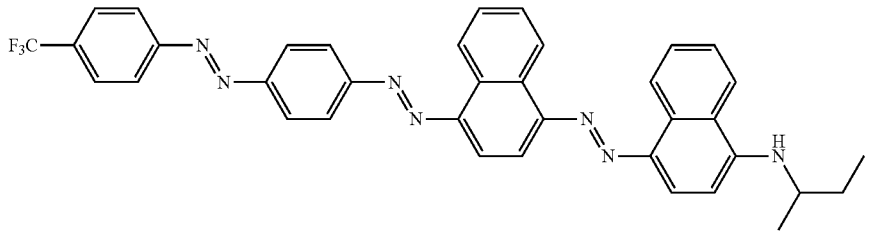 (B6a)

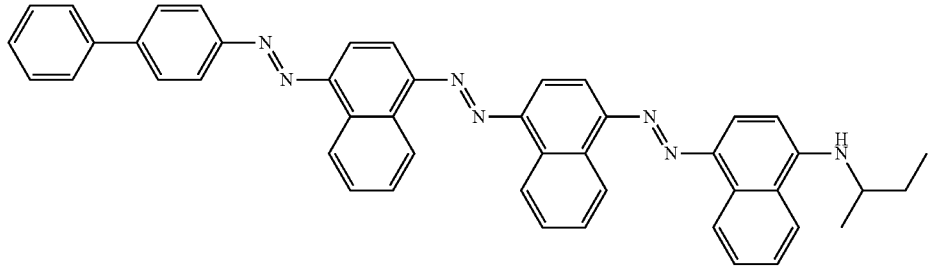 (B7a)

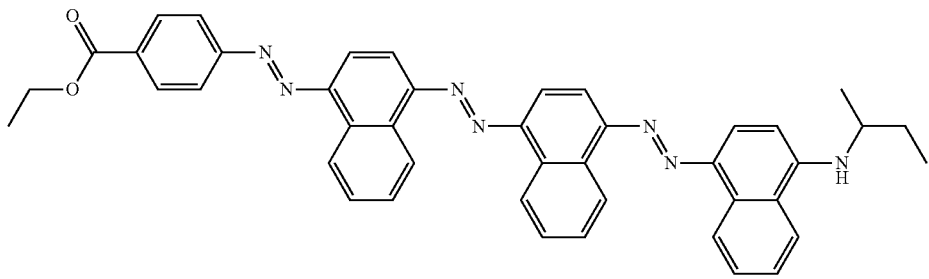 (B8a)

Another preferred composition is a composition, wherein one dye conforms to formula A4

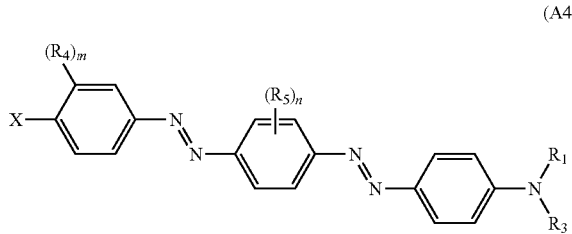
(A4)

wherein X is H, m is 1, n is 0, 1 or 2,
$R_4$ and $R_5$ are methyl,
and the moiety —$N(R_1)R_3$ is pyrrolidinyl;
and at least one compound of formulae B1, B2, B3 or B4 as defined above, preferably at least one of the compounds of formulae B6, B6', B7, B8, or B10, more preferably a compound of formula B10.

Another preferred blue dye for use in the black dichroic dye composition of the invention is the one of formula B10, or more preferably of formula B11, B12, B13, which formulae are explained below.

Among the dyes of formula B10, preferred ones conform to formula B11, B12 and/or B13

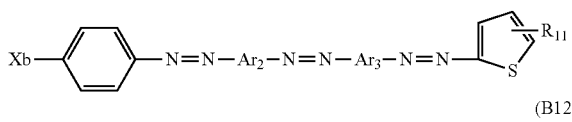
(B11)

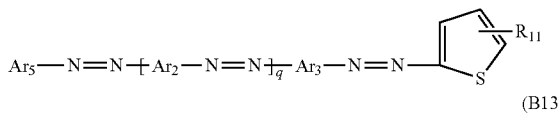
(B12)

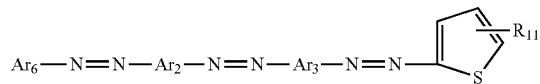
(B13)

wherein
q is 0 or 1;
$Ar_5$ is a heterocyclic residue of the formula

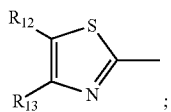

$Ar_1$ is a heterocyclic residue of one of the formulae

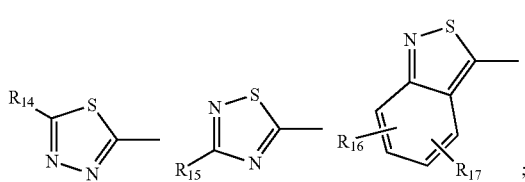

and other symbols are as defined for formula B10;
especially those wherein
Xb is Hal, $COOR_2$, CN, phenyl, $R_5$-substituted phenyl;
Hal is $CF_3$ or fluoro;
$R_2$ is $C_1$-$C_8$alkyl;
$R_8$ is $C_1$-$C_8$alkyl, cyclohexyl, phenyl, $C_1$-$C_8$alkyl-phenyl, $C_1$-$C_8$alkyl-cyclohexyl;
$R_{11}$ is pyrrolidinyl or di($C_1$-$C_4$alkyl)amino or morpholinyl;
$R_{12}$ and $R_{13}$ independently are H; Hal; CN; $COOR_2$; $C_1$-$C_8$alkyl; phenyl; phenyl substituted by phenyl or $C_1$-$C_8$alkyl or cyclohexyl or $C_1$-$C_8$alkoxy; $C_2$-$C_8$alkyl or $C_3$-$C_8$alkylthio each of which is interrupted by O; $C_1$-$C_8$alkyl or vinyl each of which is substituted by CN or $COOR_2$; or $R_{12}$ and $R_{13}$ together are $C_3$-$C_4$alkylene;
$R_{14}$ is $CF_3$; CN; $COOR_2$; $C_1$-$C_8$alkyl; $C_1$-$C_8$alkoxy; $C_1$-$C_8$alkylthio; pyrrolidinyl; di($C_1$-$C_4$alkyl)amino; morpholinyl; phenyl; phenyl substituted by phenyl or $C_1$-$C_8$alkyl; $C_2$-$C_8$alkyl interrupted by O; $C_1$-$C_8$alkyl or vinyl or $C_1$-$C_8$alkylthio each of which is substituted by CN or $COOR_2$ or phenyl or $CF_3$;
$R_{15}$ is $CF_3$, $OCF_3$; CN; $COOR_2$; $C_1$-$C_8$alkyl; $C_1$-$C_8$alkoxy; $C_1$-$C_8$alkylthio; $C_1$-$C_8$alkyl-$SO_2$; pyrrolidinyl; di($C_1$-$C_4$alkyl)amino; morpholinyl; phenyl; phenyl substituted by phenyl or $C_1$-$C_8$alkyl; $C_2$-$C_8$alkyl interrupted by O; $C_1$-$C_8$alkyl or vinyl or $C_1$-$C_8$alkylthio or $C_1$-$C_8$alkyl-$SO_2$ each of which is substituted by CN or $COOR_2$ or phenyl or $CF_3$;
$R_{16}$ and $R_{17}$ independently are H, halogen, nitro.

The mixture is compounded with liquid crystal material; the present dye mixture is easily dissolvable in the liquid crystal material following known techniques such as formation a pre-solution of one or more of the dyes in a solvent, especially a solvent of high vapor pressure such as lower alkyl ethers, hydrocarbons, or halohydrocarbons such as dichloromethane, mixing the pre-solution with the LC material and removing the solvent under reduced pressure and/or heating. The LC material is mostly commercially available; application of the dyes in the liquid crystal material, types of liquid crystal material, assembly of liquid crystal cells and testing methods are known in the art, some are described, for example, in U.S. Pat. No. 4,565,424 (see e.g. col. 13-18). The present compounds can be prepared and, if desired, further purified according to known methods, especially in the field of azo dye chemistry; some of these methods are also described in U.S. Pat. No. 4,565,424 (see e.g. col. 9-10). Novel dyes of the present invention may be obtained and purified in accordance or analogy to present examples. The disclosure of U.S. Pat. No. 4,565,424, especially of the above cited passages, is hereby incorporated by reference.

The present invention thus further provides a composition, which contains the present dye mixture (generally red and blue dye and optionally a yellow dye as described above) in dissolved state in a liquid crystal material.

For obtaining the optimum black shade, the ratio of weight parts of the dye(s) conforming to formula (A) to the dye(s) conforming to formula (B), i.e. (A):(B), is usually 0.1:20 to 5:1.

The dye composition may comprise 1 to 20, preferably 1 to 10, especially 1.5 to 5 parts by weight of at least one conforming to formula (B), and 0.1 to 5, especially 0.5 to 2.0 parts by weight of each dye conforming to the formula (A).

In case of a blue/red/yellow dye mixture, for obtaining the optimum black shade, the present dye composition usually contains about 1 to 20, e.g. 1 to 10, especially 1.5 to 5 parts by weight of the blue dye and
0.1 to 5, especially 0.5 to 2, parts by weight of the red dye on 1 part by weight of the yellow dye.

The final LC composition may contain 1 to 20 parts, preferably 1 to 10 parts, especially 1.5 to 5 parts of the dye conforming to formula (B), 0.1 to 5 parts, especially 0.5 to 2 parts of each dye conforming to formula (A), based on 50 to 2000 parts, especially 100 to 500 parts, of liquid crystal material, all parts given as parts by weight.

The final LC composition thus often contains
1 to 20 parts, for example 1 to 10 parts, especially 1.5 to 5 parts by weight of the blue dye,
0.1 to 5 parts, especially 0.5 to 2 parts by weight of the red dye, and
1 part by weight of the yellow dye,
on 50 to 2000 parts, especially 100 to 500 parts by weight, of liquid crystal material.

Especially preferred is a composition containing 1 to 5% by weight of the present black dye mixture in LC material. The LC compositions usually contain the LC material as main component (i.e. 50%, especially 90% by weight or more), and may contain some further minor components (e.g. up to 49%, especially up to 9%) such as polymerization aids, additives, photoinitiators or their remainders after polymerization (all parts and percentages given by weight).

Consequently, the present invention further pertains to a liquid crystal display containing the dye composition as described, especially a liquid crystal display containing the dye composition in a polarizing film; to a process for the preparation of a polarizing film or a liquid crystal display, which process comprises dissolving a dye composition according to the invention in liquid crystal material; and to the use of the present black dichroic dye composition, or any of the novel dyes described further below, for the preparation of a polarizing film or a liquid crystal display.

Some examples for dyes useful in the present black dichroic dye compositions are as listed below:

1. Yellow Dichroic Disazo Dyes

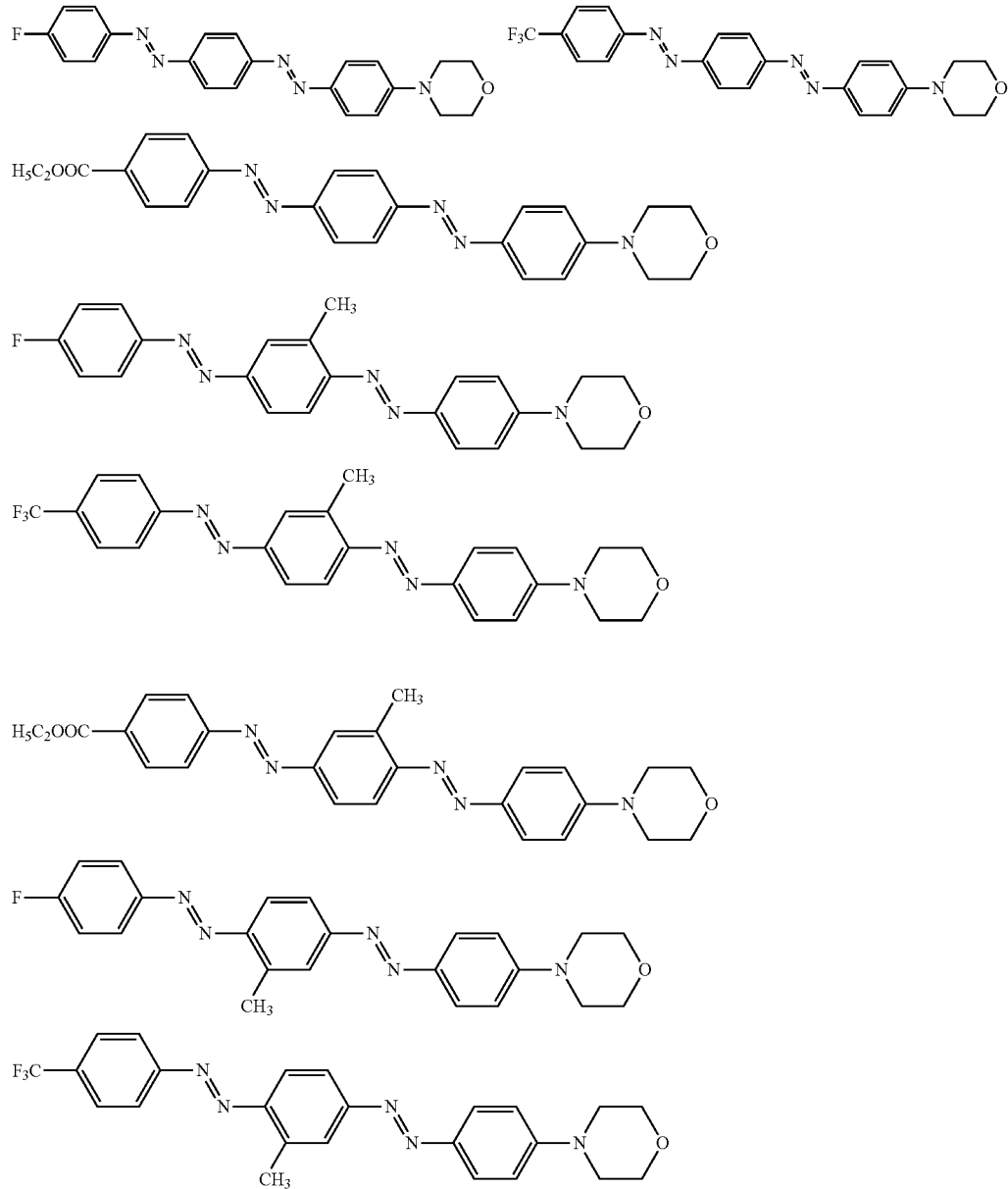

-continued
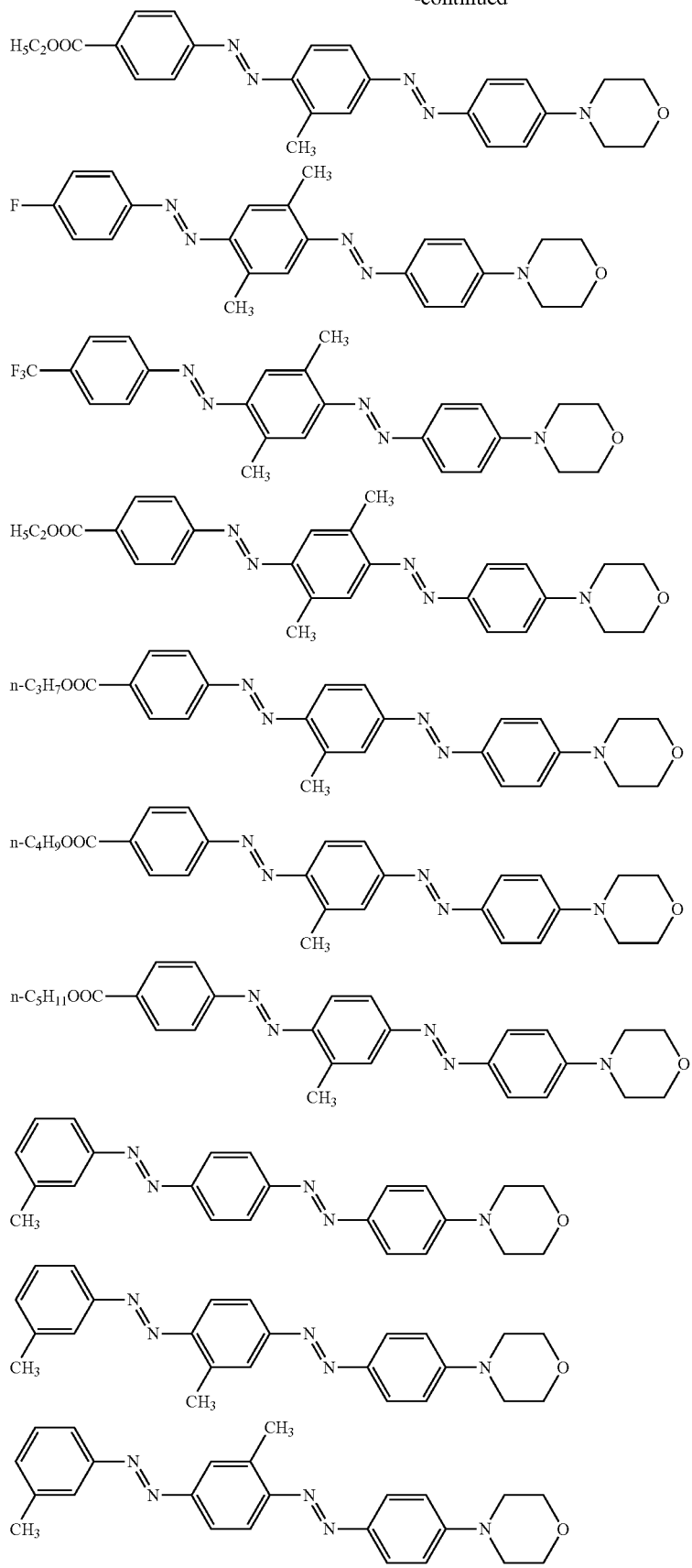

2. Red Dichroic Disazo Dyes
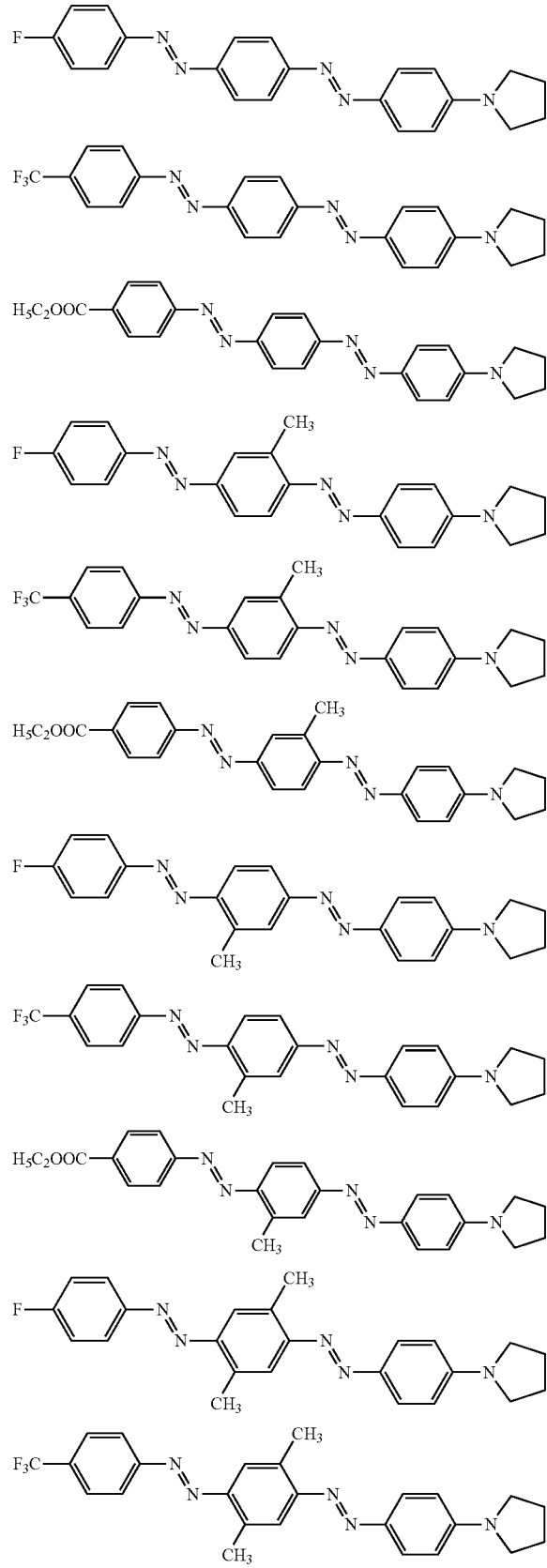
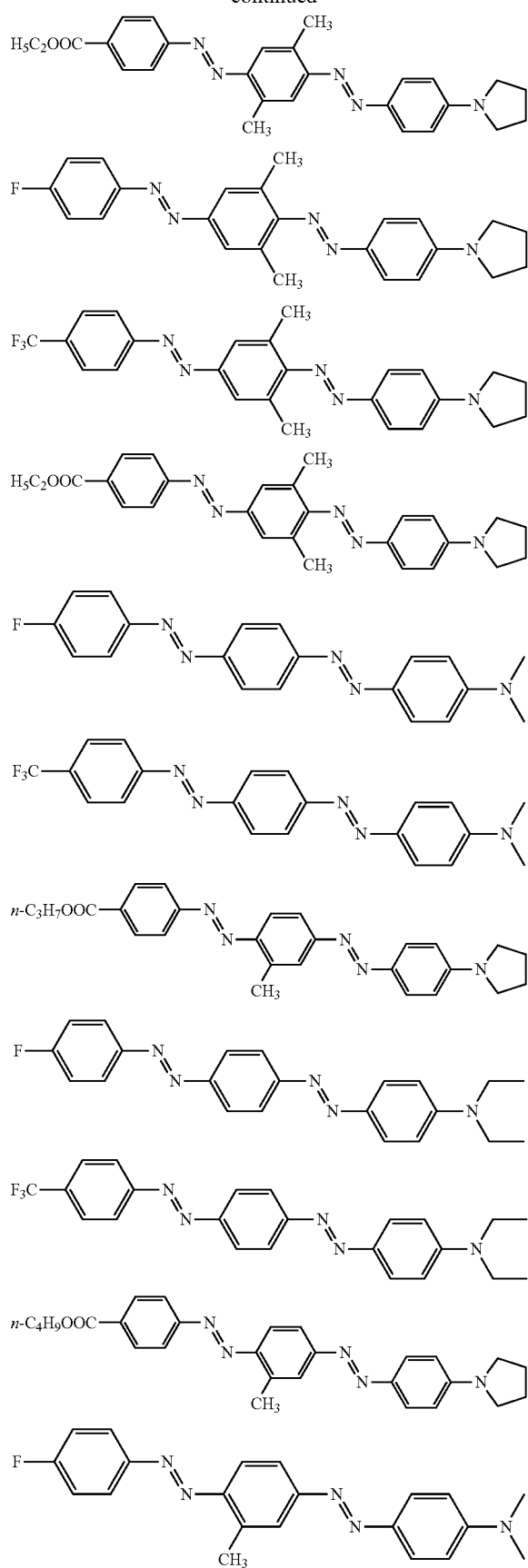

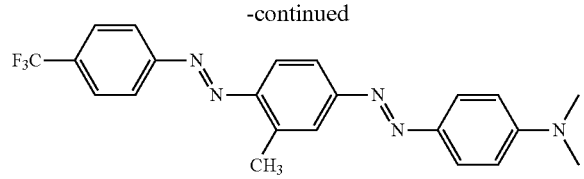
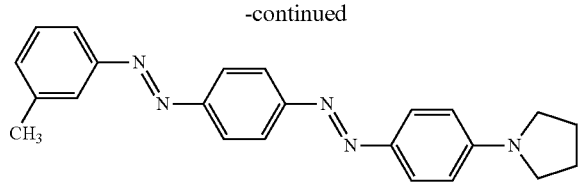
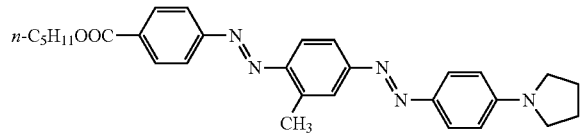
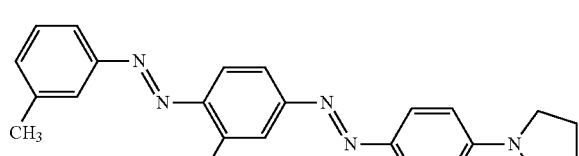
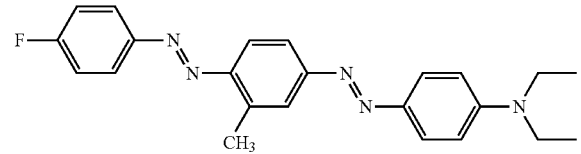
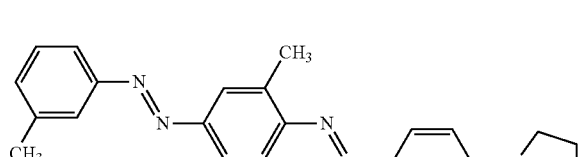
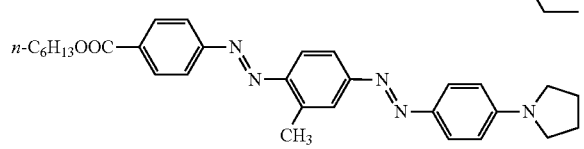
3. Blue Dichroic Trisazo Dyes (Based on Aromatic Components)
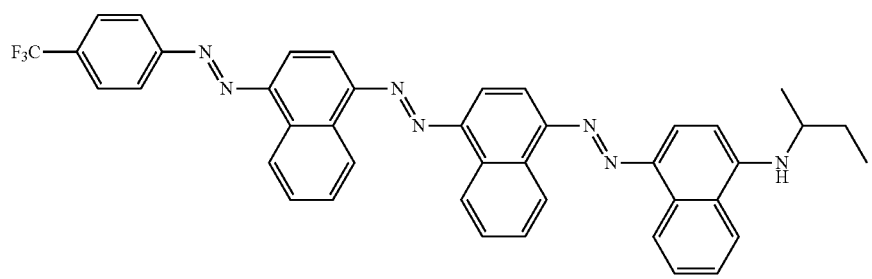
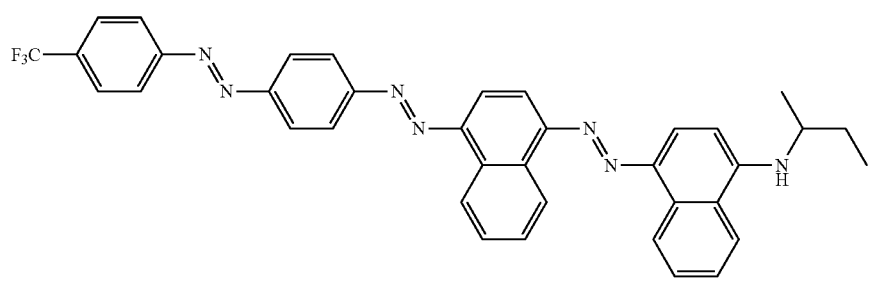
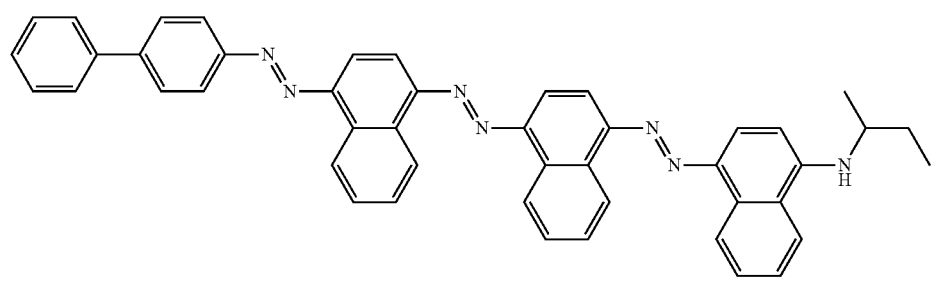

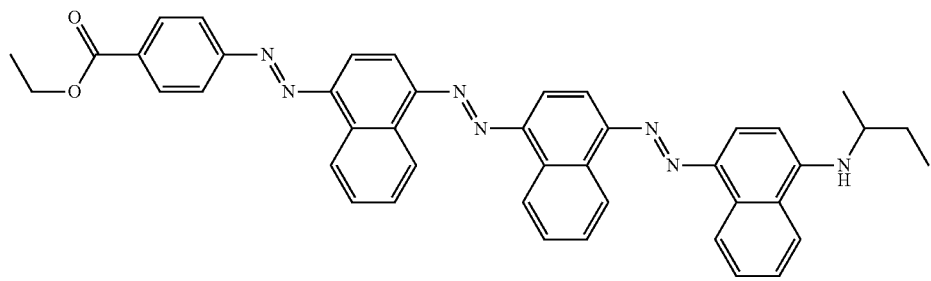
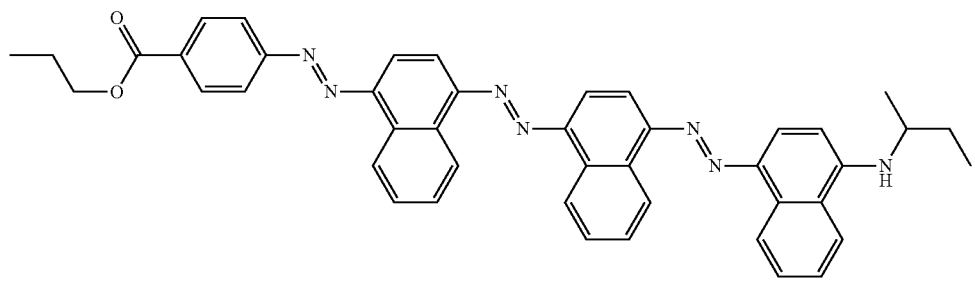
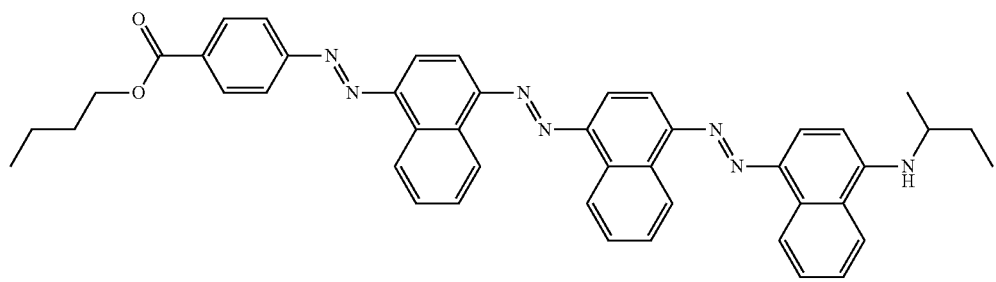
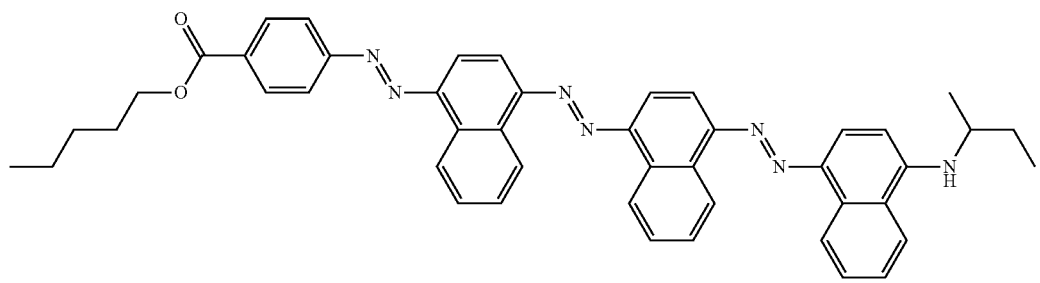
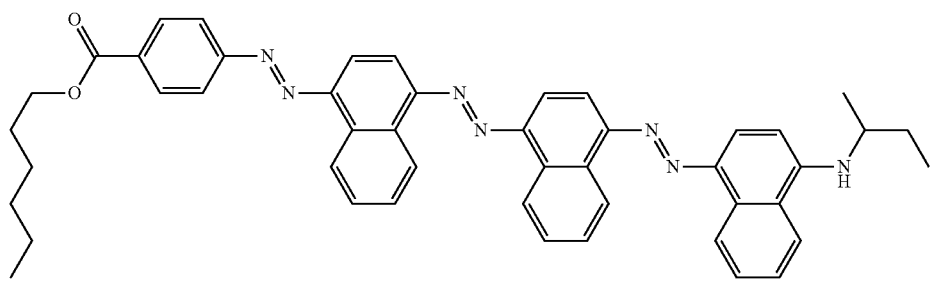
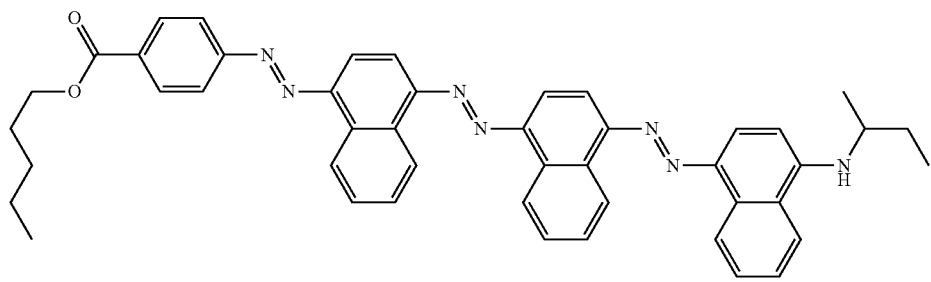

-continued
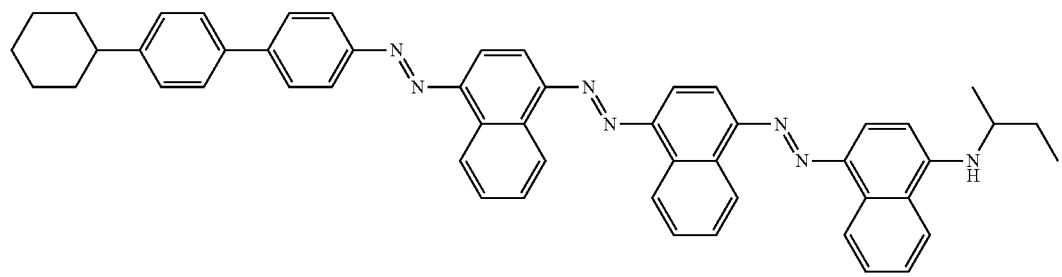
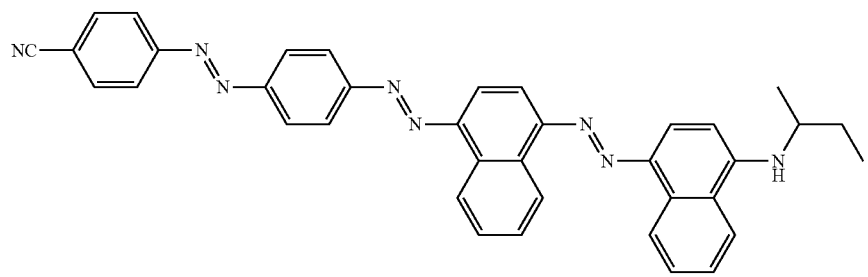
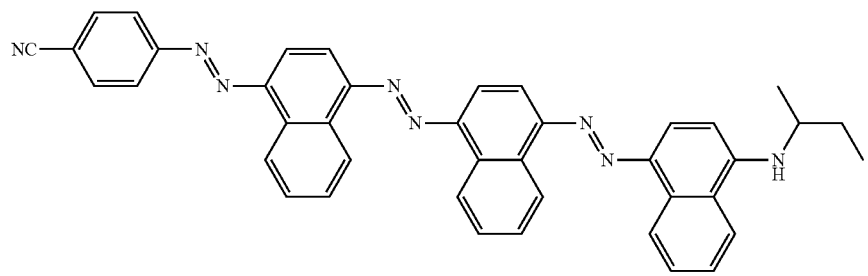
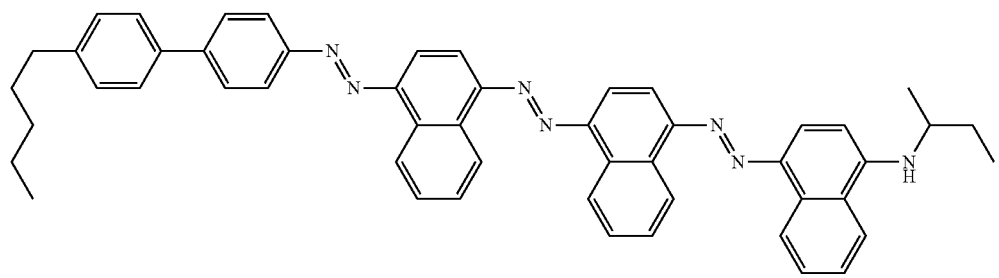
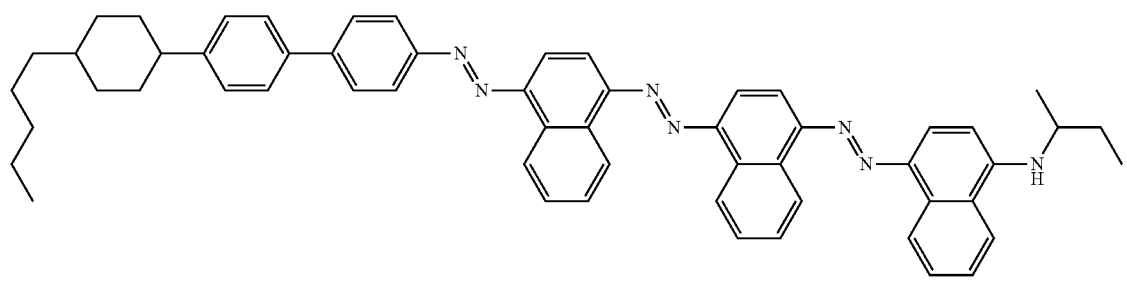
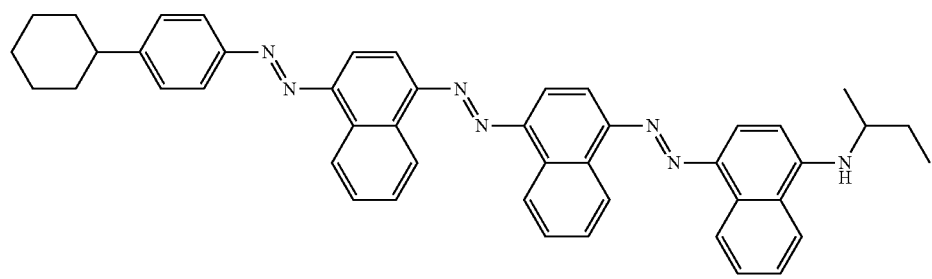

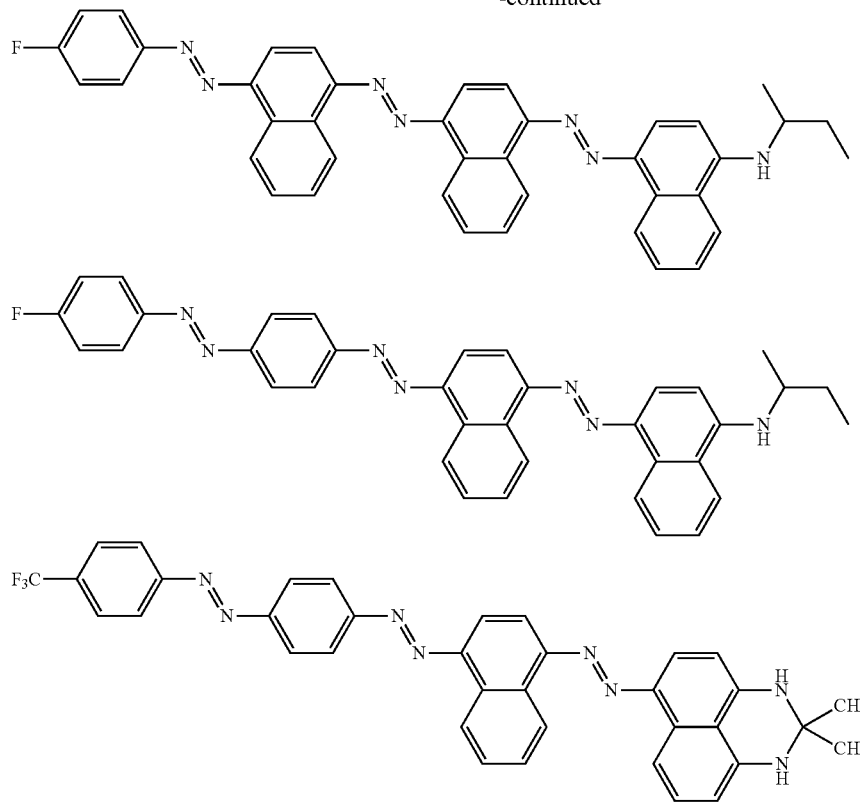
4. Blue Dichroic Disazo or Trisazo Dyes (with Heteroaromatic Components)
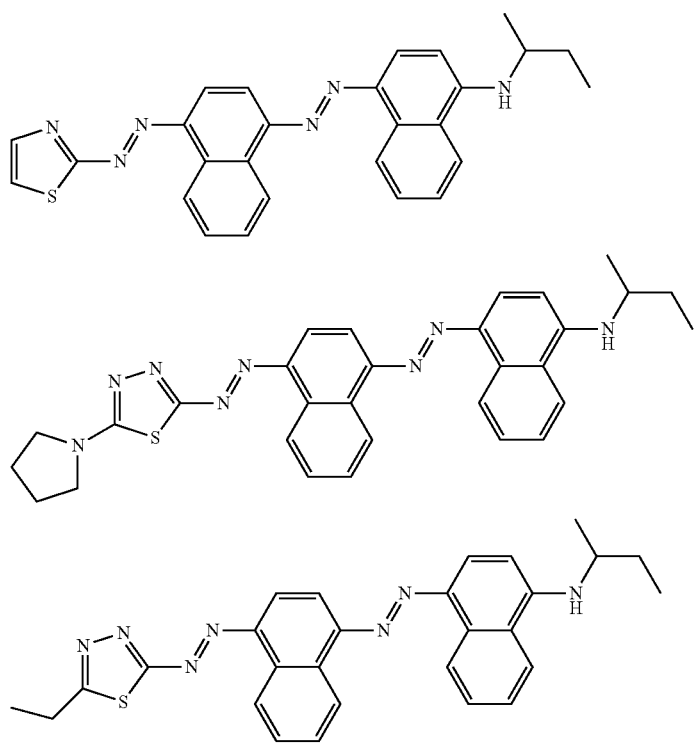

-continued
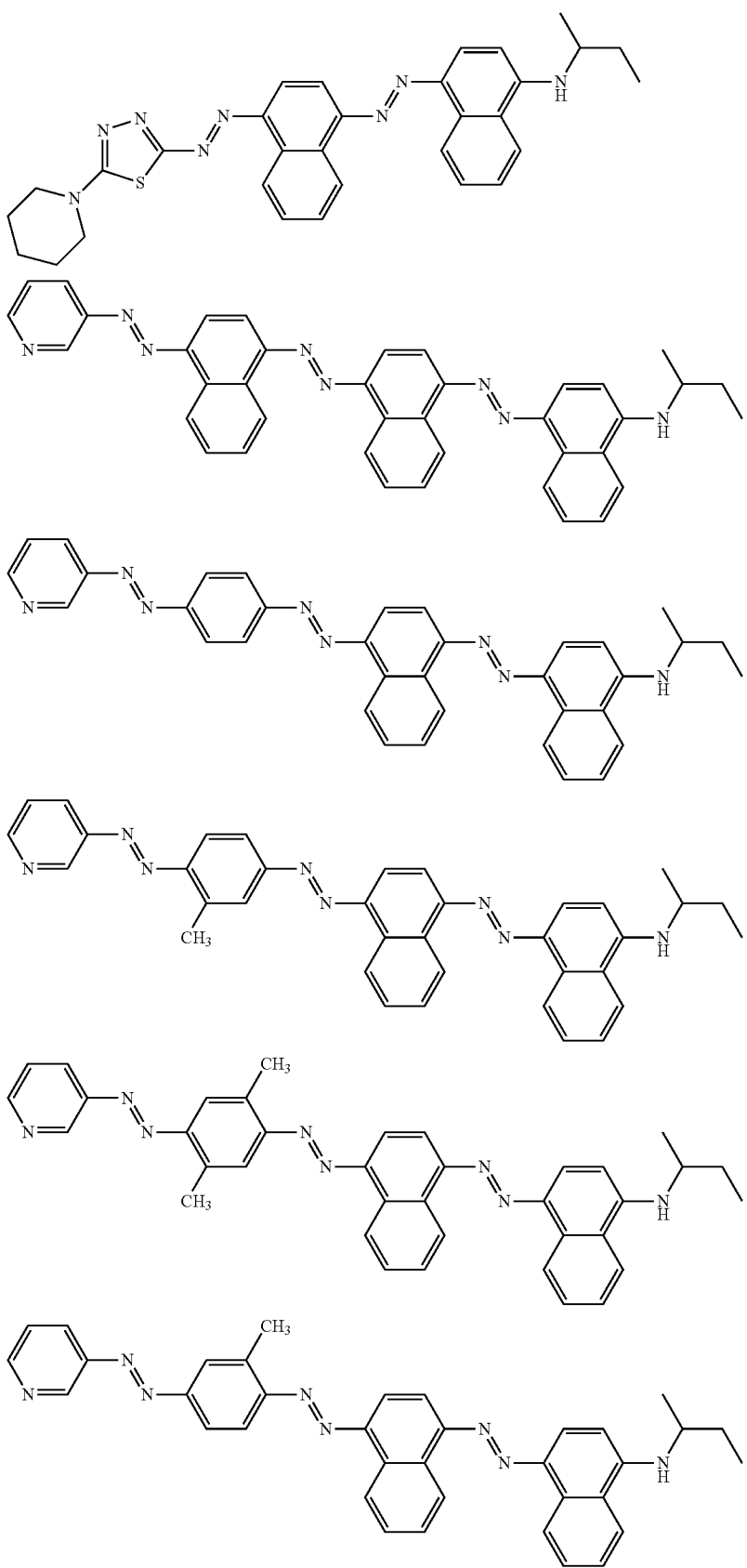

-continued
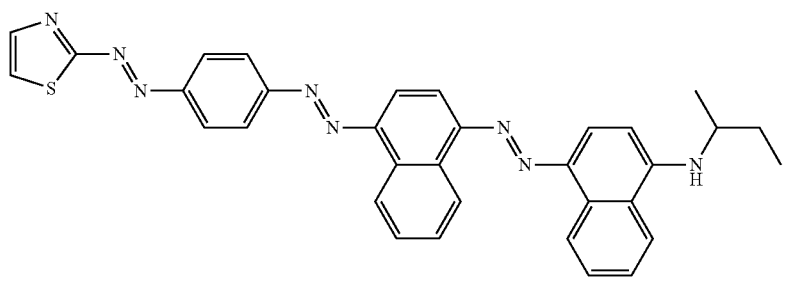
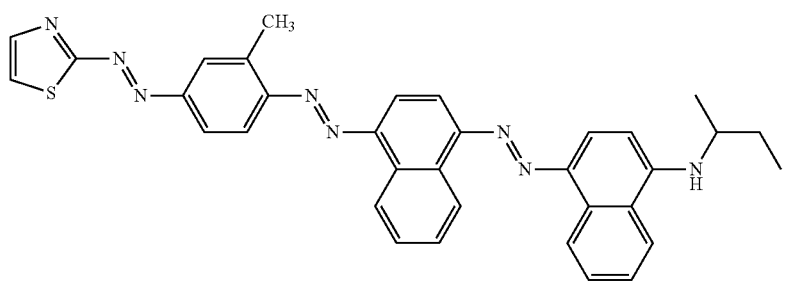
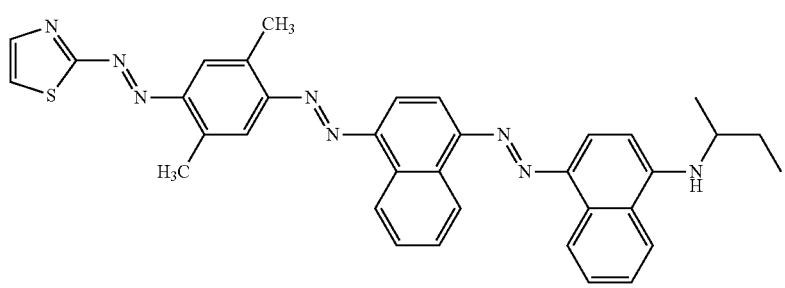
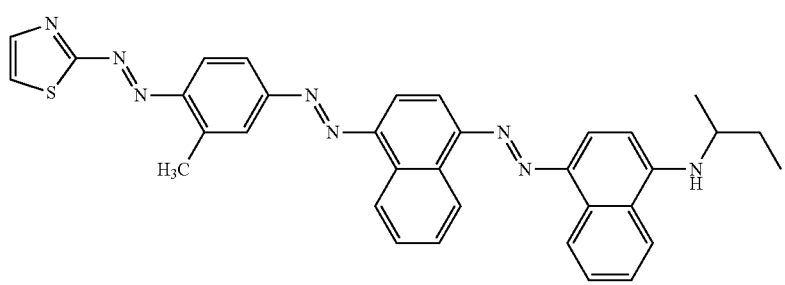
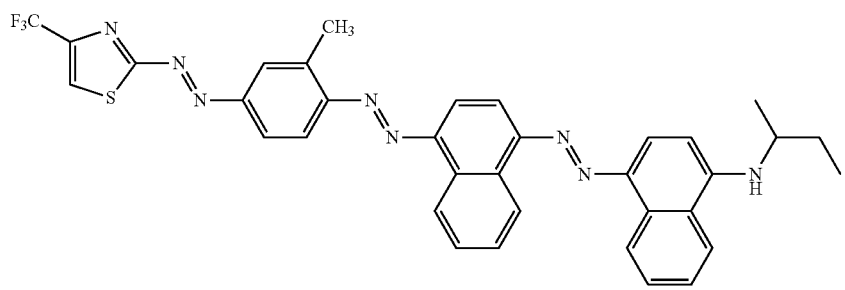
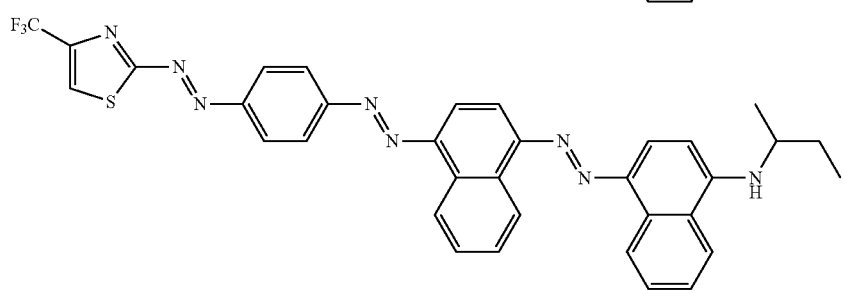

-continued
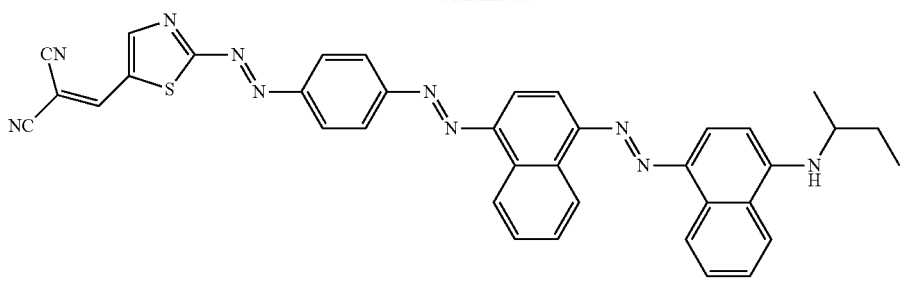
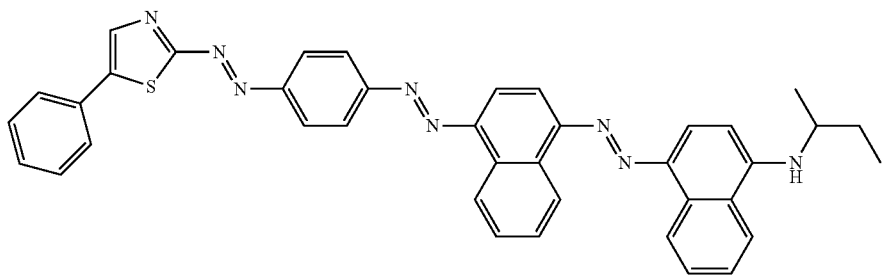
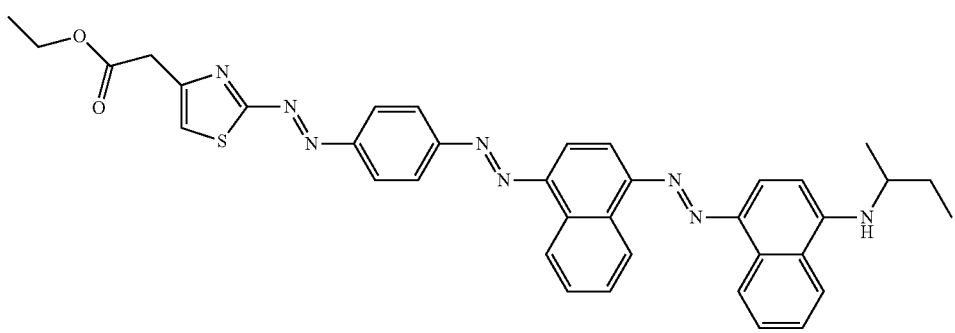
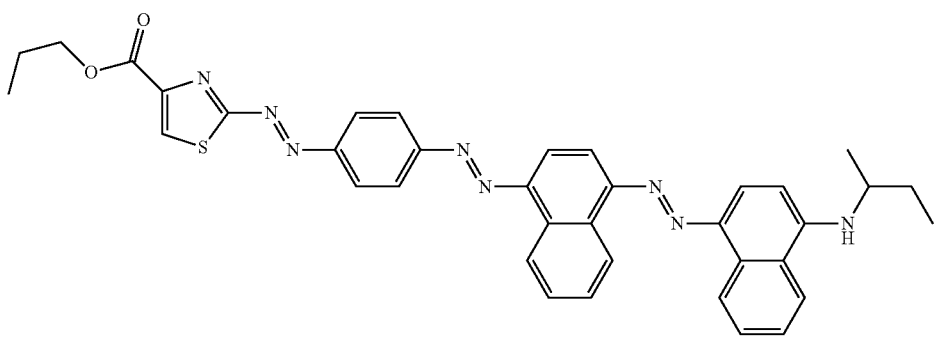
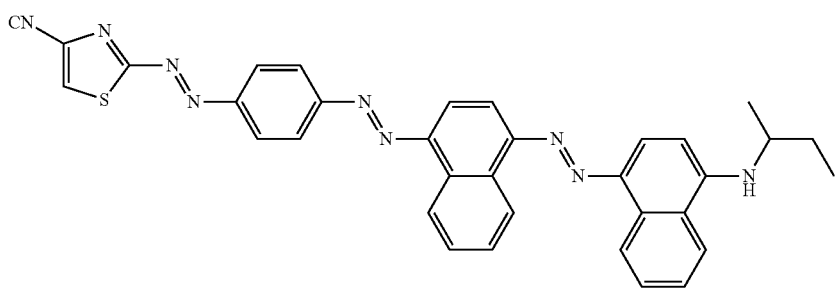

-continued
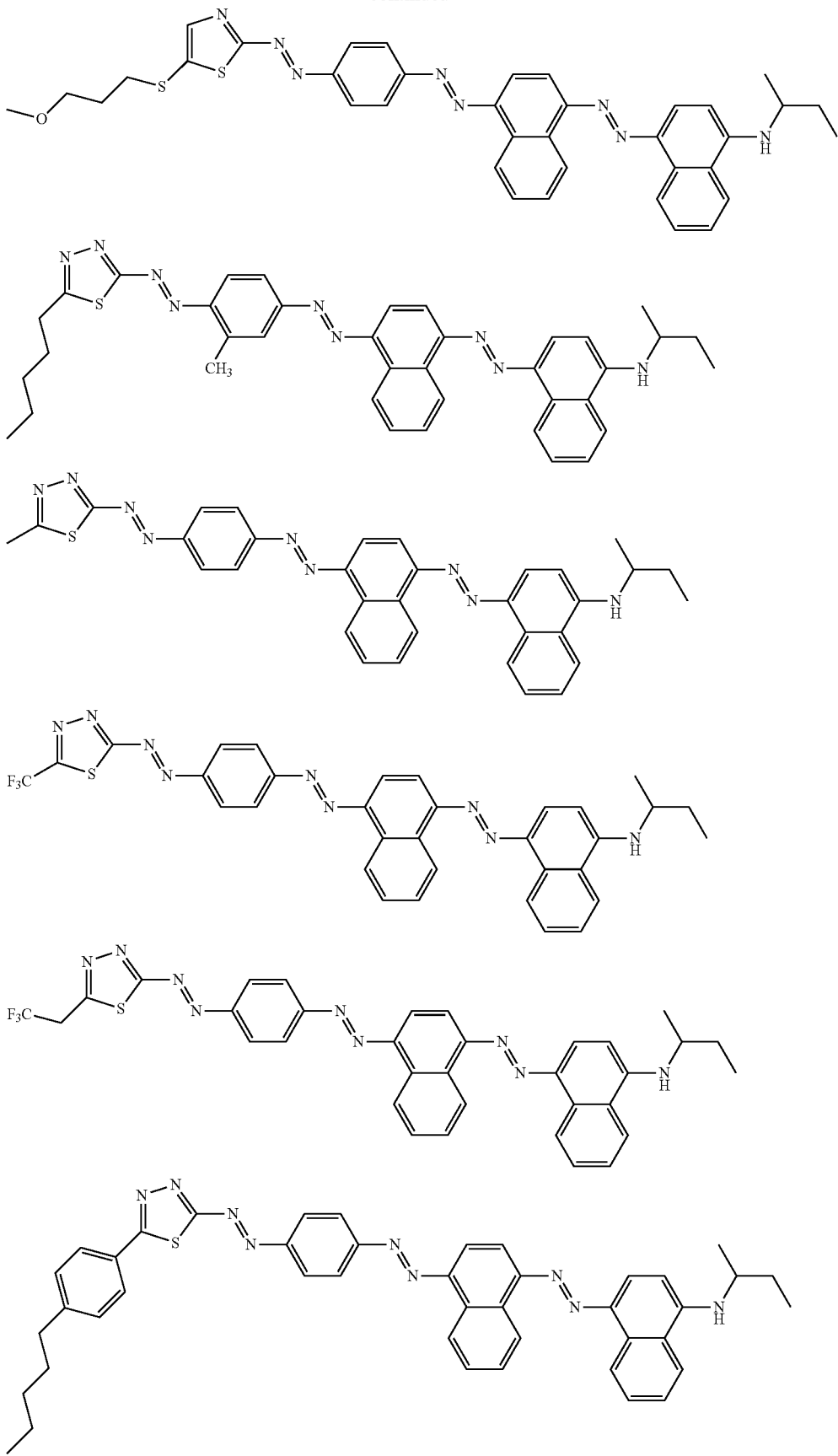

-continued
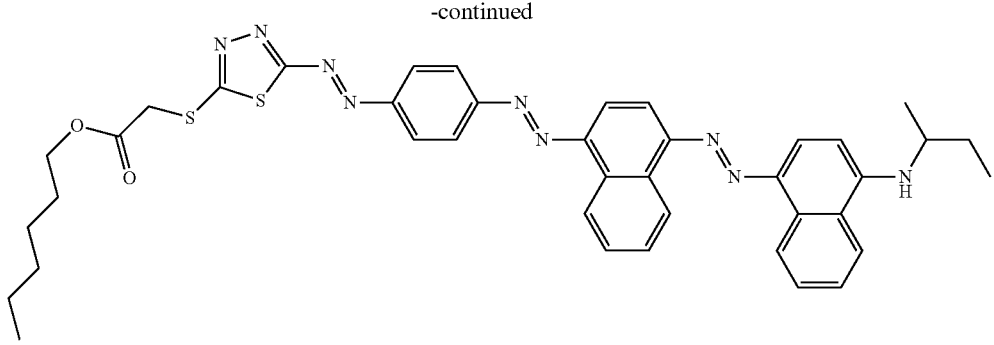
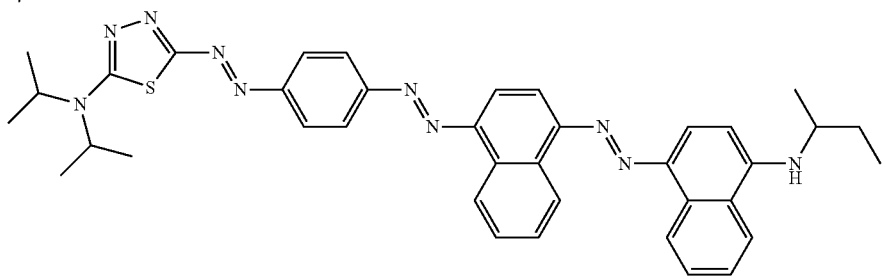
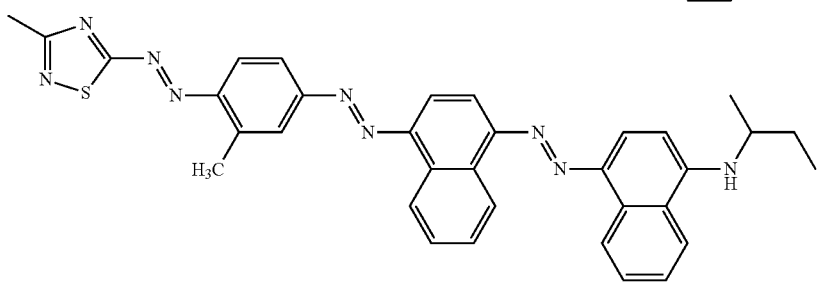
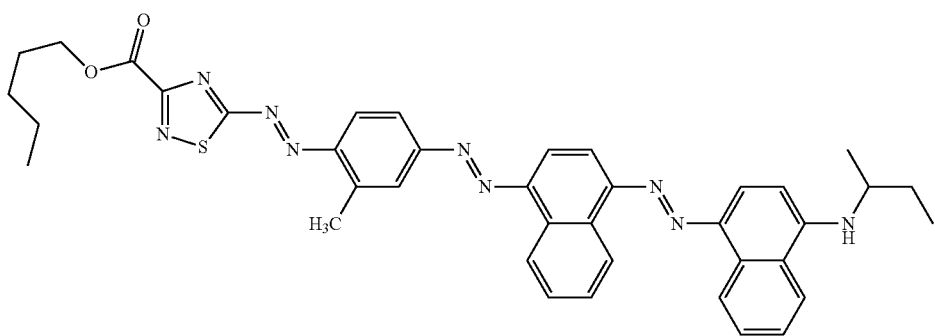
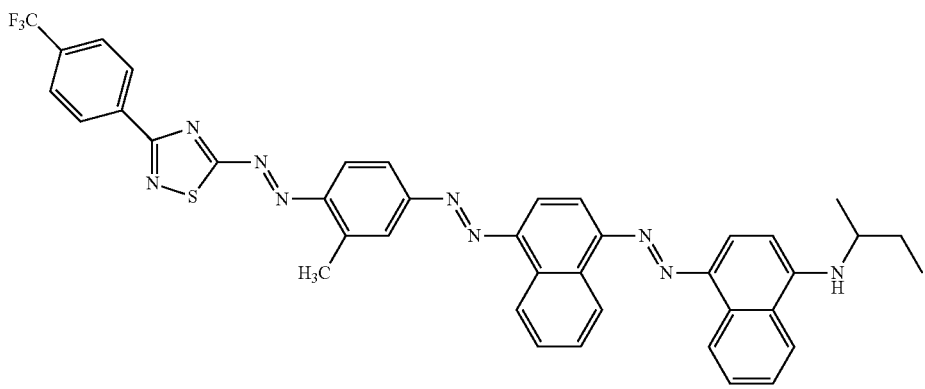

-continued
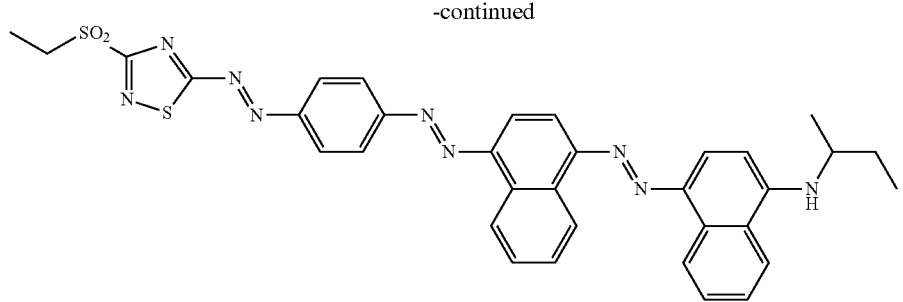
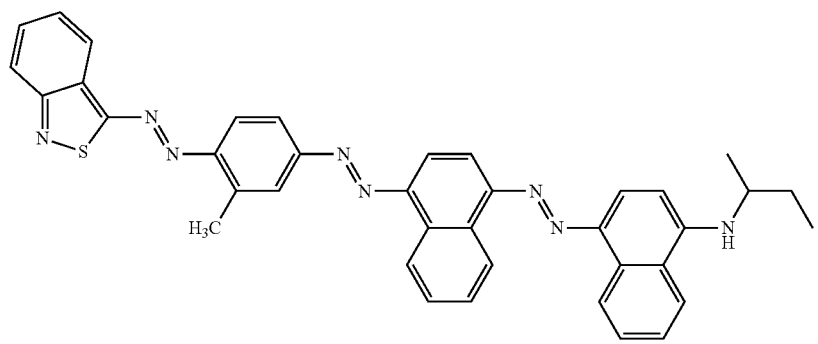
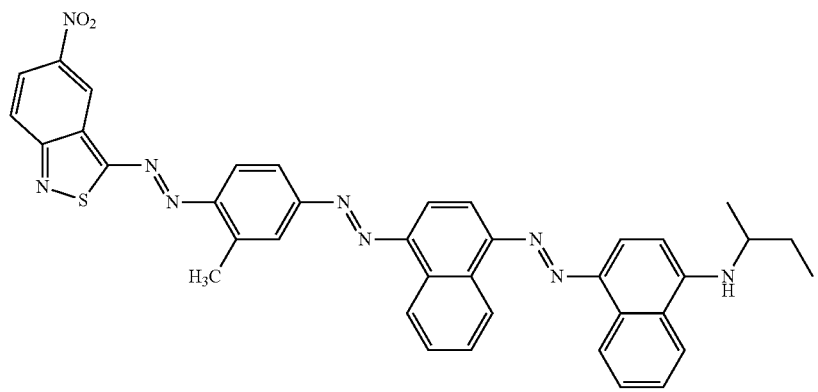
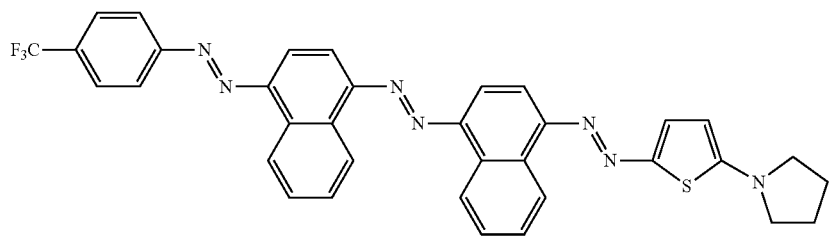
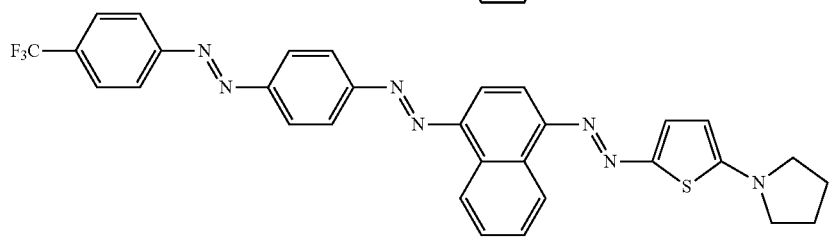

Some especially useful blue dyes in the present invention are novel compounds. The present invention thus further pertains to a dye which is a compound of the formula B10

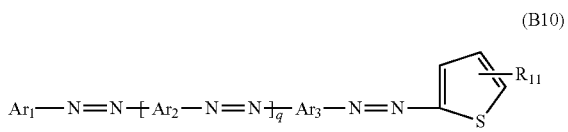
(B10)

wherein
q is 0 or 1;
$Ar_1$ is phenyl substituted by Xb, or is a heterocyclic residue of one of the formulae

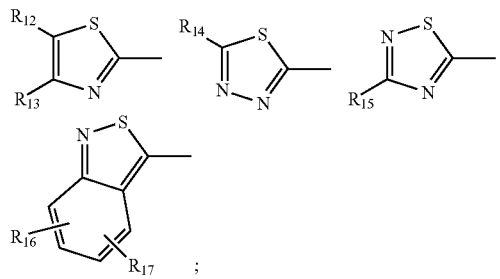

$Ar_2$ is 1,4-phenylene, 1,4-phenylene substituted by $C_1$-$C_4$alkyl, or is 1,4-naphthylene;
$Ar_3$ is 1,4-phenylene, 1,4-phenylene substituted by $C_1$-$C_4$alkyl, or is 1,4-naphthylene;
Xb is Hal, $COOR_2$, CN, phenyl, $R_8$-substituted phenyl, $C_3$-$C_{12}$cycloalkyl, $C_1$-$C_{12}$alkyl-cyclohexyl, $C_1$-$C_{12}$alkoxy-cyclohexyl; preferably Xb is $COOR_2$, phenyl, $R_8$-substituted phenyl, $C_3$-$C_{12}$cycloalkyl, $C_1$-$C_{12}$alkyl-cyclohexyl, $C_1$-$C_{12}$alkoxy-cyclohexyl;
Hal is $CF_3$ or fluoro;
$R_2$ is $C_1$-$C_8$alkyl;
$R_8$ is $C_1$-$C_{12}$alkyl, $C_1$-$C_{12}$alkoxy, $C_3$-$C_{12}$cycloalkyl, phenyl, $C_1$-$C_{12}$alkyl-phenyl, $C_1$-$C_{12}$alkyl-cyclohexyl, $C_1$-$C_{12}$alkoxy-cyclohexyl;
$R_{11}$ is pyrrolidinyl or piperidinyl or di($C_1$-$C_4$alkyl)amino or morpholinyl;
$R_{12}$ and $R_{13}$ independently are H; Hal; CN; $COOR_2$; $C_1$-$C_{12}$alkyl; $C_1$-$C_{12}$alkoxy; $C_1$-$C_{12}$alkylthio; phenyl; phenyl substituted by phenyl or $C_1$-$C_8$alkyl or cyclohexyl or $C_1$-$C_8$alkoxy or $C_1$-$C_8$alkylthio; $C_2$-$C_{12}$alkyl or $C_3$-$C_{12}$alkoxy or $C_3$-$C_{12}$alkylthio each of which is interrupted by O; $C_1$-$C_8$alkyl or $C_2$-$C_3$alkenyl or $C_1$-$C_8$alkoxy or $C_1$-$C_8$alkylthio each of which is substituted by CN or $COOR_2$ or phenyl or fluoro or $CF_3$; or $R_{12}$ and $R_{13}$ together are $C_3$-$C_4$alkylene;

$R_{14}$ is H; $CF_3$; CN; $COOR_2$; $C_1$-$C_{12}$alkyl; $C_1$-$C_{12}$alkoxy; $C_1$-$C_{12}$alkylthio; pyrrolidinyl; piperidinyl; di($C_1$-$C_4$alkyl)amino; morpholinyl; phenyl; phenyl substituted by phenyl or $C_1$-$C_8$alkyl or cyclohexyl or $C_1$-$C_8$alkoxy or $C_1$-$C_8$alkylthio; $C_2$-$C_{12}$alkyl or $C_3$-$C_{12}$alkoxy $C_3$-$C_{12}$alkylthio each of which is interrupted by O; $C_1$-$C_8$alkyl or $C_2$-$C_3$alkenyl or $C_1$-$C_8$alkoxy or $C_1$-$C_8$alkylthio each of which is substituted by CN or $COOR_2$ or phenyl or fluoro or $CF_3$;

$R_{15}$ is H; $CF_3$; $OCF_3$; CN; $COOR_2$; $C_1$-$C_{12}$alkyl; $C_1$-$C_{12}$alkoxy; $C_1$-$C_{12}$alkylthio; $C_1$-$C_{12}$alkyl-$SO_2$; pyrrolidinyl; di($C_1$-$C_4$alkyl)amino; morpholinyl; phenyl; phenyl substituted by phenyl or $C_1$-$C_8$alkyl or cyclohexyl or $C_1$-$C_8$alkoxy or $C_1$-$C_8$alkylthio or CN or $CF_3$ or $OCF_3$; $C_2$-$C_{12}$alkyl or $C_3$-$C_{12}$alkoxy $C_3$-$C_{12}$alkylthio each of which is interrupted by O; $C_1$-$C_8$alkyl or $C_2$-$C_3$alkenyl or $C_1$-$C_8$alkoxy or $C_1$-$C_8$alkylthio or $C_1$-$C_8$alkyl-$SO_2$ each of which is substituted by CN or $COOR_2$ or $COR_2$ or phenyl or fluoro or $CF_3$;

$R_{16}$ and $R_{17}$ independently are H, halogen, nitro, $C_1$-$C_{12}$alkyl, $C_1$-$C_{12}$alkoxy, with the proviso that a compound of formula

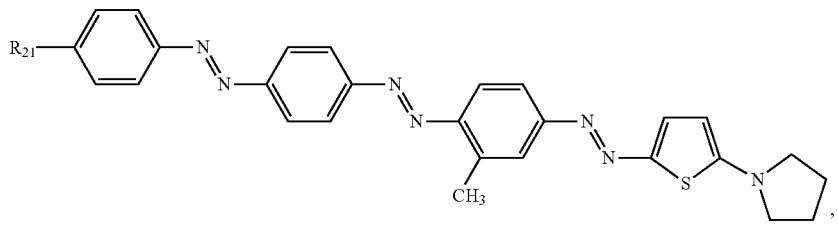

wherein $R_{21}$ is F, $CF_3$ or CN is excluded.

Among the dyes of formula B10, preferred ones conform to formula B11, B12 and/or B13

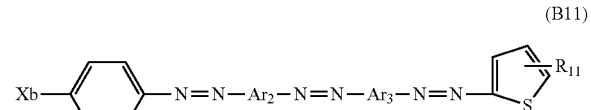
(B11)

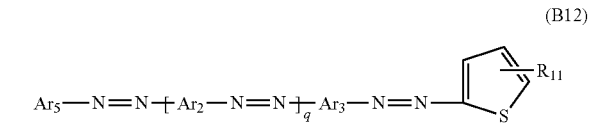
(B12)

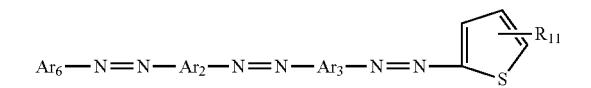
(B13)

wherein
q is 0 or 1;
Ar$_5$ is a heterocyclic residue of the formula

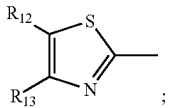

Ar$_1$ is a heterocyclic residue of one of the formulae

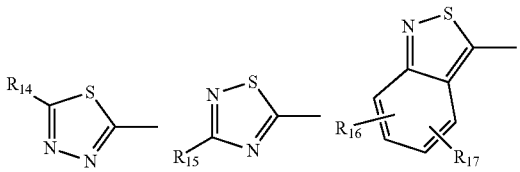

wherein
Xb is Hal, COOR$_2$, CN, phenyl, R$_8$-substituted phenyl;
Hal is CF$_3$ or fluoro;
R$_2$ is C$_1$-C$_8$alkyl;

R$_8$ is C$_1$-C$_8$alkyl, cyclohexyl, phenyl, C$_1$-C$_8$alkyl-phenyl, C$_1$-C$_8$alkyl-cyclohexyl;
R$_{11}$ is pyrrolidinyl or di(C$_1$-C$_4$alkyl)amino or morpholinyl;
R$_{12}$ and R$_{13}$ independently are H; Hal; CN; COOR$_2$; C$_1$-C$_8$alkyl; phenyl; phenyl substituted by phenyl or C$_1$-C$_8$alkyl or cyclohexyl or C$_1$-C$_8$alkoxy; C$_2$-C$_8$alkyl or C$_3$-C$_8$alkylthio each of which is interrupted by O; C$_1$-C$_8$alkyl or vinyl each of which is substituted by CN or COOR$_2$; or R$_{12}$ and
R$_{13}$ together are C$_3$-C$_4$alkylene;
R$_{14}$ is CF$_3$; CN; COOR$_2$; C$_1$-C$_8$alkyl; C$_1$-C$_8$alkoxy; C$_1$-C$_8$alkylthio; pyrrolidinyl; di(C$_1$-C$_4$alkyl)amino; morpholinyl; phenyl; phenyl substituted by phenyl or C$_1$-C$_8$alkyl; C$_2$-C$_8$alkyl interrupted by O; C$_1$-C$_8$alkyl or vinyl or C$_1$-C$_8$alkylthio each of which is substituted by CN or COOR$_2$ or phenyl or CF$_3$;
R$_{15}$ is CF$_3$, OCF$_3$; CN; COOR$_2$; C$_1$-C$_8$alkyl; C$_1$-C$_8$alkoxy; C$_1$-C$_8$alkylthio; C$_1$-C$_8$alkyl-SO$_2$; pyrrolidinyl; di(C$_1$-C$_4$alkyl)amino; morpholinyl; phenyl; phenyl substituted by phenyl or C$_1$-C$_8$alkyl; C$_2$-C$_8$alkyl interrupted by O; C$_1$-C$_8$alkyl or vinyl or C$_1$-C$_8$alkylthio or C$_1$-C$_8$alkyl-SO$_2$ each of which is substituted by CN or COOR$_2$ or phenyl or CF$_3$;
R$_{16}$ and R$_{17}$ independently are H, halogen, nitro; and
The other symbols are as defined for formula B10;
with the proviso that a compound of formula

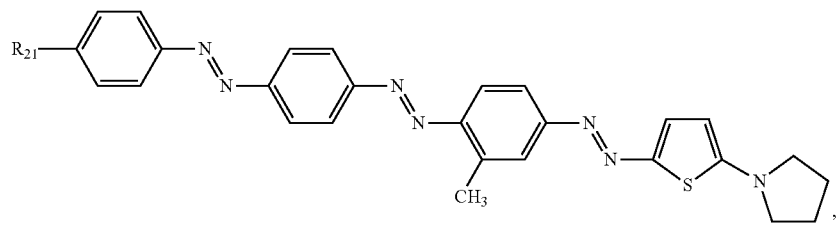

wherein R$_{21}$ is F, CF$_3$ or CN is excluded.

Preferably, at least one of Ar$_2$ and Ar$_3$ of formula B11 is 1,4-naphthylene.

Some examples for the novel blue dichroic dyes are the compounds listed below:

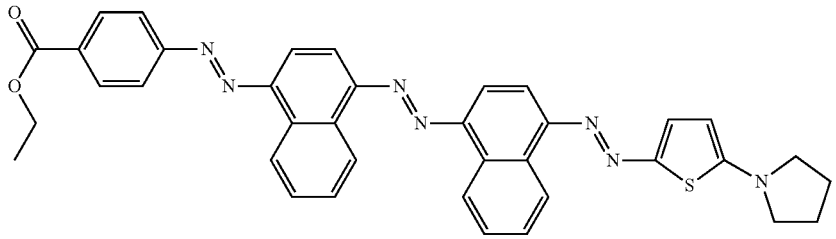

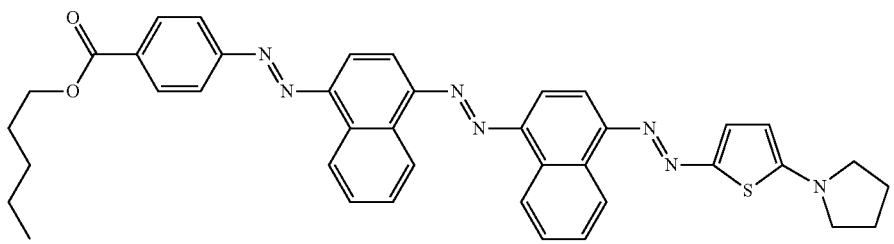

-continued
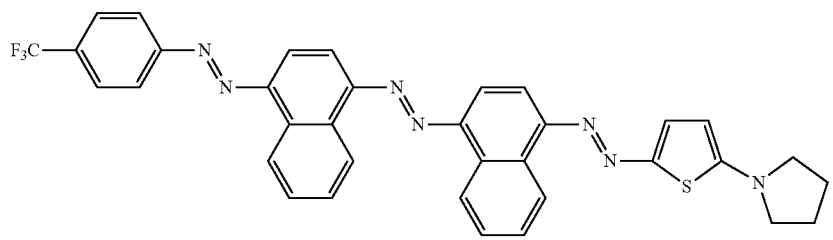
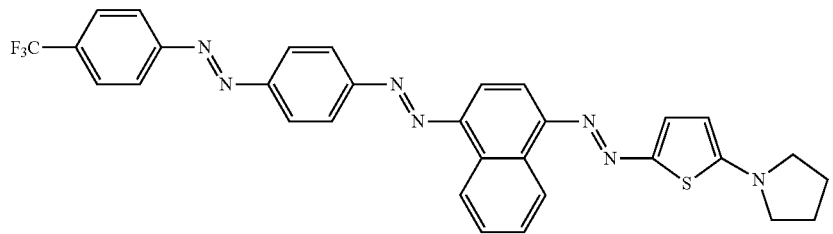
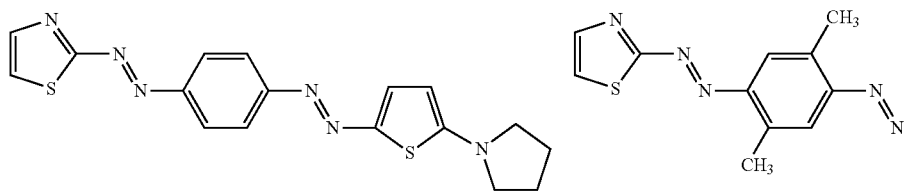
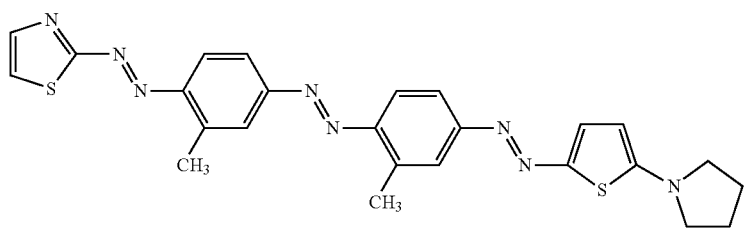
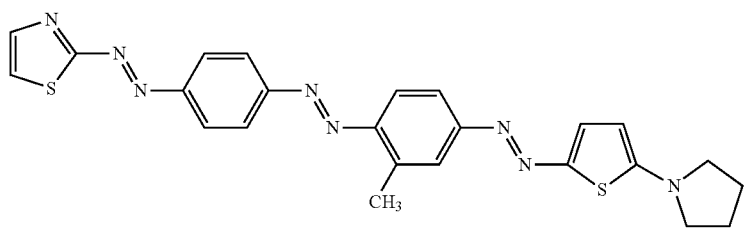
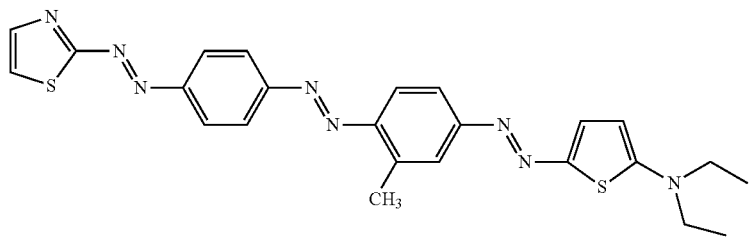
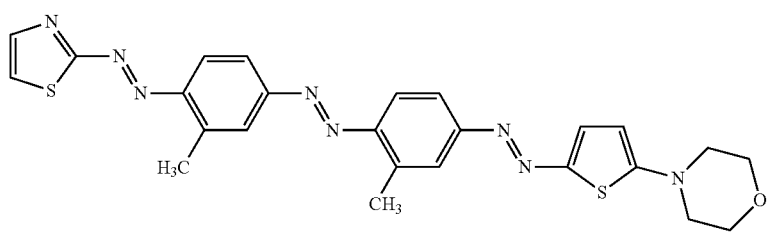

-continued
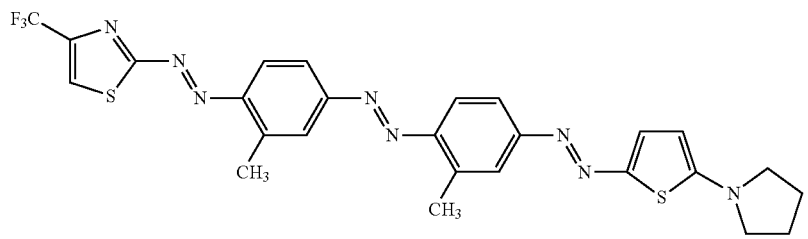
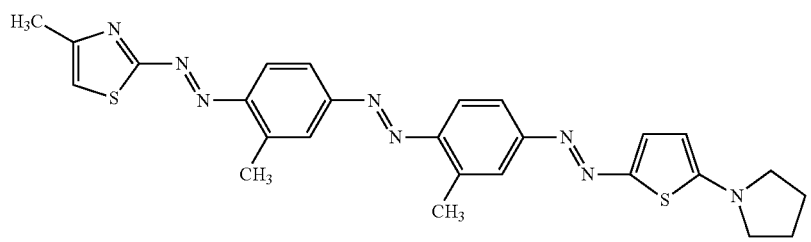
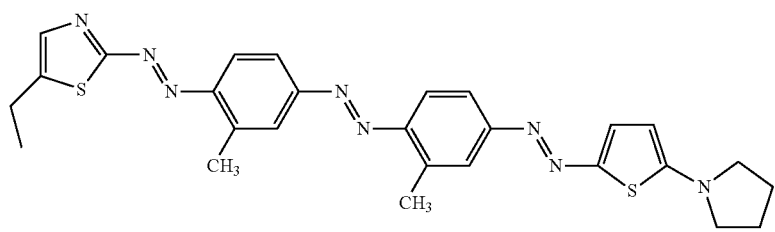
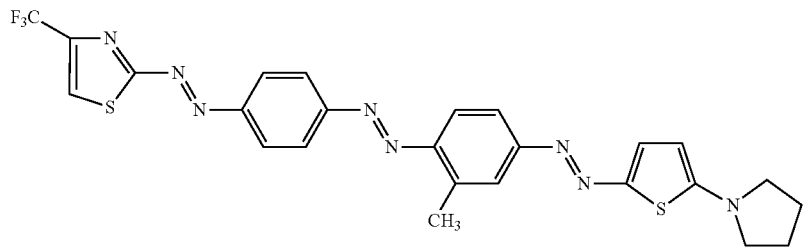
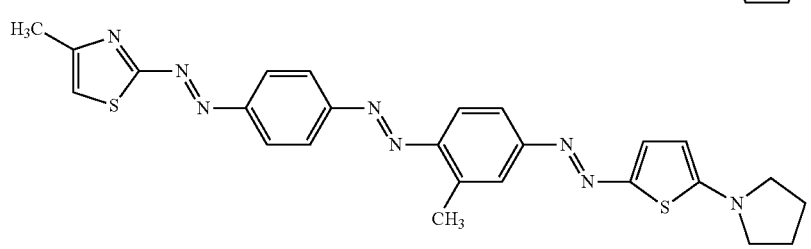
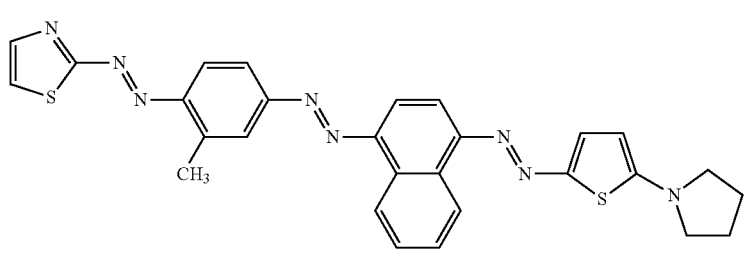
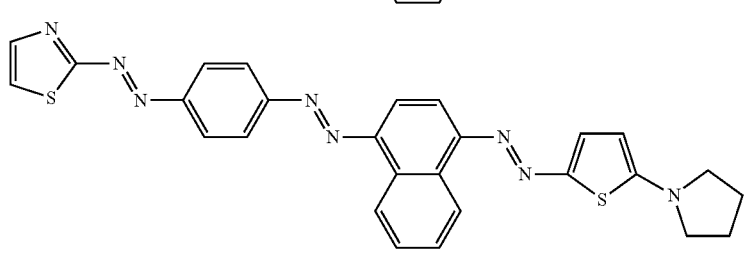

-continued
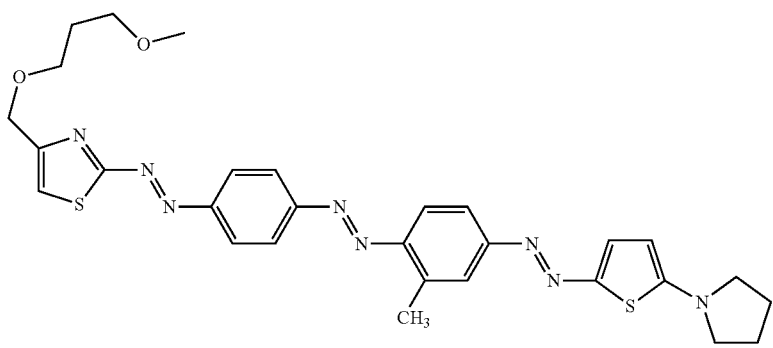
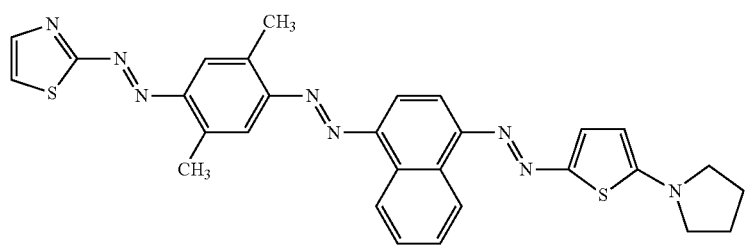
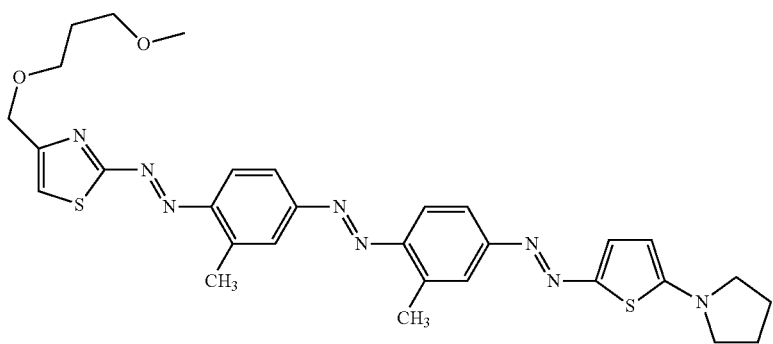
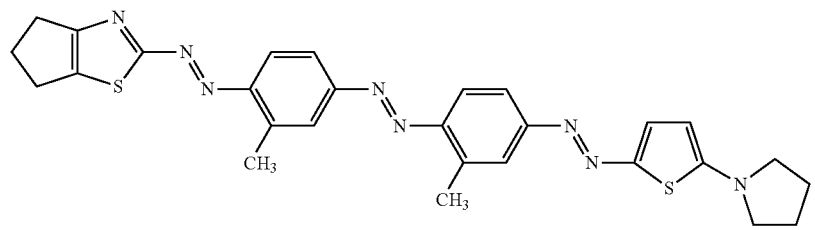
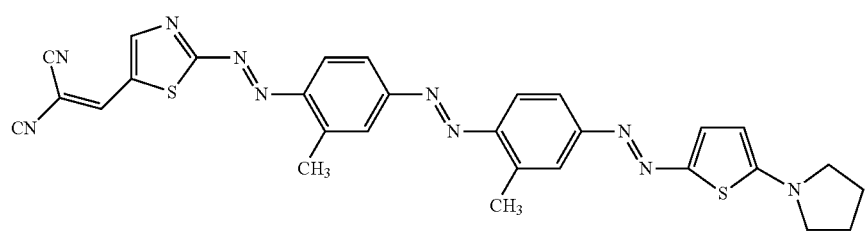

-continued
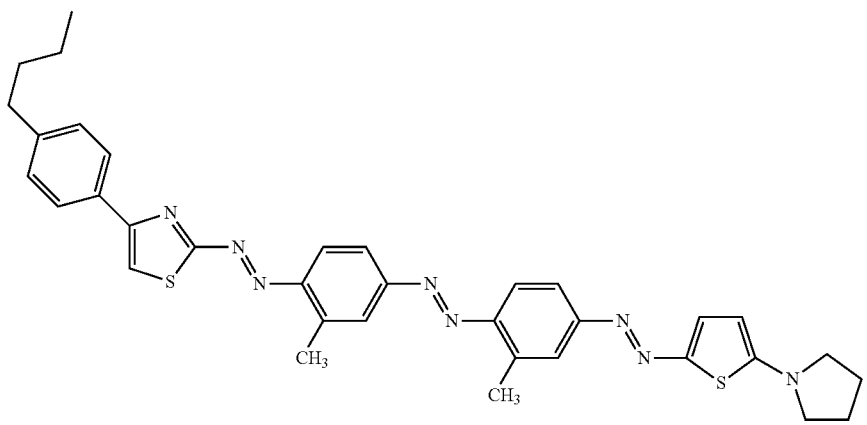
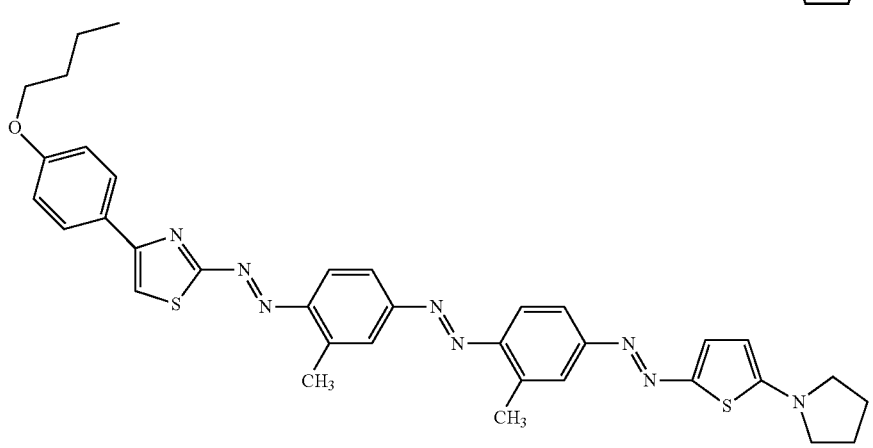
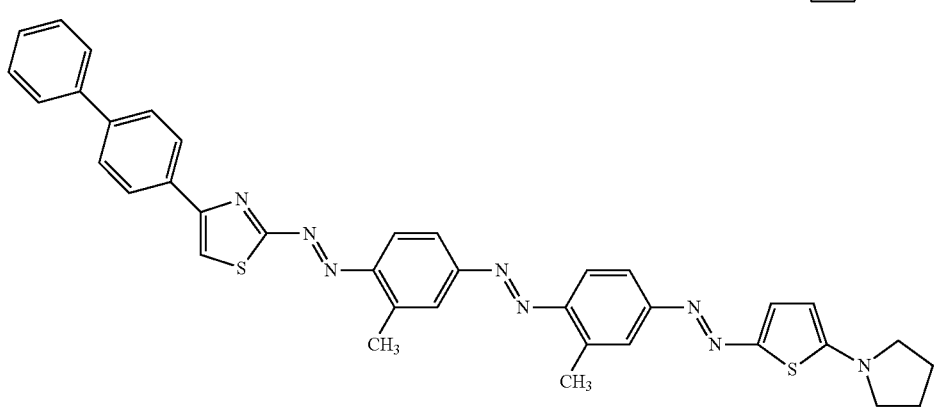
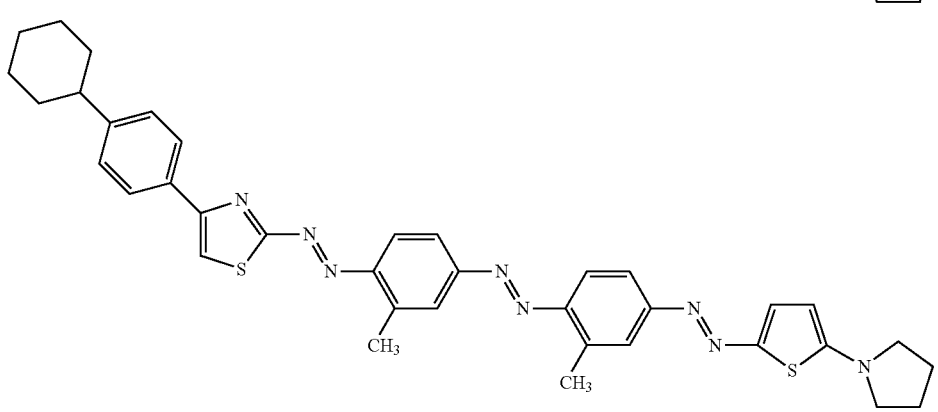

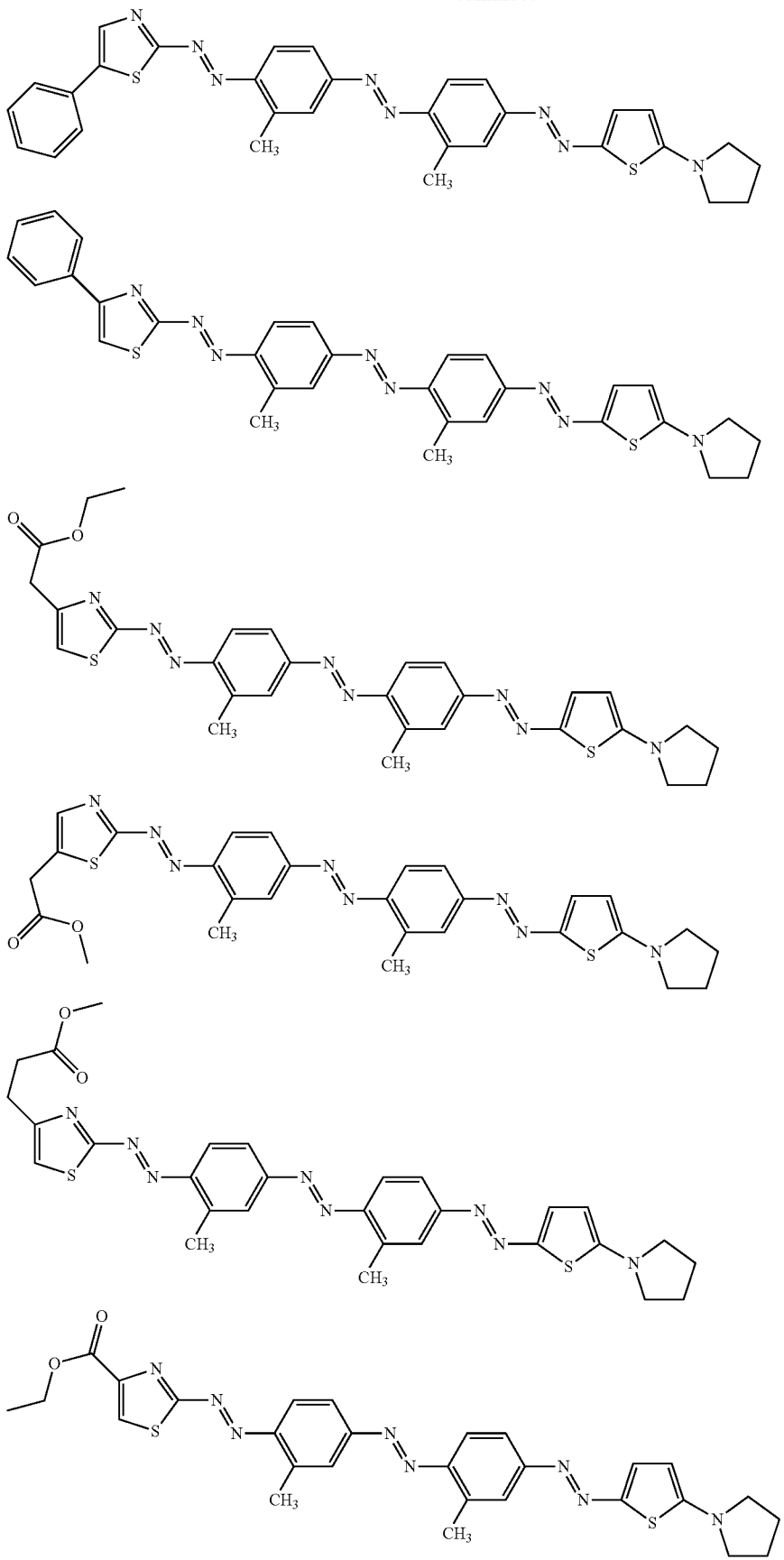

-continued
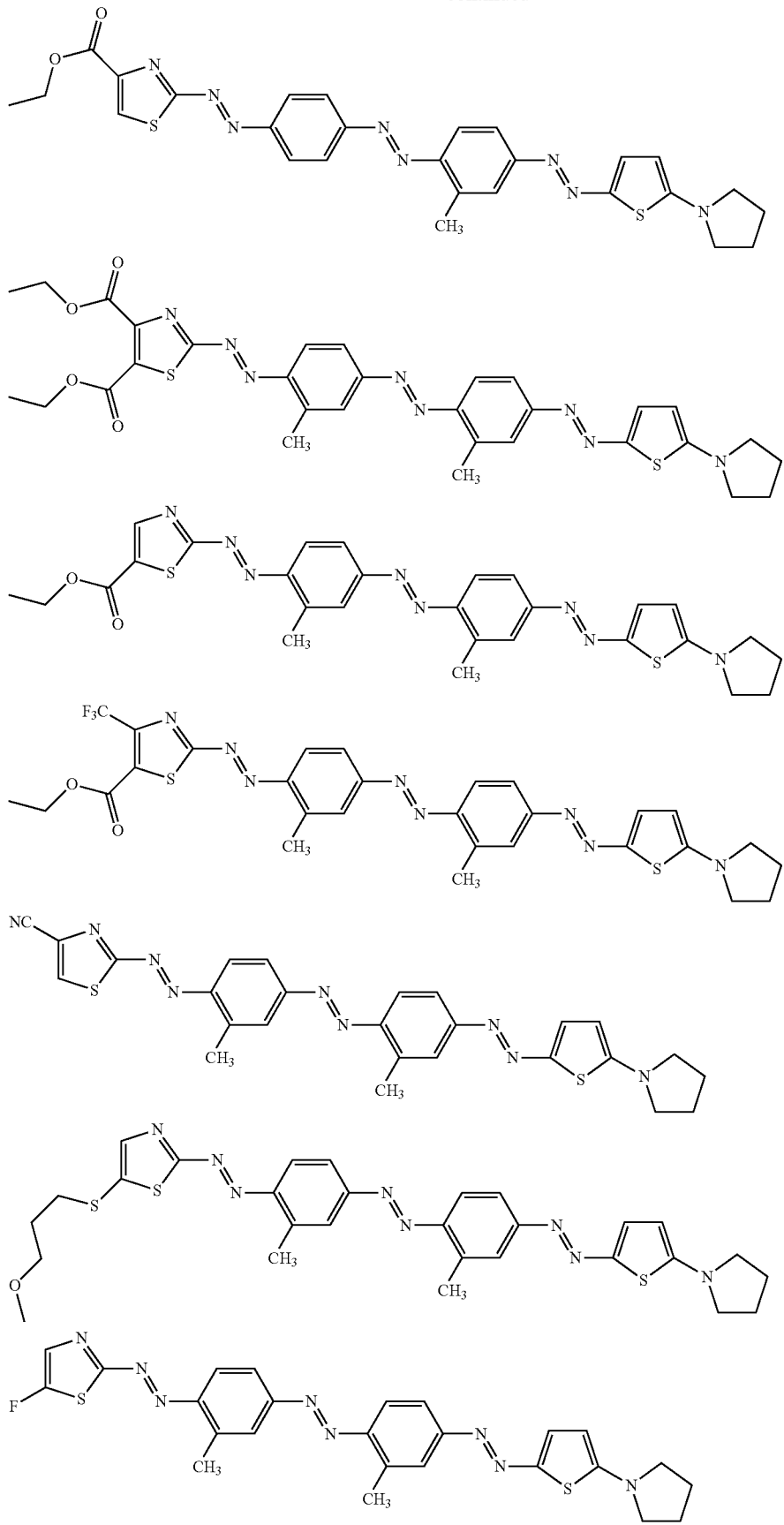

-continued
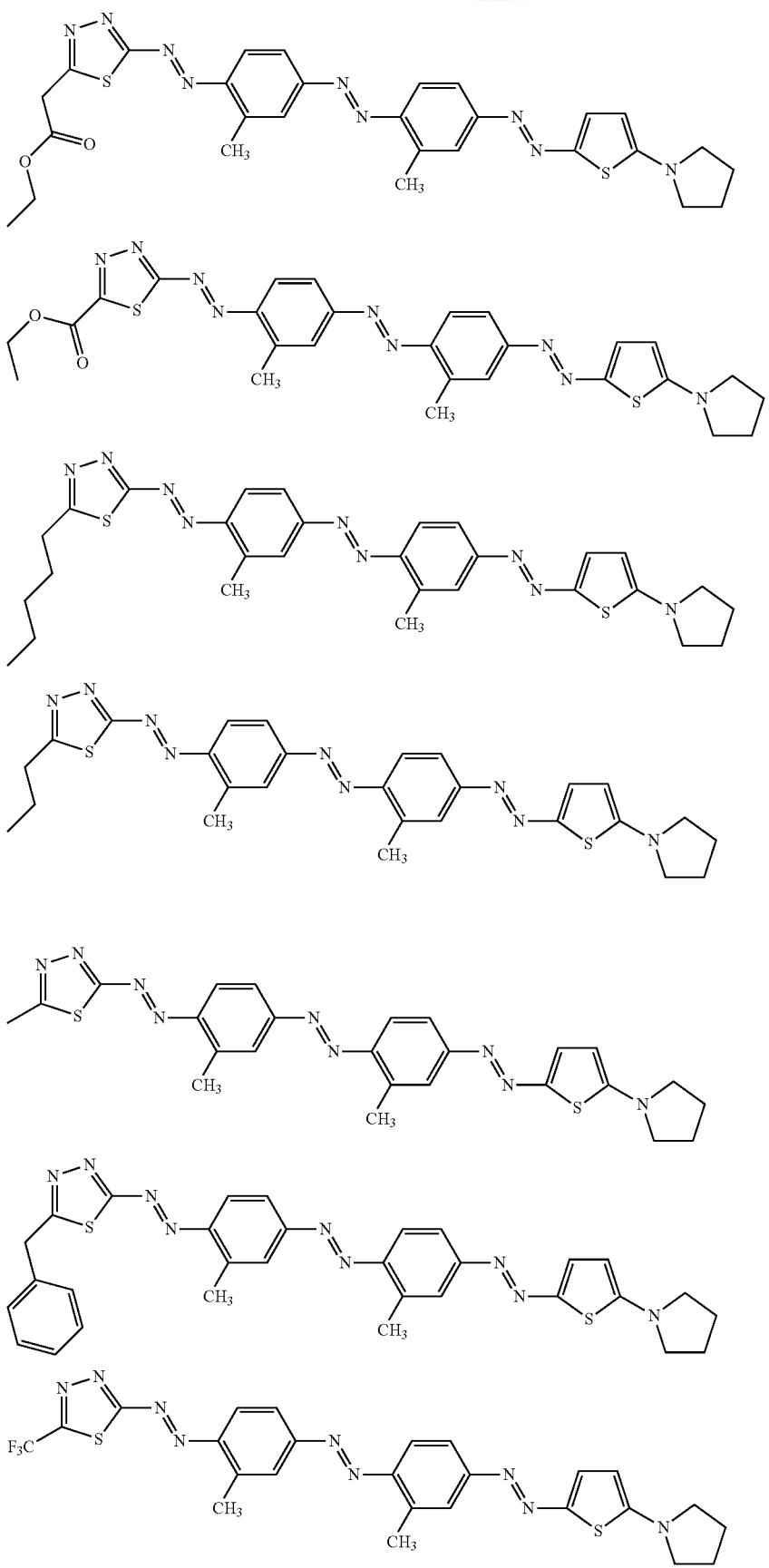

-continued
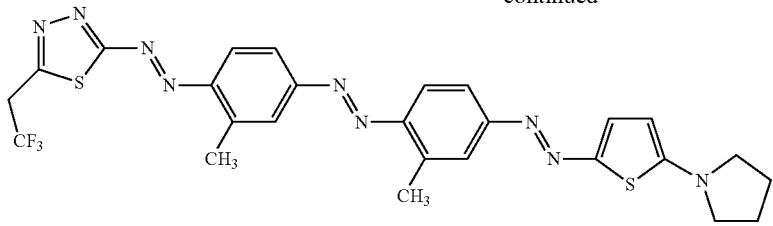
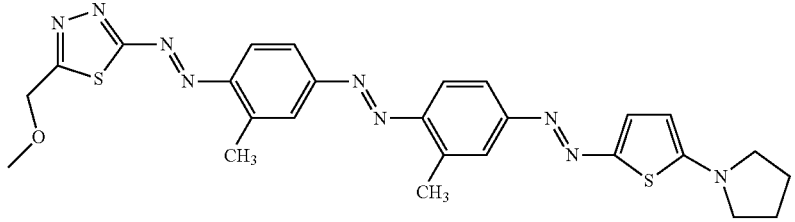
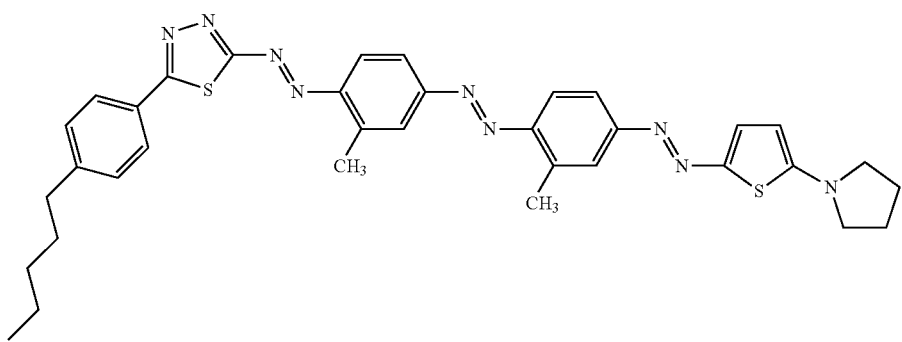
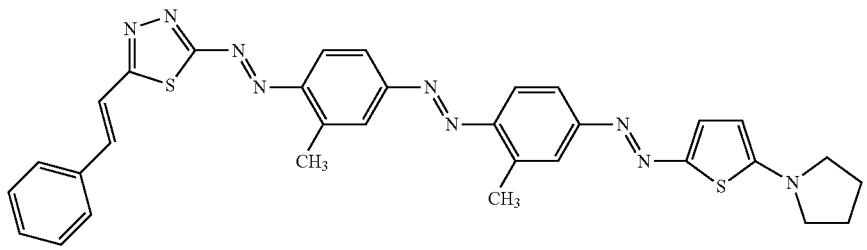
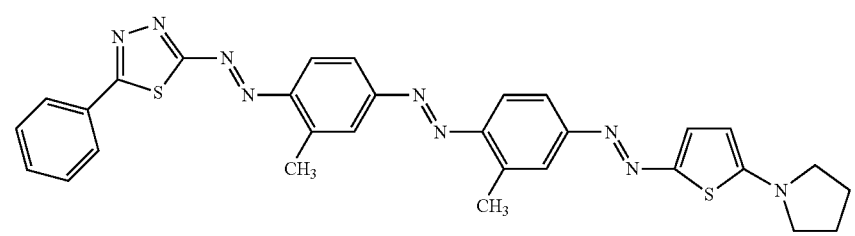
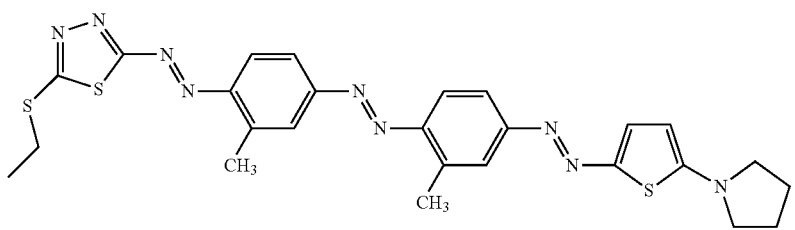

-continued
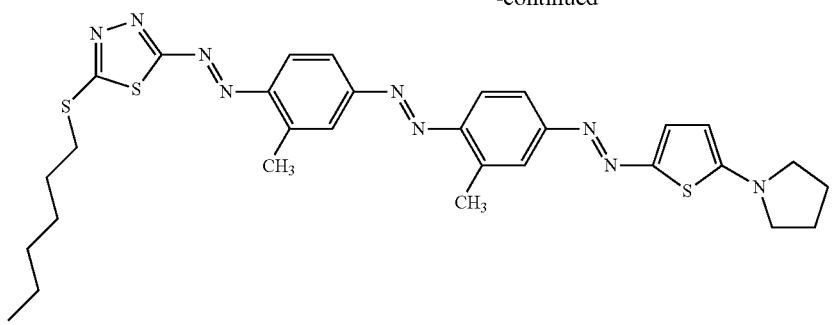
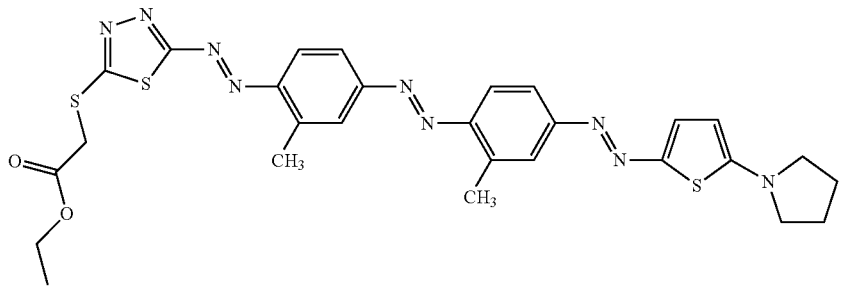
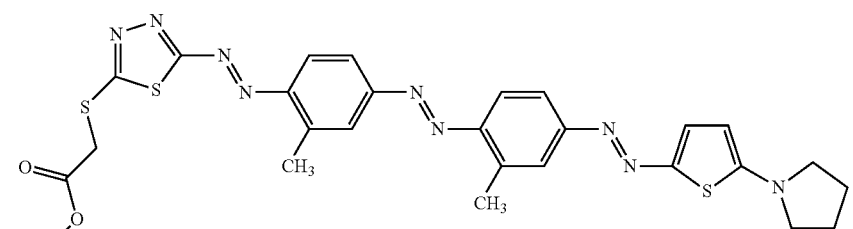
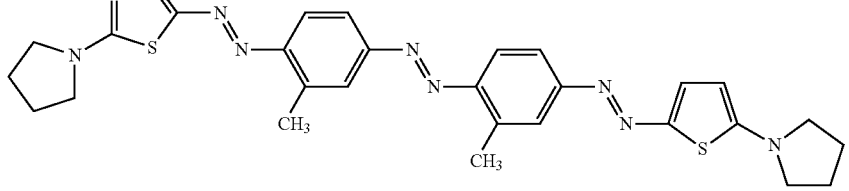
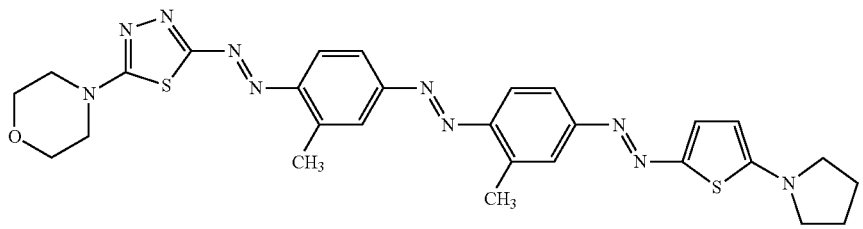
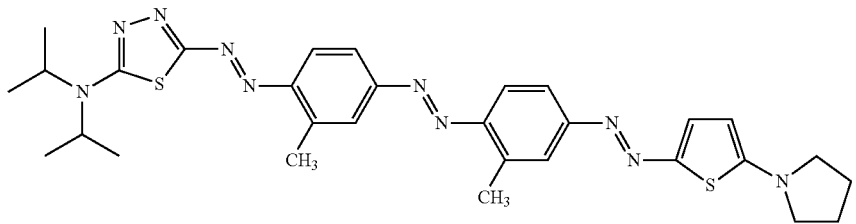

-continued
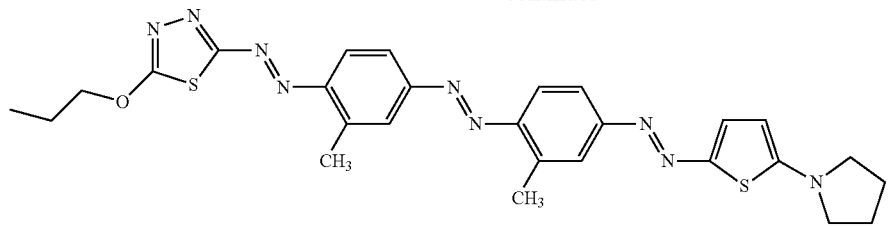
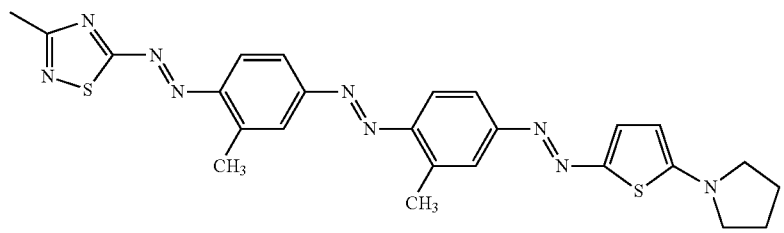
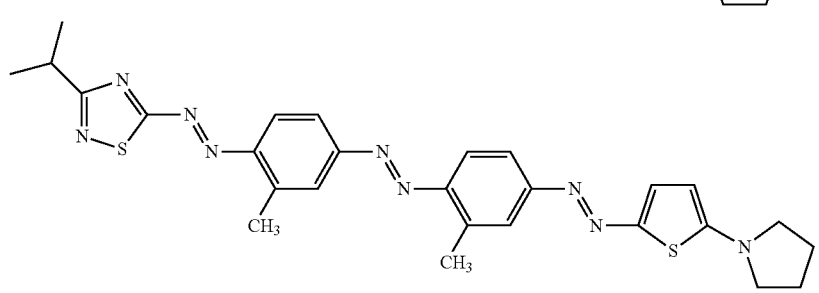
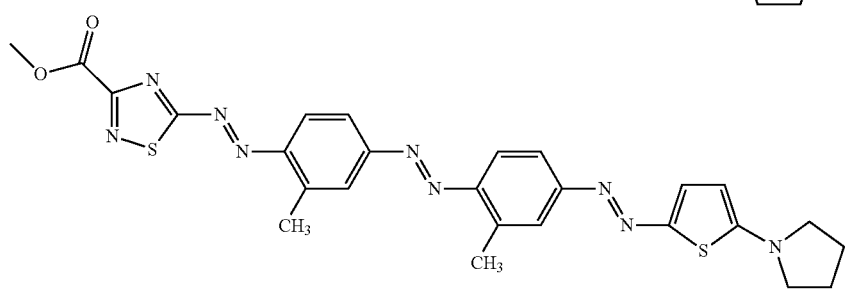
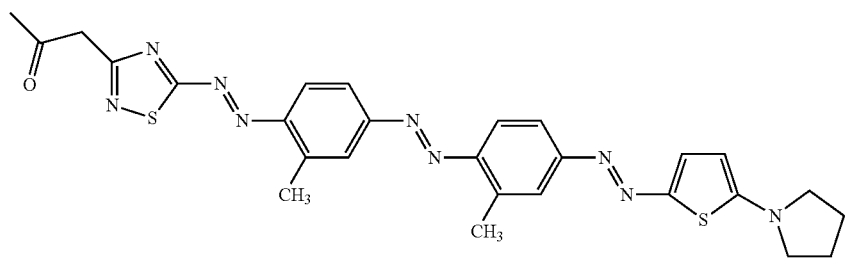
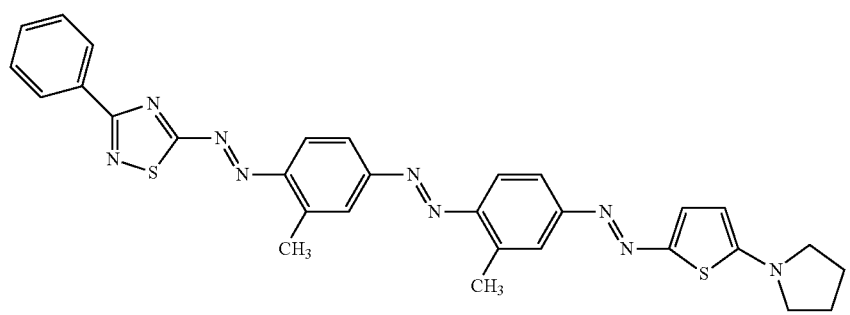

-continued
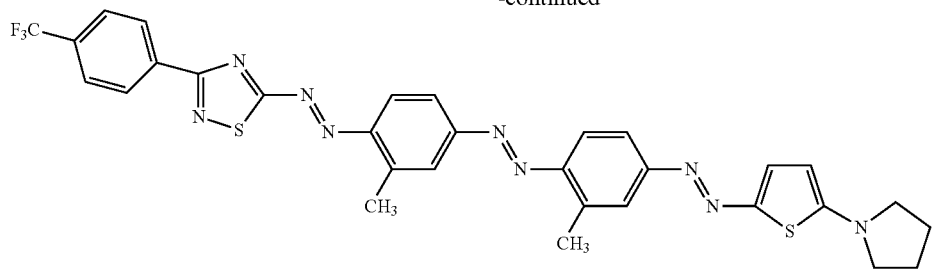
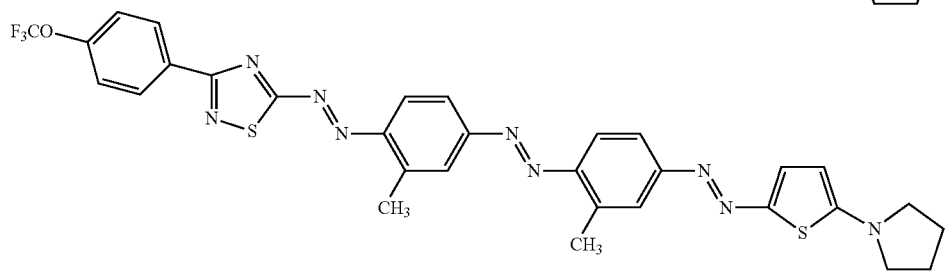
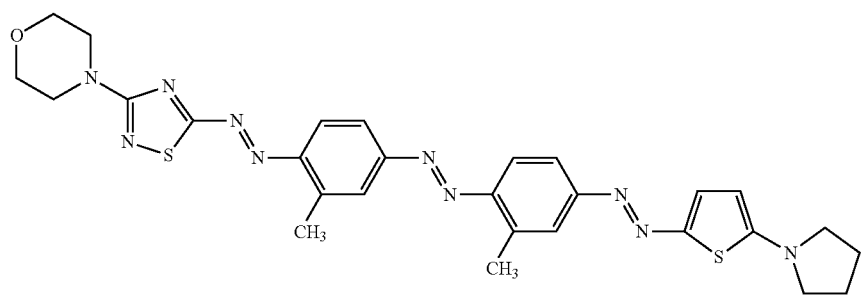
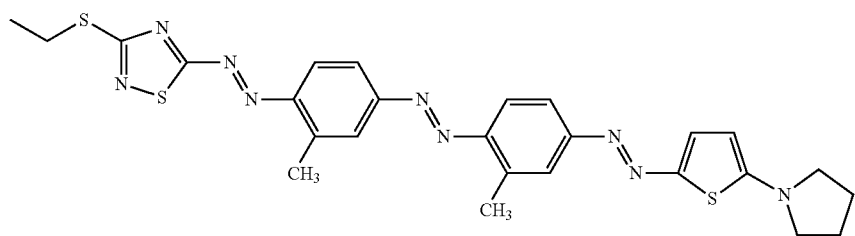
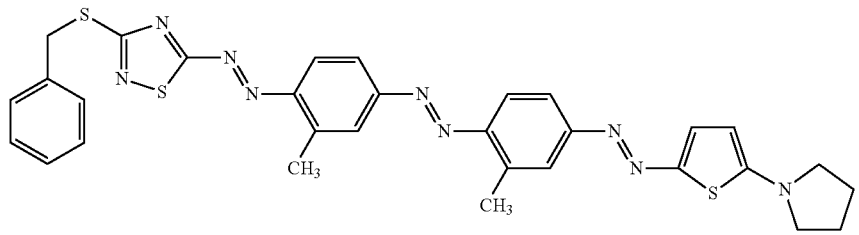
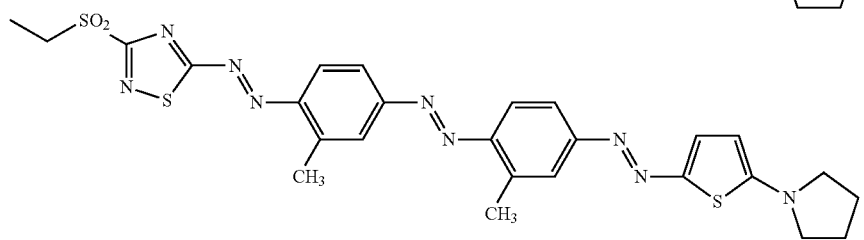

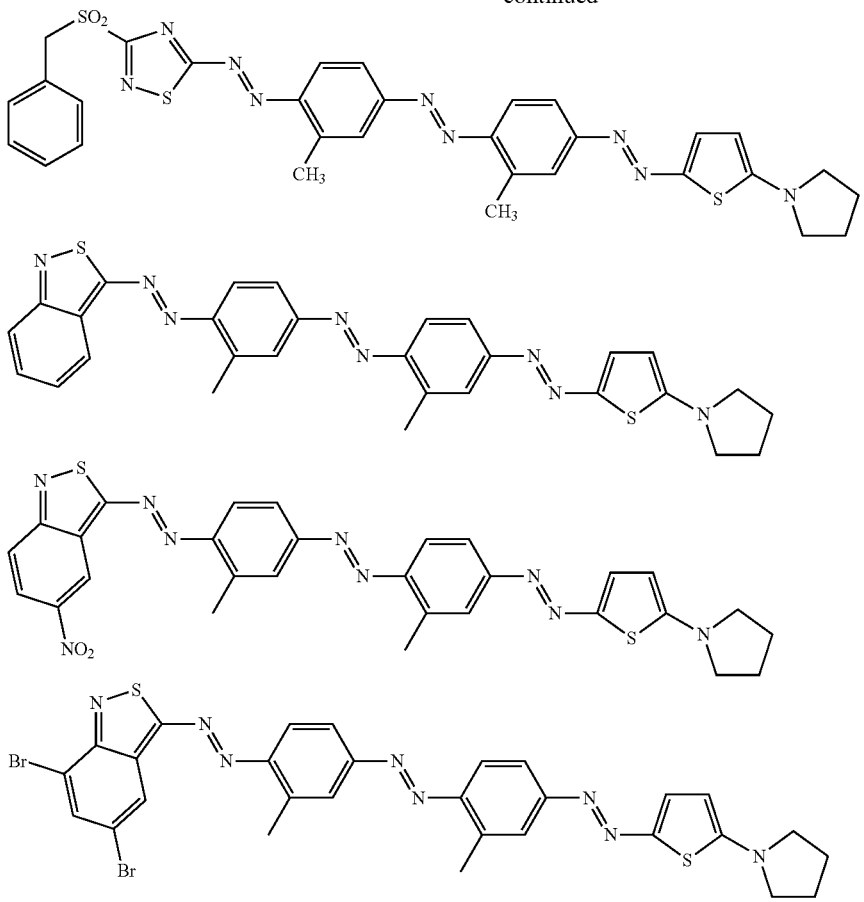

The following examples are included for illustrative purposes only and are not to be construed to limit the scope of the claims. Unless otherwise stated, all parts and percentages are by weight. Over night denotes a time period from about 12 to 15 hours; room temperature denotes a temperature range 18-23° C.; similarly ambient conditions, which also imply atmospheric pressure. Abbreviations:

| NBS | N-bromosuccinimide |
| THF | tetrahydrofuran |
| TBME | tert-butyl methyl ether |
| NMP | N-methylpyrrolidone |
| Mn | molecular weight (number average) |
| Mw | molecular weight (weight average) |
| PDI | polydispersity |

EXAMPLE 1

Compound 1a: 10 parts of 2-amino-thiazole are dissolved in 100 parts of HCl (32%). 100 parts of ice and 7 parts of sodium nitrite are added in small portions. After stirring for 3 hours at −5° to 0° C. 0.5 parts of sulfaminic acid are added.

Subsequently, 11 parts of m-toluidine are added, and the reaction mixture is stirred for 2 hours at 0-5° C. followed by adding 40 parts of sodium chloride and further stirring for 2 hours. The precipitate is filtered off and washed with 400 parts of a 20% aq. solution of sodium chloride. The filter cake is then suspended in 500 parts of slightly alkaline water (soda), filtered, washed until neutral and dried in vacuo at 50° C. 9.5 parts of compound 1a are obtained.

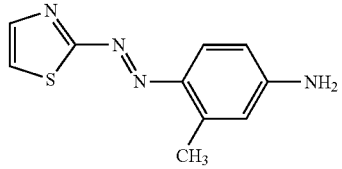

(Compound 1a)

Compound 1b: 4.36 parts of compound 1a are dissolved in 88 parts of THF. 2.9 parts of tetrafluoroboric acid solution (50% in water) are added, followed by 2.8 parts of tert-butylnitrite within 1 minute at 15° C. After stirring for 1.5 hours at 15° C. the precipitate is filtered and washed with tert-butyl methyl ether. The filter cake is then added to a solution of 2.4 parts of m-toluidine in 70 parts of methanol. After 60 minutes 6 parts of a 4N aq. solution of sodium acetate and then 30 parts of methanol are added. The dark red suspension is stirred overnight and filtered, and the residue is washed with 200 parts of methanol and dried at 60° C. 2.2 parts of a dark powder (compound 1b) are obtained.

(Compound 1b)

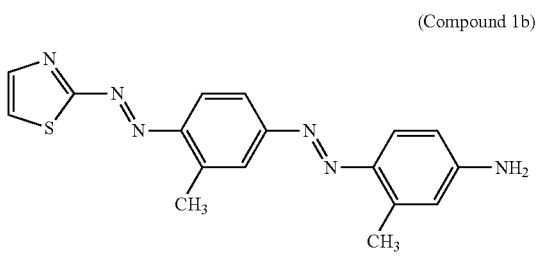

Compound 1c:

A) 1.1 parts of compound 1b are dissolved in 25 parts of N-methylpyrrolidone, and the solution is cooled to 0-5° C. 1 part of nitrosylsulfuric acid (40% in sulfuric acid) is added dropwise within 5 minutes resulting in a dark brown suspension (A) which is stirred for 1 hour.

B) 0.55 parts of 2-pyrrolidino-thiophene (prepared from 2-bromothiophene and pyrrolidine) are dissolved in 30 parts of a methanolic solution of sodium acetate (0.625 molar), and the solution is cooled to 0-5° C., followed by dropwise adding suspension (A) within 5 minutes. The resulting suspension is stirred for 2 hours at 0-5° C. and is then diluted with 25 parts of water. After filtration the crude product is washed with water and dried in vacuo at 50° C. 1.15 parts of compound 1c are further purified by column chromatography (silica; toluene/ethyl acetate).

(Compound 1c)

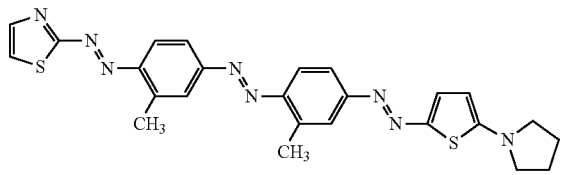

EXAMPLE 2

Compound 2a:

A) 15 parts of 2-amino-thiazole are dissolved in HCl (37%), 35 parts of ice are added, followed by 38 parts of a 4N solution of sodium nitrite. After 1.5 hours at −5° to 0° C. 0.5 parts of sulfaminic acid are added (solution A).

B) 38 parts of sodium phenylamino-N-methanesulfonate (82%) are dissolved in 200 parts water, and the solution is cooled to 0° C. (solution B). Solution A is slowly added within 0.5 hours to solution B; the pH is kept at 8.5 to 9 by adding sodium hydroxide (30%). After stirring for 3 hours at 5° C. the reddish brown suspension is filtered and washed with brine (15%). The filter cake is then transferred to 500 parts of a 1N solution of sodium hydroxide, stirred for 1 hour at 70° C. and kept overnight at room temperature. The precipitate is filtered off, washed with 800 parts of water and dried. 17.3 parts of compound 2a are obtained.

(Compound 2a)

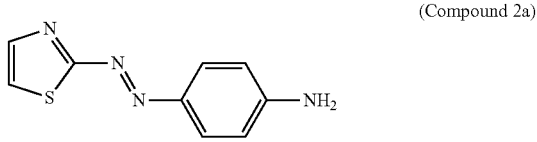 [SMILES: Nc1ccc(/N=N/c2nccs2)cc1]

Compound 2b: 15.3 parts of compound 2a are dissolved in 200 parts of NMP, and the solution is cooled to 0°-5° C. 24 parts of nitrosylsulfuric acid (40%) are added dropwise and stirred for 1.5 hours at 0-5° C. The resulting solution is added to a solution of 8 parts of m-toluidine in 200 parts of methanol at 0° C. with stirring. Stirring is continued overnight at a temperature finally raised to 15° C. The pH is subsequently raised to 12 by adding 50 parts of sodium hydroxide (30%), while the temperature is kept at 20° C. by addition of ice. Upon addition of 400 parts of water a sticky precipitate is formed which is filtered off and then dissolved in ethyl acetate. The solution is dried over sodium sulfate and evaporated to dryness. After column chromatography (silica gel; toluene/ethyl acetate), 2.7 parts of pure compound 2b are obtained.

(Compound 2b)

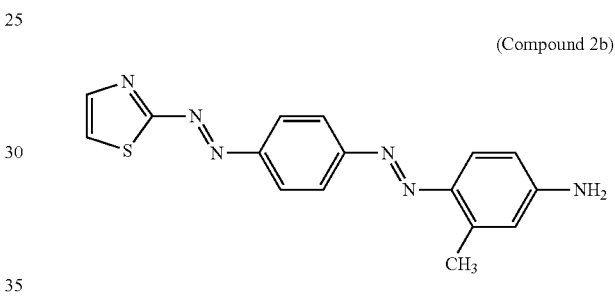

Compound 2c: 2.7 parts of compound 2b are dissolved in 50 parts of NMP, the solution is cooled to 0-5° C., and 2.6 parts of nitrosylsulfuric acid (40%) are added dropwise within 5 minutes. After stirring for 1.5 hours at 0-5° C., the solution is added slowly to a cooled (0° C.) solution of 1.3 parts of 2-pyrrolidino-thiophene in 50 parts of NMP and 5.5 parts of sodium hydroxide (30%). After stirring for 30 minutes the pH is raised to 7 by adding 1.5 parts of sodium hydroxide (30%). The reaction mixture is stirred for 2 hours at 5° C., diluted with 75 parts of water and filtered. The filter cake is washed with water and then suspended in 300 parts of methanol and stirred for 4 hours at room temperature. After filtration, rinsing with methanol and drying in vacuo, 2.5 parts of compound 2c are obtained.

(Compound 2c)

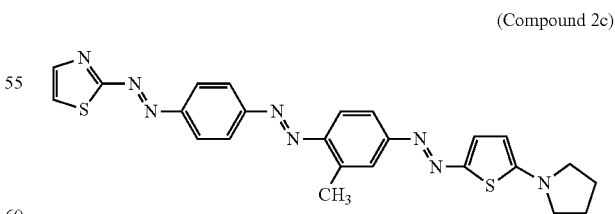

EXAMPLE 3

Compound 3a: 9.4 parts of compound 1a (Example 1) are dissolved in 180 parts of NMP, and the solution is cooled to 0-5° C. 13.7 parts of nitrosylsulfuric acid (40%) are added dropwise within 20 minutes. The resulting brown suspension is stirred for 1 hour at 0-5° C. and then added to a solution of 6.15 parts of 1-naphthylamine in 150 parts of methanol. After stirring for 2 hours at 0-5° C. 26 parts of sodium hydroxide (30%) are added dropwise within 10 minutes, followed by 110 parts of water. The precipitate is filtered off, washed with 500 parts of water and dried at 50° C. The crude product (19.3 parts) is suspended in 500 parts of water, stirred for 2 hours, filtered, washed with 500 parts of water and dried in vacuo at 50° C. for 18 hours: 12.6 parts of compound 3a.

EXAMPLE 4

Compound 4a: 9 parts of compound 2a (example 2) are dissolved in 180 parts of NMP, and the solution is cooled to 0-5° C. 14.5 parts of nitrosylsulfuric acid (40%) are added dropwise and stirred for 1 hour at 0-5° C. 6.4 parts of 1-naphthylamine (dissolved in 180 parts of methanol, cooled to 0°-5° C.) are added within 5 minutes, and the reaction mixture is stirred for 3 hours at 0°-5° C. 28 parts of 2N sodium hydroxide are added dropwise within 15 minutes, followed by 350 parts of water. The precipitate is filtered, washed thoroughly with water and dried at 50° C.: 11.8 parts of compound 4a.

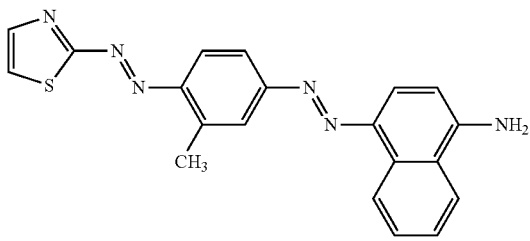
(Compound 3a)

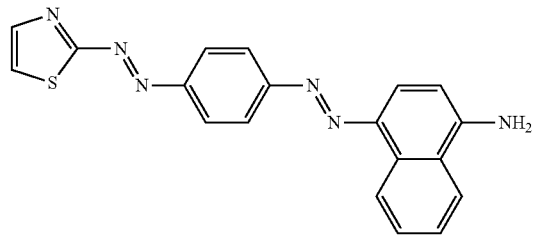
(Compound 4a)

Compound 3b: 22.2 parts of compound 3a are dissolved in 220 parts of NMP, and the solution is cooled to 0°. 19 parts nitrosylsulfuric acid are added dropwise within 10 minutes and stirred for 2 hours. 12 parts of 1-(N-2-butylamino)-naphthalene are added and stirred for 3 hours at 5° C., 220 parts of water are added and the pH is raised to 7-8 by adding 30 parts of sodium hydroxide (30%). The precipitate is filtered, washed with 1000 parts of water and dried at 50° C. 28.1 parts of crude product 3b are obtained which is recrystallized from toluene/2-propanol.

Compound 4b: 14.4 parts of compound 4a are dissolved in 290 parts of NMP, and the solution is cooled to 0-5° C. 12.7 parts of nitrosylsulfuric acid (40%) are added dropwise within 10 minutes and stirred for 2.5 hours at 0-5° C. 8 parts of 1-(N-2-butylamino)-naphthalene are added. After adding 100 parts of 2N sodium hydroxide and subsequently 80 parts of water, the precipitate is filtered and washed with 1000 parts of water. The filter cake is suspended in 700 parts of methanol and stirred overnight at room temperature. After filtration, the residue is washed with 1000 parts of methanol and dried at 50° C.: 17.8 parts of crude product. Recrystallization from toluene/2-propanol yields 13 parts of pure compound 4b.

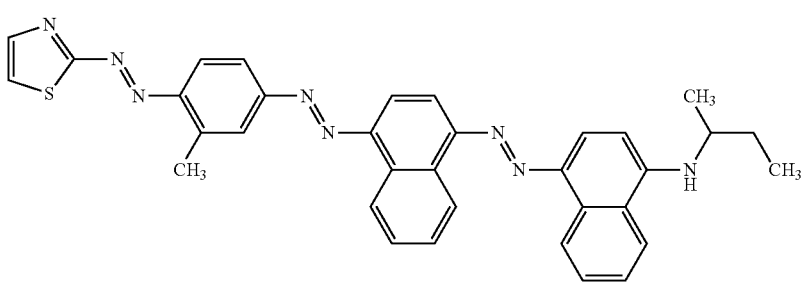
(Compound 3b)

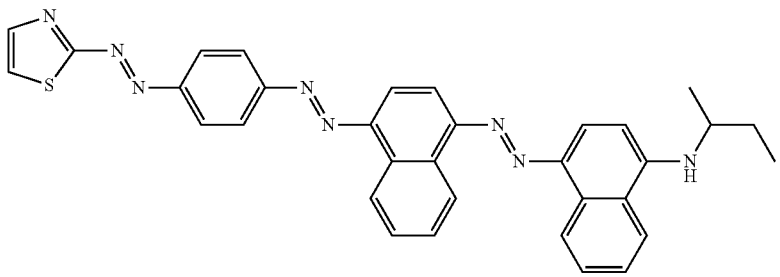
(Compound 4b)

EXAMPLE 5

Compound 5a: 10 parts of 2-amino-thiazole are dissolved in 100 parts of HCl (32%). Then, 100 parts of ice and 7 parts of sodium nitrite are added in small portions and stirred for 3 hours at −5° to 0° C. 0.5 parts of sulfaminic acid are added.

Subsequently 11 parts of o-toluidine are added, and the reaction mixture is stirred overnight at 0° C. to room temperature. After adding 40 parts of sodium chloride and further stirring for 3 hours the precipitate is filtered off. The filter cake is then suspended in 250 parts of water, the pH is raised to 8.5 by adding 22 parts of 2N sodium hydroxide. The resulting mass is suspended in 250 parts of dichloromethane, stirred at room temperature for 2 hours, filtered and washed with further dichloromethane (orange solution). The residue is then suspended in 400 parts of 4N sodium hydroxide, stirred at room temperature and filtered. The filter cake is dissolved in dichloromethane, and the orange solution is dried over sodium sulfate. The combined orange dichloromethane solutions are purified over silica gel and evaporated to dryness. After drying in vacuo at 50° C., 3.9 parts of an orange powder (compound 1a) are obtained.

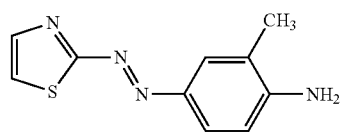
(Compound 5a)

Compound 5b: Proceeding with compound 5a in analogy to example 3 (compound 3a) yields compound 5b:

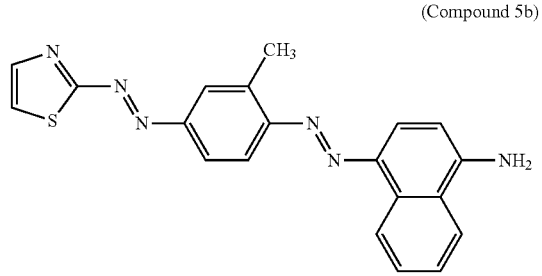 [SMILES: Cc1cc(/N=N/c2nccs2)ccc1/N=N/c1ccc(N)c2ccccc12]
(Compound 5b)

Compound 5c: Proceeding like in example 3 but using compound 5b instead of compound 3a yields dyestuff 5c:

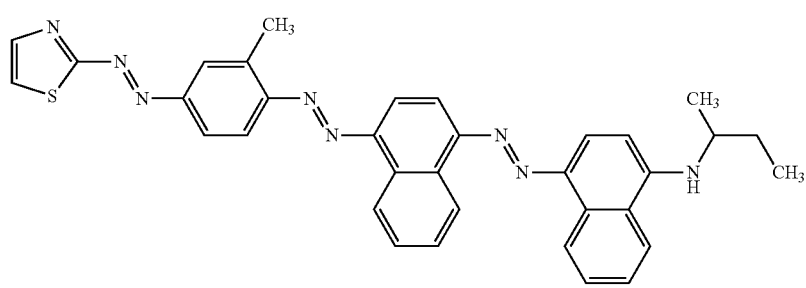
(Compound 5c)

EXAMPLE 6

Compound 6a: 75 parts of 4N sodium nitrite are added with 50 minutes to a suspension of 48.6 parts of 4-trifluoromethyl-aniline in 190 parts of 1N HCl and 560 parts of ice and stirred for 2 hours at 5° C. 0.5 parts of sulfamic acid are added, and the solution is filtered. The filtered solution is then added dropwise to a cooled (5° C.) solution of 60 parts of sodium phenylamino-N-methanesulfonate and 57 parts of sodium hydrogen carbonate in 450 parts of water and stirred for 2 hours at 10° C. and overnight at room temperature. The reaction mass is filtered, and the residue is washed with 350 parts of brine (25%). The crude product is transferred to 800 parts of warm water (70° C.), 100 parts of sodium hydroxide (30%) are added dropwise within 10 minutes and stirred for 3.5 hours at 70-75° C. The reaction mass is filtered at 60° C., washed neutrally with 5000 parts of water. Drying at 35° C. in vacuo yields 72.5 parts of orange-yellow product 6a.

(Compound 6a)

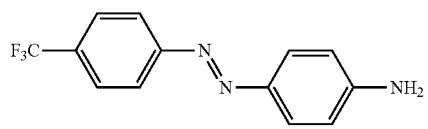

Compound 6b:

A) 10.6 parts of compound 6a are dissolved in 50 parts of NMP, and 50 parts of 2N HCl are added thereto. After cooling to 0-5° C. 10 parts of 4N sodium nitrite are added dropwise within 10 minutes. Diazotation is completed by stirring for 30 minutes at 0-5° C. (solution A).

B) 5.8 parts of 1-naphthylamine are dissolved in 20 parts of NMP, and 20 parts of 2N HCL are added thereto. The solution is cooled to 5° C., and solution A is added over 5 minutes and stirred for 1 hour at 5-7° C. The reaction mixture is filtered, and the residue is transferred into a beaker and suspended in slightly alkaline water (500 parts). After filtration the residue is washed neutrally with water and dried in vacuo at 50° C. The crude product (12.2 parts) is recrystallized (toluene/hexane): 7.1 parts of pure compound 6b.

(Compound 6b)

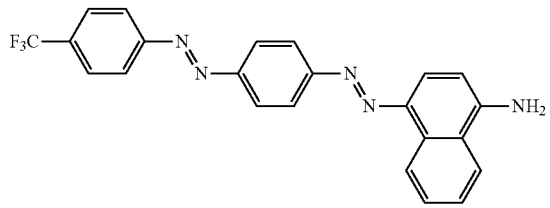

Compound 6c: 62 parts of compound 6b are dissolved in 1400 parts of NMP and the solution is cooled to 0° C. 47 parts of nitrosylsulfuric acid (40%) are added dropwise within 10 minutes and stirred for 1.5 hours at 0° C. 29.7 parts of 1-(N-2-butylamino)-naphthalene are added, and stirring is continued for 1.5 hours at 0-5° C. 275 parts of 4N sodium acetate are then added dropwise within 15 minutes. After stirring for 45 minutes at 5° C. 300 parts of water are added within 15 minutes. After stirring for 1 hour at 10-15° C. the reaction mass is filtered. The residue is washed with 2000 parts of water/methanol (1:1) and then with 2000 parts of water. The filter cake is transferred into a beaker and stirred for 1 hour with 1400 parts of methanol. After filtration the filter cake is washed with 1200 parts of methanol and dried in vacuo at 50° C.: 74 parts of compound 6c.

(Compound 6c)

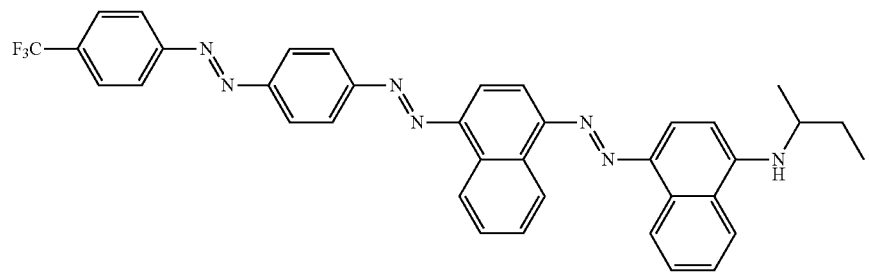

EXAMPLE 7

Compound 7a: 8.1 parts of 4-trifluoromethyl-aniline are added to 75 parts 2N HCl. 13 parts of 4N sodium nitrite are added within 30 minutes, and diazotation is completed by stirring at 5° C. for 1 hour (solution A).

7.4 parts of 1-naphthylamine are dissolved in 75 parts of ethanol, and 75 parts of water are added. After cooling to 0-5° C. solution A is added within 10 minutes. After 1 hour at 0-5° C. 50 parts of 4N sodium acetate are added, and the temperature is raised to room temperature. 120 parts of water are added, the reaction mixture is filtered, and the residue is washed with 750 parts of water and dried at 50° C. 14.9 parts of product 7a are obtained.

(Compound 7a)

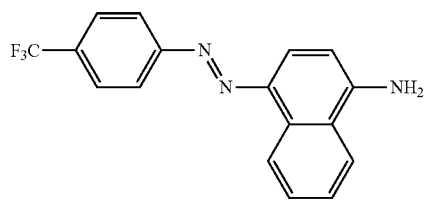

Compound 7b: 4.8 parts of compound 7a are dissolved in 120 parts of THF, the solution is cooled (0-5° C.), and 3 parts of tetrafluoroboric acid (50%) are added. 2.7 parts of tert-butylnitrite are added dropwise within 1 minute and the resulting is stirred for 2 hours at 0-15° C. The resulting precipitate is filtered and washed with 60 parts of diethylether. The moist filter cake is transferred to a cooled solution (5° C.) of 2.2 parts of 1-naphthylamine in 80 parts of methanol and the mixture is stirred for 1 hour at 5-15° C. The precipitate is filtered, washed with 150 parts of methanol and dried in vacuo: 2.94 parts of compound 7b.

(Compound 7b)

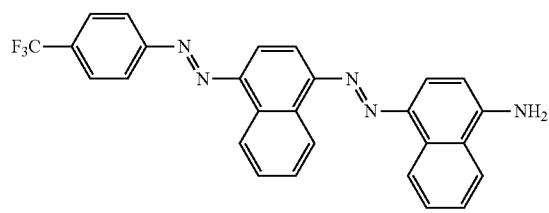

Compound 7c: 2.94 parts of compound 7b are dissolved in 60 parts of NMP. 2.0 parts of nitrosylsulfuric acid (40%) are added within 2 minutes to the cooled solution (0-5° C.). Further 30 parts of NMP are added to the viscous reaction mass. After 1 hour at 0-5° C. 1.25 parts of 1-(N-2-butylamino)-naphthalene are added, and after a further hour at 0-5° C. 10 parts of 4N sodium acetate and subsequently 150 parts of water are added. The coupling reaction is completed by stirring for 1 hour at room temperature. The precipitate is filtered, washed with 150 parts of water and dried in vacuo at 50° C.: 3.71 parts of crude product 7c which can be purified by column chromatography (silica; hexane/toluene) and recrystallization (toluene/hexane).

EXAMPLE 8

Compound 8a: 20.4 parts of 4-aminobiphenyl are suspended in 400 parts of 2N HCl, and the suspension is cooled to 5° C. 31.2 parts of sodium nitrite are added within 1 hour. After 2 hours at 5° C. the solution is filtered (solution A).

17.2 parts of 1-naphthylamine are dissolved in 480 parts of water/ethanol (1:1) and the solution is cooled to 0-5° C. Solution A is then added within 20 minutes leading to a viscous reaction mixture which is diluted with 200 parts of water/ethanol. After 1 hour at 0-5° C. 160 parts of 4N sodium acetate are added, and the temperature is raised to room temperature. Stirring at room temperature is continued overnight. The reaction mass is filtered, and the filter cake is suspended in 1500 parts of water. By adding of 4N sodium hydroxide the pH is raised to 8-9. The precipitate is filtered, washed with water and dried at 50° C.: 33.75 parts of compound 8a.

(Compound 8a)

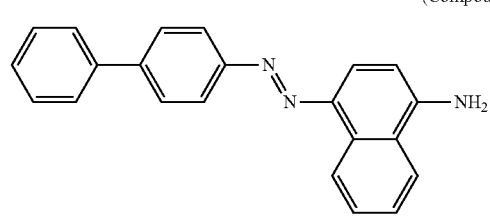

Compound 8b: 21.0 parts of compound 8a are dissolved in 450 parts of sulfolane, 20.8 parts of nitrosylsulfuric acid are added within 30 minutes, and the reaction mixture is stirred for 2 hours at 18-20° C. (solution A).

9.3 parts of 1-naphthylamine are dissolved in 260 parts of water/ethanol (1:1). The solution is cooled to 0-5° C., and solution A is added within 20 minutes. After 1 hour at 0-5° C. 80 parts of 4N sodium acetate are added, and the temperature is raised to room temperature. The precipitate formed is filtered and washed with 500 parts of ethanol/water (1:1) and then with 1000 parts of water. The filter cake is suspended in 1000 parts of methanol, and the suspension is stirred for 1 hour at room temperature. After filtration 22.6 parts of a black powder (compound 8b) are obtained.

(Compound 7c)

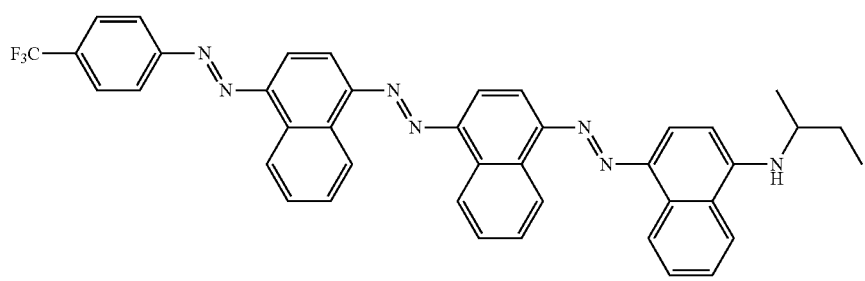

(Compound 8b)

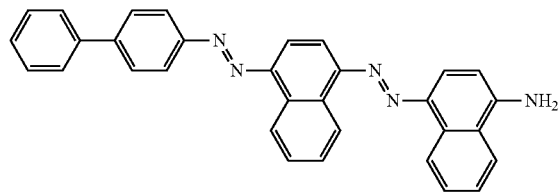

(Compound 9a)

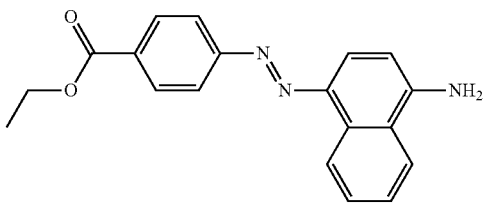

Compound 8c: 7.4 parts of compound 8b are dissolved in 75 parts of NMP, and the solution is cooled to 0-5° C. 4.9 parts of nitrosylsulfuric acid (40%) are added dropwise within 7 minutes while the temperature is kept at 5° C. After stirring for 15 minutes at 5° C. 3 parts of 1-(N-2-butylamino)-naphthalene are added, and stirring is continued for 4 hours at 10° C. After filtration the residue is washed with 100 parts of 2-propanol/water (1:1) and dried in vacuo at 50° C.: 8.9 parts of compound 8c.

Compound 9b: 11.4 parts of compound 9a are dissolved in 250 parts of THF. After cooling to 0-5° C. 7.2 parts of tetrafluoroboric acid (50%) and subsequently 6.4 parts of tert-butyl nitrite are added. After 2 hours at 0-15° C. the residue is filtered off and washed with 150 parts of diethylether. The moist filter cake is transferred to a cooled solution (5° C.) of 5.2 parts of 1-naphthylamine in 200 parts of methanol. After 1 hour at 5-15° C. the reaction mixture is filtered, and the (Compound 8c)

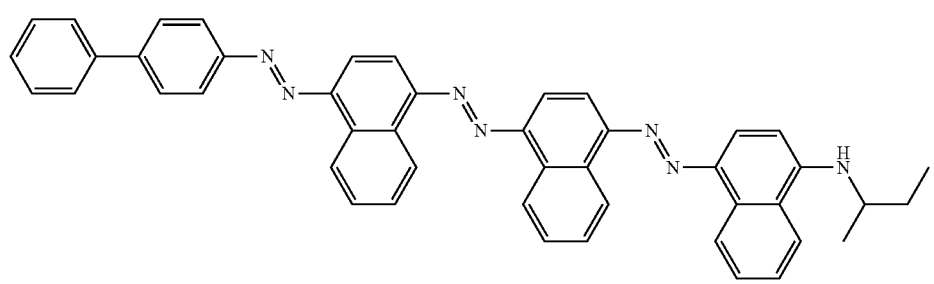

EXAMPLE 9 residue is washed with 300 parts of methanol and dried in vacuo at 50° C.: 12.5 parts of compound 9b.

Compound 9a: 8.3 parts of 4-amino-benzoic acid ethyl ester are suspended in 75 parts of 2N HCl. After cooling to 5° C. 13 parts of 4N sodium nitrite are added within 30 minutes. After further stirring for 1 hour at 5° C. 0.5 parts of sulfamic acid are added (solution A).

(Compound 9b)

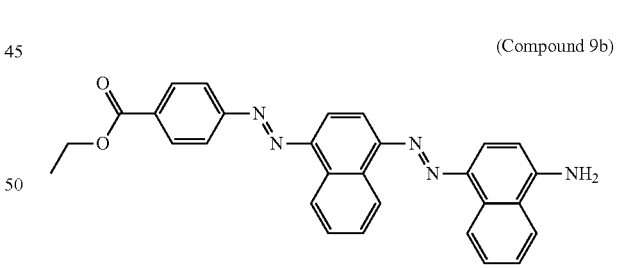

7.4 parts of 1-naphthylamine are dissolved in 75 parts of ethanol, 75 parts of water are added, the suspension is cooled to 0-5° C., and solution A is added over 1 hour. The increasingly viscous reaction mass is diluted by adding 50 parts of ethanol, 20 parts of DMF and 100 parts of water. After 1 hour at 0-5° C. 50 parts of 4N sodium acetate are added, and the temperature is raised to room temperature. Then 300 parts of water are added, and the reaction mass is filtered. The residue is washed with 750 parts of water and dried at 50° C.: 16.4 parts of compound 9a.

Compound 9c: 6.25 parts of compound 9b are dissolved in 130 parts of NMP, and the solution is cooled to 0-5° C. 4.2 parts of nitrosylsulfuric acid (40%) are added within 2 minutes. After stirring for 1 hour at 0-5° C. 2.63 parts of 1-(N-2-butylamino)-naphthalene are added. After 1 hour at 0-5° C. 30 parts of 4N sodium acetate are added, followed by 30 parts of water. After 1 hour stirring at room temperature the reaction mixture is filtered, and the residue is washed with 300 parts water and dried in vacuo at 50° C.: 7.61 parts of crude product 9c. Purification of 9c is accomplished by column chromatography (silica; toluene/ethyl acetate).

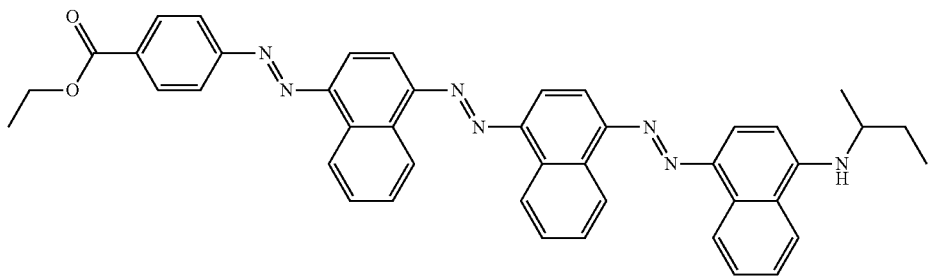
(Compound 9c)

EXAMPLE 10

Compound 10a: 16.1 parts of 4-trifluoromethyl-aniline are suspended in 125 parts of 2N HCl at 0° C., and 25 parts of 4N sodium nitrite are added at a rate of 3 parts per minute. After 2 hours stirring at 0° C. 1 part of sulfamic acid is added. After filtration the resulting yellow solution is added within 45 minutes to a solution of 22.3 parts of sodium m-tolylamino-N-methanesulfonate in 200 parts of water (pH 9). The pH is kept at 9 by adding 1 M sodium carbonate (total: 152 parts). After stirring for 4 hours at 0-5° C. 100 parts of NaOH (30%) are added, and the reaction mixture is stirred at 45-50° C. for 6 hours. The precipitate is filtered off, washed with 1000 parts of water and dried in vacuo at 60° C.: 26.2 parts of compound 10a.

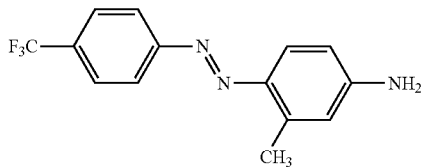
(Compound 10a)

Compound 10b: 40 parts of compound 10a are suspended in 350 parts of acetic acid and 31.7 parts of nitrosylsulfuric acid are added dropwise at 10° C. within 15 minutes. Stirring is continued for 1 hour at 5° C. (solution A).

14.7 parts of phenyl-pyrrolidine are dissolved in 180 parts of acetic acid. Then 26.5 parts of sodium acetate are added, and after cooling to 0° C. solution A is added within 10 minutes. The temperature is kept at 0-5° C. by adding ice. After 1 hour at 5-10° C. 100 parts of 1N NaOH are added dropwise. The precipitate is filtered off after 10 minutes, washed first with 800 parts of 2-propanol/water (1:1) and then with 600 parts of ice cold 2-propanol and dried in vacuo at 50° C.: 42 parts of crude product 10b which are recrystallized from toluene/2-propanol.

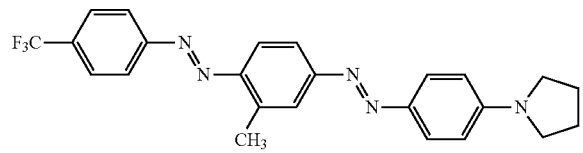
(Compound 10b)

EXAMPLE 11

Compound 11a: 10.7 parts of m-toluidine are dissolved in 125 parts of 2N HCl. The solution is cooled to 0° C. and 25 parts of 4N sodium nitrite are added within 10 minutes. Diazotation is completed by stirring for 1 hour (solution A).

10.7 parts of m-toluidine are dissolved in 250 parts of methanol. 26 parts of sodium acetate trihydrate are added, followed by solution A dropwise within 5 minutes. After stirring at 5-10° C. for 2 hours methanol is evaporated in vacuo, the residue is filtered off and washed with water. The filter cake is dissolved in 500 parts of toluene, the toluene phase is separated from the aqueous phase and dried over sodium sulfate. The dried toluene solution is filtered over silica and evaporated. The resulting dark red oil is dissolved in 30 parts of toluene and after adding 200 parts of n-hexane crystals start to form. After filtration, washing with n-hexane and drying in vacuo at 50° C. 12 parts of compound 11a are obtained.

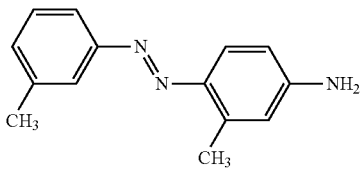
(Compound 11a)

Compound 11b: 4 parts of compound 11a are dissolved in 60 parts of NMP and 5.6 parts of nitrosylsulfuric acid (40%) are added at 0-5° C. After stirring for 1 hour at this temperature 2.7 parts of phenyl-pyrrolidine are added and stirring is continued at 0-5° C. overnight. Then the pH is raised to 7-8 by adding 50 parts of 2N NaOH, the residue is filtered off, washed with 500 parts of water and dried at 50° C.: 4.5 parts of compound 11b. The crude product is recrystallized from toluene/hexane.

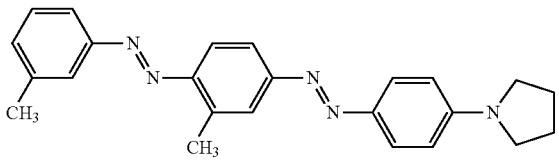
(Compound 11b)

EXAMPLE 12

Compound 12a: 4 parts of compound 11a are dissolved in 60 parts of NMP, 5.6 parts of nitrosylsulfuric acid (40%) are added at 0-5° C., and diazotation is completed by stirring at 0-5° C. for 1 hour (solution A).

9.2 parts of sodium acetate trihydrate are dissolved in 180 parts of methanol/water (3:1) and 2.9 parts of phenyl-morpholine are added. After cooling to 0-5° C. solution A is added slowly. After stirring at 0° C. to room temperature over night the pH is raised to 7-8 by addition of 50 parts of 2N NaOH. The precipitate is filtered off, washed with 500 parts of water and dried at 50° C.: 6 parts of crude compound 12a. The crude product is recrystallized from toluene/n-hexane.

(Compound 12a)

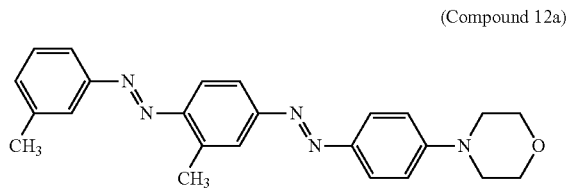 [SMILES: Cc1cccc(/N=N/c2ccc(/N=N/c3ccc(N4CCOCC4)cc3)cc2C)c1]

EXAMPLE 13

Compound 13a: 11.2 parts of 4-fluoroaniline are dissolved in 125 parts of 2N HCl, and after cooling to 0° C. 25 parts of 4N sodium nitrite are added at a rate of 3 parts per minute. After stirring for 1 hour at 0° C. 1 part of sulfamic acid is added (solution A).

22.3 parts of sodium m-tolylamino-N-methanesulfonate are dissolved in 200 parts of water at 5° C., and the pH is raised to 9 with 1M sodium carbonate. Solution A is then added dropwise within 45 minutes while the pH is kept at 9 by adding 137 parts of 1 M sodium carbonate. Coupling is completed by stirring for 4 hours at 0-5° C. and then at room temperature overnight. 100 parts of NaOH (30%) are added, and after 45 minutes the temperature is raised to 45° C. for 6 hours. The precipitate is filtered off, washed with 800 parts of water and dried in vacuo at 60° C.: 21.3 parts of compound 13a.

(Compound 13a)

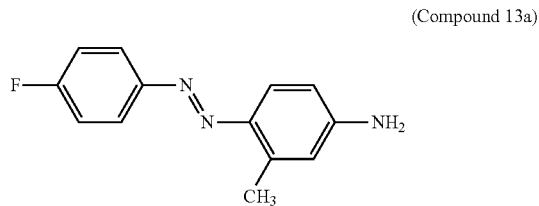 [SMILES: Cc1cc(N)ccc1/N=N/c1ccc(F)cc1]

Compound 13b: 43 parts of compound 13a are dissolved in 500 parts of NMP. After cooling to 0° C. 59.3 parts of nitrosyl-sulfuric acid are added dropwise within 15 minutes. Diazotation is completed by stirring for 2 hours at 0° C.

30.5 parts of phenyl-morpholine are dissolved in 100 parts of NMP, 95 parts of 2N HCl are added, followed by solution A within 20 minutes. After 1 hour at 0° C. 40 parts of sodium acetate trihydrate are added. Three further portions of 40 parts of sodium acetate trihydrate are added after one further hour each. After stirring at 0° C. to room temperature overnight 500 parts of water are added within 30 minutes, and the precipitate is filtered off and dried. The filter cake is suspended in 250 parts of 2-propanol and the suspension is stirred at 75° C. for 30 minutes. After cooling to 0° C. the precipitate is filtered, washed with cold (0° C.) 2-propanol and dried in vacuo at 50° C.: 24 parts of compound 13b. The crude product is recrystallized from toluene/2-propanol.

(Compound 13b)

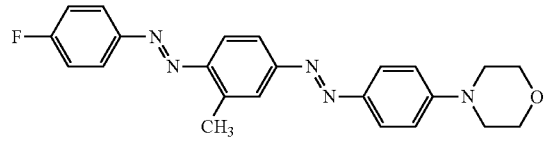

EXAMPLE 14

Application in LC Material 1.5 parts of compound 1c from example 1 are mixed well with 100 parts of Licrystal™ (Merck, Germany) BL006 and about 500 parts of dichloromethane.

After removing the solvent by evaporation at room temperature the dye-LC mixture is heated above the clearing point of the LC material (140° C.), and a droplet of the material is put at the opening of a small LC-cell (about 1×1 cm², the two glass substrates coated with anti-parallel rubbed polyimide, cell cap about 5 μm) and placed on a hot plate at 140° C. The cell is filled by capillary forces. After filling the cell is gently cooled down to room temperature. The dichroic ratio is measured on an Agilent spectrophotometer with the help of a polarizer: The cell is placed with the rubbing direction of the polyimide parallel and perpendicular to the polarization direction of the polarizer. The dichroic ratio is calculated by the ratio of parallel ($A_{//}$) and perpendicular ($A_\perp$) absorbance at the maximum absorption in the perpendicular state: $DR=A_\perp/A_{//}$.

| | Absorption Maximum | Maximum Absorbance | Dichroic Ratio |
|---|---|---|---|
| | 630 nm | $A_\perp$ = 1.94 | DR = 12.4 |
| | 630 nm | $A_\perp$ = 2.12 | DR = 13.1 |

A re-crystalized sample of example 1c

EXAMPLES 15 AND 16

Application in LC Material

Proceeding as indicated in Example 14 with the compound below.

| Structure | Absorption Maximum | Maximum Absorbance | Dichroic Ratio |
|---|---|---|---|
| 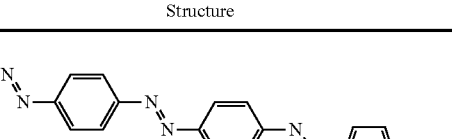 | 630 nm | $A_\perp = 2.16$ | DR = 14.3 |
| | 502 nm | $A_\perp = 1.87$ | DR = 14.3 |

EXAMPLES 17 TO 26

Application in LC Material

Proceeding as indicated in example 14, but applying 3 parts instead of 1.5 parts of the corresponding dye as shown in the table below the following absorption maxima, maximum absorbances and dichroic ratios have been found:

| Structure | Absorption Maximum | Maximum Absorbance | Dichroic Ratio |
|---|---|---|---|
| 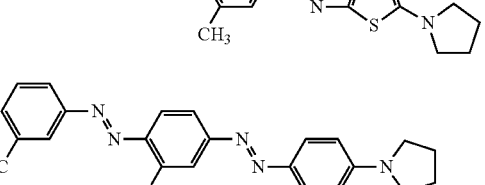 | 630 nm | 2.69 | 12.4 |
| | 639 nm | 2.55 | 10.8 |
| | 630 nm | 2.81 | 11.0 |

-continued
| Structure | Absorption Maximum | Maximum Absorbance | Dichroic Ratio |
|---|---|---|---|
| 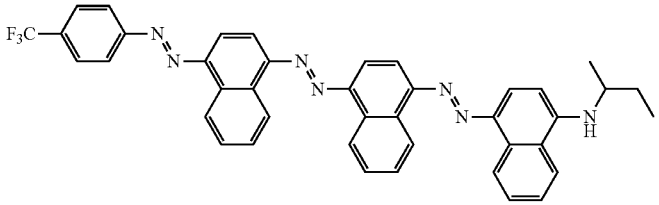 [SMILES: CCC(C)Nc1ccc(/N=N/c2ccc(/N=N/c3ccc(/N=N/c4ccc(C(F)(F)F)cc4)c4ccccc34)c3ccccc23)c2ccccc12] | 650 nm | 1.79 | 9.9 |
| 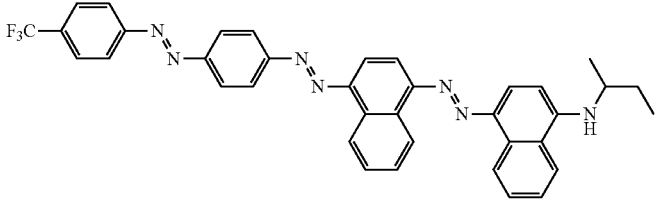 [SMILES: CCC(C)Nc1ccc(/N=N/c2ccc(/N=N/c3ccc(/N=N/c4ccc(C(F)(F)F)cc4)cc3)c3ccccc23)c2ccccc12] | 625 nm | 3.09 | 13.5 |
| 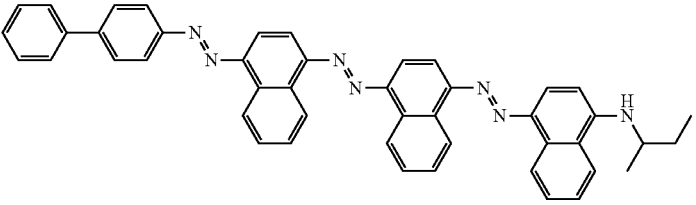 [SMILES: CCC(C)Nc1ccc(/N=N/c2ccc(/N=N/c3ccc(/N=N/c4ccc(-c5ccccc5)cc4)c4ccccc34)c3ccccc23)c2ccccc12] | 640 nm | 2.72 | 11.3 |
| 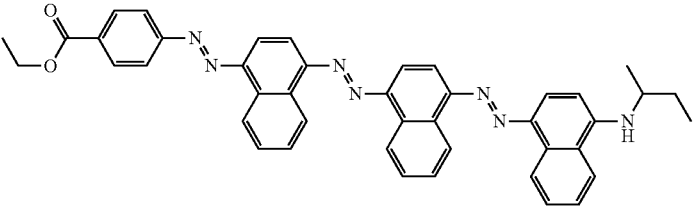 [SMILES: CCOC(=O)c1ccc(/N=N/c2ccc(/N=N/c3ccc(/N=N/c4ccc(NC(C)CC)c5ccccc45)c4ccccc34)c3ccccc23)cc1] | 650 nm | 2.35 | 10.4 |
| 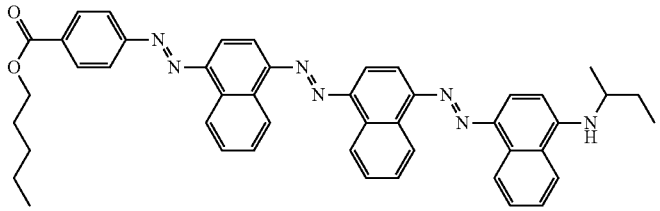 [SMILES: CCCCCOC(=O)c1ccc(/N=N/c2ccc(/N=N/c3ccc(/N=N/c4ccc(NC(C)CC)c5ccccc45)c4ccccc34)c3ccccc23)cc1] | 640 nm | 2.29 | 11.1 |
| 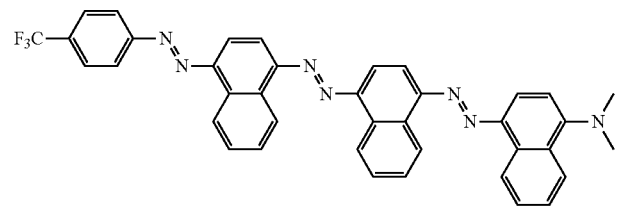 [SMILES: CN(C)c1ccc(/N=N/c2ccc(/N=N/c3ccc(/N=N/c4ccc(C(F)(F)F)cc4)c4ccccc34)c3ccccc23)c2ccccc12] | 592 nm | 1.26 | 9.4 |
| 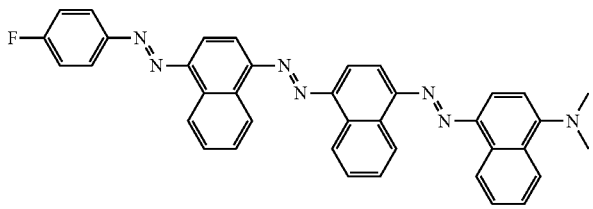 [SMILES: CN(C)c1ccc(/N=N/c2ccc(/N=N/c3ccc(/N=N/c4ccc(F)cc4)c4ccccc34)c3ccccc23)c2ccccc12] | 576 nm | 2.05 | 8.1 |

EXAMPLES 27 AND 28

Application in LC Material

Proceeding as indicated in example 14, but applying 2 parts instead of 1.5 parts of the corresponding dye as shown in the table below the following absorption maxima, maximum absorbances and dichroic ratios have been found:

| Structure | Absorption Maximum | Maximum Absorbance | Dichroic Ratio |
|---|---|---|---|
| 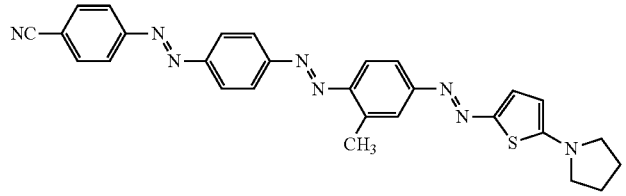 [SMILES: Cc1cc(/N=N/c2ccc(N3CCCC3)s2)ccc1/N=N/c1ccc(/N=N/c2ccc(C#N)cc2)cc1] | 610 nm | 3.09 | 12.4 |
| 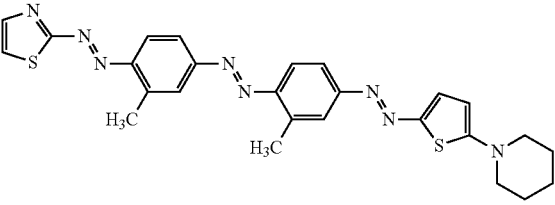 [SMILES: Cc1cc(/N=N/c2ccc(N3CCCCC3)s2)ccc1/N=N/c1ccc(/N=N/c2nccs2)c(C)c1] | 612 nm | 2.52 | 12.9 |

EXAMPLES 29 TO 88

Application in LC Material

Proceeding in analogy to examples 15 to 22 by applying 3 parts of the corresponding dichroic dye in 100 parts of Licrystal BL006, the following absorption maxima (nm), maximum absorbances A and dichroic ratios DR (in brackets) have been observed (table below):

Ex. 29

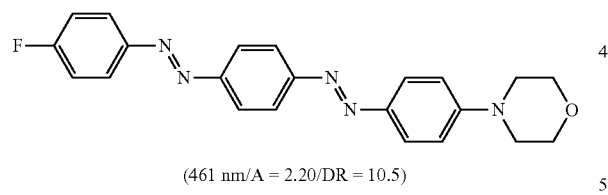

(461 nm/A = 2.20/DR = 10.5)

Ex. 30

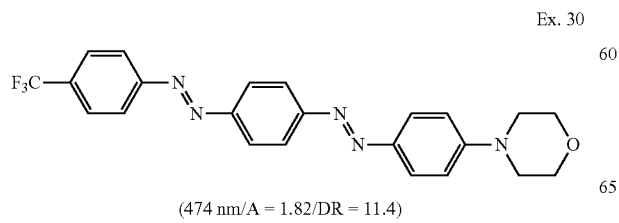

(474 nm/A = 1.82/DR = 11.4)

Ex. 31

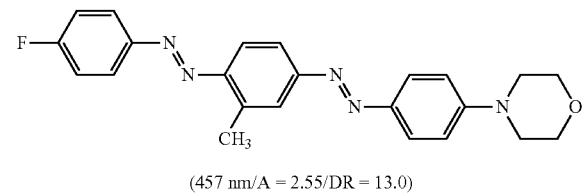

(457 nm/A = 2.55/DR = 13.0)

Ex. 32

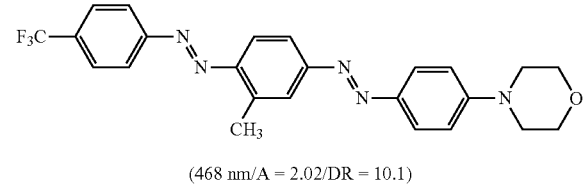

(468 nm/A = 2.02/DR = 10.1)

Ex. 33

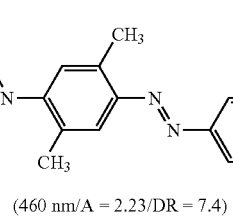

(460 nm/A = 2.23/DR = 7.4)

Ex. 34
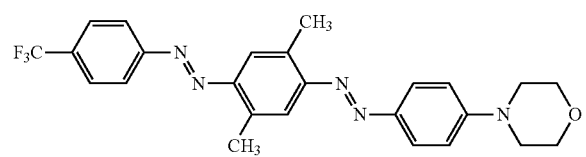
(475 nm/A = 1.91/DR = 10.7)
Ex. 35
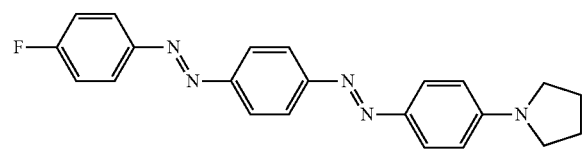
(504 nm/A = 2.65/DR = 10.2)
Ex. 36
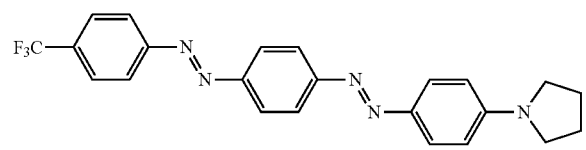 [SMILES: N#Cc1ccc(/N=N/c2ccc(/N=N/c3ccc(N4CCCC4)cc3)cc2)cc1]
(526 nm/A = 2.17/DR = 13.3)
Ex. 37
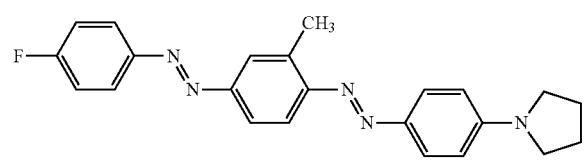
(504 nm/A = 2.99/DR = 10.7)
Ex. 38
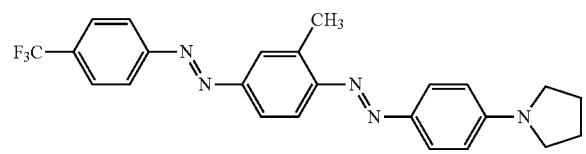
(525 nm/A = 2.62/DR = 12.5)
Ex. 39
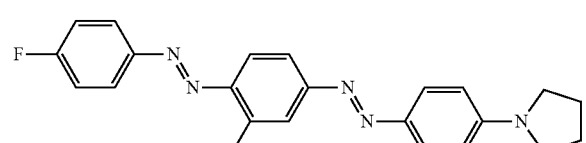
(497 nm/A = 2.77/DR = 8.5)
Ex. 40
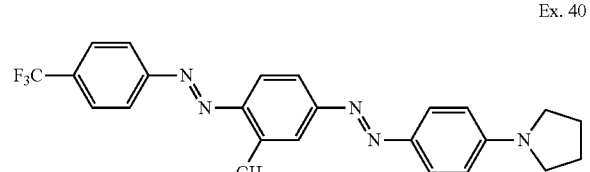
(523 nm/A = 2.65/DR = 13.2)
Ex. 41
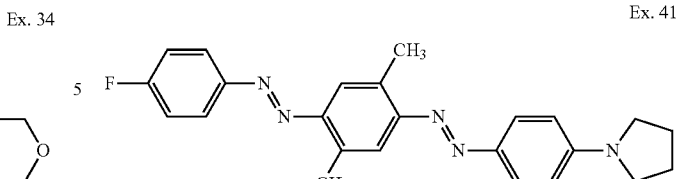
(515 nm/A = 0.85/DR = 9.4)
Ex. 42
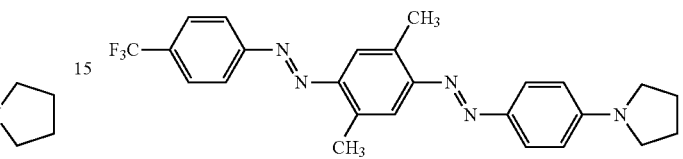
(527 nm/A = 2.15/DR = 7.4)
Ex. 43
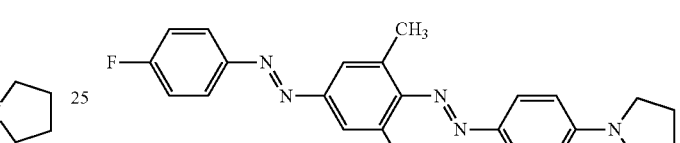
(477 nm/A = 2.28/DR = 11.2)
Ex. 44
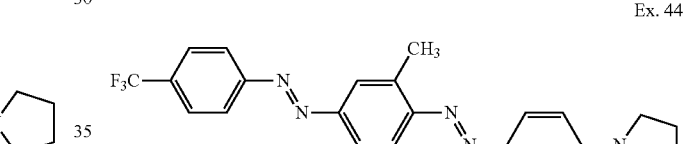
(495 nm/A = 1.99/DR = 11.1)
Ex. 45
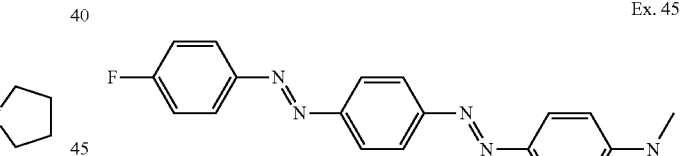
(489 nm/A = 3.07/DR = 12.8)
Ex. 46
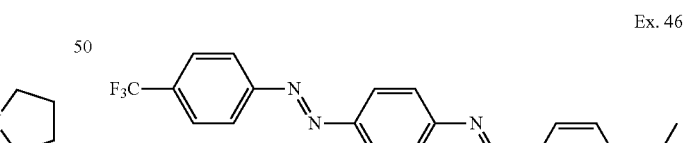
(510 nm/A = 2.03/DR = 13.2)
Ex. 47
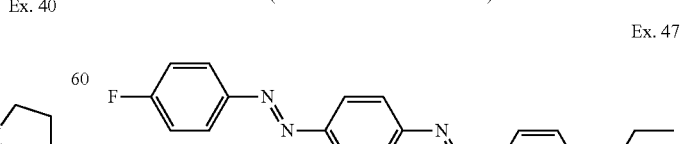
(500 nm/A = 2.96/DR = 10.9)

-continued

Ex. 48
(526 nm/A = 2.42/DR = 11.0)

Ex. 49
(495 nm/A = 2.43/DR = 9.0)

Ex. 50
(530 nm/A = 1.32/DR = 8.1)

Ex. 51
(510 nm/A = 2.22/DR = 9.3)

Ex. 52
(510 nm/A = 2.14/DR = 10.4)

Ex. 53
(469 nm/A = 2.30/DR = 11.5)

Ex. 54
(520 nm/A = 2.52/DR = 10.7)

Ex. 55
(475 nm/A = 2.07/DR = 8.9)

Ex. 56
(525 nm/A = 2.65/DR = 10.4)

Ex. 57
(525 nm/A = 2.65/DR = 10.3)

Ex. 58
(495 nm/A = 1.99/DR = 11.1)

Ex. 59
(461 nm/A = 2.20/DR = 10.5)

Ex. 60
(474 nm/A = 1.82/DR = 11.4)

Ex. 61
(457 nm/A = 2.55/DR = 13.0)

-continued

Ex. 62
(468 nm/A = 2.02/DR = 10.1)

Ex. 63
(460 nm/A = 2.23/DR = 7.4)

Ex. 64
(475 nm/A = 1.91/DR = 10.7)

Ex. 65
(504 nm/A = 2.65/DR = 10.2)

Ex. 66
(526 nm/A = 2.17/DR = 13.3)

Ex. 67
(504 nm/A = 2.99/DR = 10.7)

Ex. 68
(525 nm/A = 2.62/DR = 12.5)

-continued

Ex. 69
(497 nm/A = 2.77/DR = 8.5)

Ex. 70
(523 nm/A = 2.65/DR = 13.2)

Ex. 71
(515 nm/A = 0.85/DR = 9.4)

Ex. 72
(527 nm/A = 2.15/DR = 7.4)

Ex. 73
(477 nm/A = 2.28/DR = 11.2)

Ex. 74
(495 nm/A = 1.99/DR = 11.1)

Ex. 75
(489 nm/A = 3.07/DR = 12.8)

Ex. 76

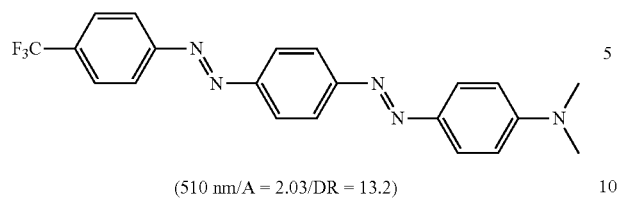

(510 nm/A = 2.03/DR = 13.2)

Ex. 77

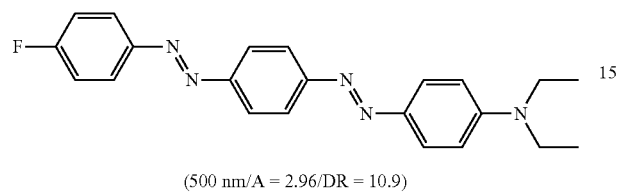

(500 nm/A = 2.96/DR = 10.9)

Ex. 78

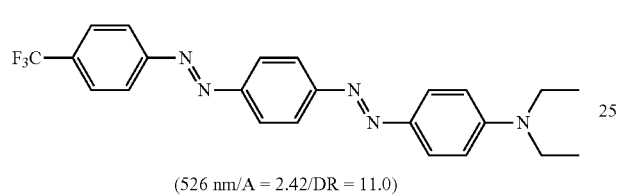

(526 nm/A = 2.42/DR = 11.0)

Ex. 79

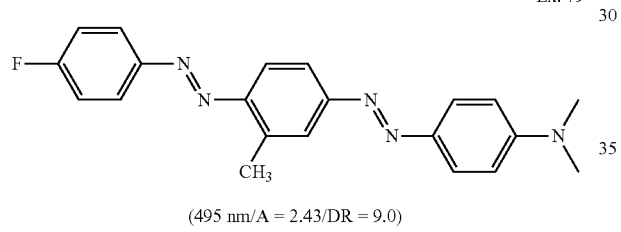

(495 nm/A = 2.43/DR = 9.0)

Ex. 80

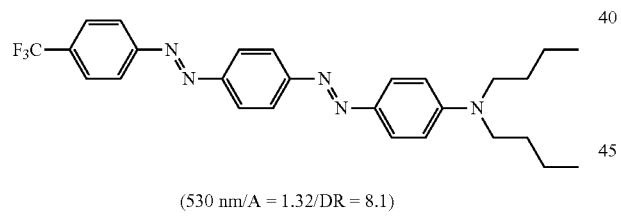

(530 nm/A = 1.32/DR = 8.1)

Ex. 81

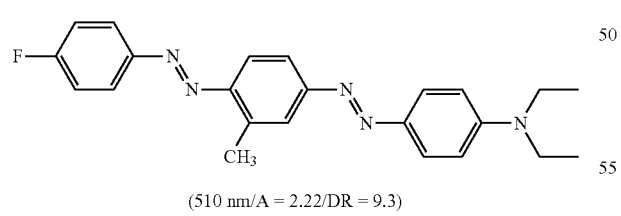

(510 nm/A = 2.22/DR = 9.3)

Ex. 82

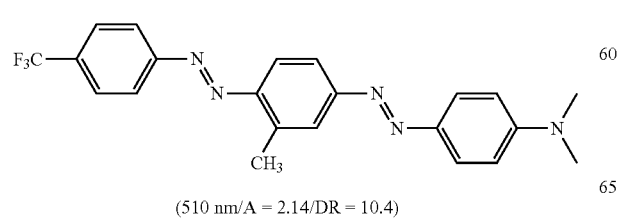

(510 nm/A = 2.14/DR = 10.4)

Ex. 83

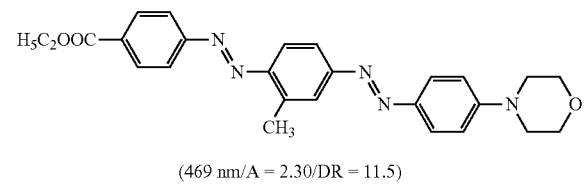

(469 nm/A = 2.30/DR = 11.5)

Ex. 84

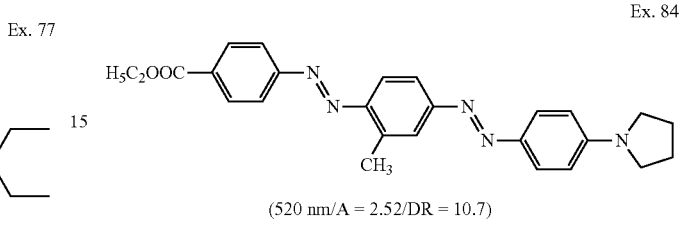

(520 nm/A = 2.52/DR = 10.7)

Ex. 85

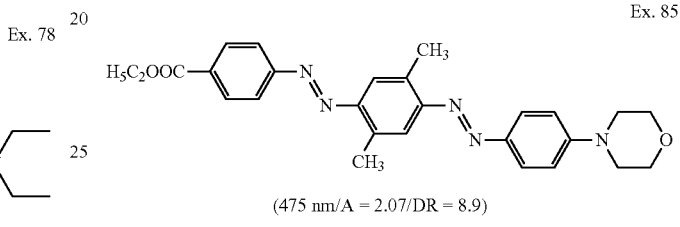

(475 nm/A = 2.07/DR = 8.9)

Ex. 86

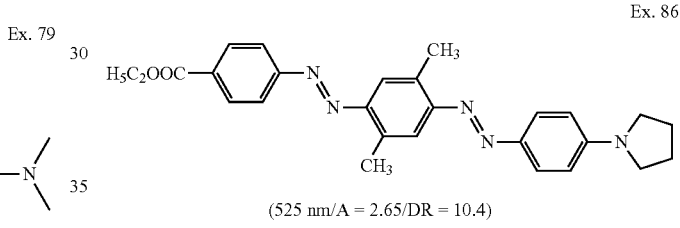

(525 nm/A = 2.65/DR = 10.4)

Ex. 87

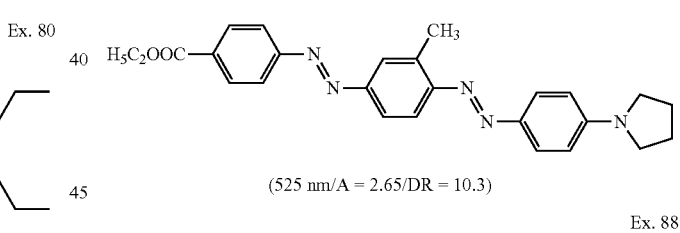

(525 nm/A = 2.65/DR = 10.3)

Ex. 88

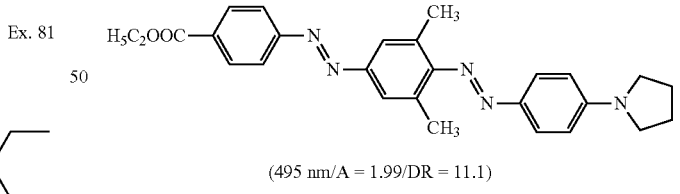

(495 nm/A = 1.99/DR = 11.1)

EXAMPLES 89 AND 90

Application in LC material

Proceeding as indicated in example 14, but applying 2 parts instead of 1.5 parts of the corresponding dye as shown in the Table below the following absorption maxima, maximum absorbances and dichroic ratios have been found:

| Structure | Absorption Maximum | Maximum Absorbance | Dichroic Ratio |
|---|---|---|---|
| [structure with F, H₃C, N=N linkages, pyrrolidine] | 517 nm | 2.42 | 11.9 |
| [structure with NC, N=N linkages, pyrrolidine] | 605 nm | 2.96 | 11.7 |

EXAMPLE 91

Dichroic Black (Mixture)

A mixture of 5.0 parts of compound 1c (example 1), 2.0 parts of compound 10b (example 10) and 2.0 parts of compound 13b (example 13) are mixed together with 267 parts of Licrystal™ BL006 and about 1200 parts of dichloromethane and applied as indicated in example 14. A neutral black shade is obtained.

The mixture is very well suited for polarizer applications, for contrast enhancement films (LC displays), in polymer network liquid crystals (PNLC), in polymer dispersed liquid crystals (PDLC), e-Book applications, reflective displays and many other liquid crystal applications.

EXAMPLE 92

Dichroic Black (Mixture)

A mixture of 6.0 parts of compound 6c (example 6), 2.0 parts of compound 10b (example 10) and 2.0 parts of compound 13b (example 13) are mixed together with 267 parts of Licrystal™ BL006 and about 1200 parts of dichloromethane and applied as indicated in example 14. The dichroic ratio of the resulting neutral black is 9.1. An absorption spectrum recorded in the range of 400-800 nm using a 5 micron LC cell documents the black shade obtained and the dichroic properties of the mixture; the maximum absorbance A is about 1.8 (see FIG. 1).

The mixture is very well suited for polarizer applications, for contrast enhancement films (LC displays), in polymer network liquid crystals (PNLC), in polymer dispersed liquid crystals (PDLC), e-Book applications, reflective displays and many other liquid crystal applications.

EXAMPLE 93

Dichroic Black (Mixture)

4.8 parts of compound 1c (example 1) and 3.2 parts of compound 11b (example 11) are mixed together with 267 parts of Licrystal™ BL006 and about 1200 parts of dichloromethane and applied as indicated in example 14. The maximum absorbance A is 2.3, and the dichroic ratio DR is 12.1.

The mixture is very well suited for polarizer applications, for contrast enhancement films (LC displays), in polymer network liquid crystals (PNLC), in polymer dispersed liquid crystals (PDLC), e-Book applications, reflective displays and many other liquid crystal applications.

COMPARATIVE EXAMPLE 10 parts of a commercially available black mixture (Black S-428, manufactured by Mitsui Chemicals; a mixture of a yellow and a red azo dye and a blue anthraquinone dye) is mixed with 267 parts of Licrystal™ BL006 and about 1200 parts of dichloromethane and applied as in example 14. The maximum absorbance A is 1.0.

Comparing example 92 and the comparative example results in a distinctly higher color strength of the inventive black composition, i.e. the concentration of the dye mixture can be significantly reduced to achieve a suitable saturation.

EXAMPLE 94

Polarizing Film 200 parts of Paliocolor® 242 (polymerisable LC material containing two residues of the formula —O—$CH_2$—$CH_2$—$CH_2$-acrylate; BASF Germany) is mixed with 6 parts of compound 6c (example 6), 2 parts of compound 10b (example 10) and 2 parts of compound 13b (example 13) and 5 parts of Irgacure® 907 (BASF Germany). This mixture is dissolved in 1000 parts of dichloromethane.

The solution is spin-coated on a polyimide (Daxin DA 7013, Taiwan) coated glass substrate, which had been subjected to parallel rubbing. Subsequently, the glass substrate is heated on a hot plate to 130° C. for 2 minutes, and slowly cooled down to room temperature. The coated glass substrate is then exposed to a medium pressure UV lamp for about 15 seconds (i.e. approximately 150 mJ/$cm^2$).

The result obtained is checked by placing the coated glass substrate on a conventional polariser. The percentage of incident light passing in the region of 400-700 nm is determined by means of a UV-VIS spectrophotometer (Agilent® 8453). By turning the polarisation direction parallel or perpendicular to the rubbing direction of the polyimide, a clear anisotropic effect is observed: Part of the light in the visual region is transmitted in the parallel configuration (>30%), and almost no light (less than 3%) is transmitted in the perpendicular configuration.

The film is well suited for use as an in-cell polariser.

BRIEF DESCRIPTION OF THE FIGURE

FIG. 1 shows the absorption properties in visual range of the black mixture of example 92 in a LC cell (black line: parallel absorbance ($A_{//}$); bold-type black line: perpendicular ($A_\perp$) absorbance).

The invention claimed is:

1. A composition, comprising:
a dye of formula A:

(A)

and
a dye of formula B:

$$Ar_1-N=N-[Ar_2-N=N-]_q Ar_3-N=N-Ar_4 \quad (B),$$

wherein each of n, m, and p is from 0 to 2;
q is 0 or 1;
$Ar_1$ is one of the formulae:

$Ar_2$ and $Ar_a$ are independently 1,4-phenylene, 1,4-phenylene substituted by one or two $R_5$, or 1,4-naphthylene;
$Ar_4$ is naphthyl substituted by one or two residues $C_1$-$C_8$alkylamino, one or two residues di($C_1$-$C_8$alkyl) amino, one or two residues di($C_1$-$C_8$alkyl)amino whose alkyl groups are linked together to form one common bridging group $C_1$-$C_8$alkylene or $C_2$-$C_8$alkylene interrupted by O or S or $NR'_3$ or any combination thereof, or two residues $C_1$-$C_8$alkylamino whose alkyl groups are linked together to form one common bridging group $C_1$-$C_8$alkylene or $C_2$-$C_8$alkylene interrupted by O or S or $NR'_3$ or any combination thereof; or thiophenyl substituted by $R_{11}$ and optionally further substituted by $C_1$-$C_8$alkyl, phenyl, halogen, or CN, wherein
$R_{11}$ is NR'R", with R' and R" independently selected from H or $C_1$-$C_4$alkyl or $C_3$-$C_{12}$cycloalkyl or phenyl or substituted phenyl; or R' and R" together forming one common bridging group $C_1$-$C_8$alkylene or $C_2$-$C_8$alkylene interrupted by O, S and/or $NR'_3$
either $R_1$ is substituted or unsubstituted $C_1$-$C_{12}$alkyl, substituted or unsubstituted $C_3$-$C_{12}$cycloalkyl, or substituted or unsubstituted $C_3$-$C_5$cycloalkyl interrupted by O, S, or $NR'_3$; and $R_3$ is H, substituted or unsubstituted $C_1$-$C_{12}$alkyl, substituted or unsubstituted $C_3$-$C_{12}$cycloalkyl, or substituted or unsubstituted $C_3$-$C_5$cycloalkyl interrupted by O, S, or $NR'_3$; or $R_1$ and $R_3$ together are substituted or unsubstituted $C_2$-$C_{12}$alkylene, substituted or unsubstituted $C_2$-$C_8$alkylene interrupted by O, S, $NR'_3$, or any combination thereof, thus forming, together with a nitrogen atom, an aliphatic N-heterocyclic residue of 2 to 12 carbon atoms;
$R'_3$ is H or $C_1$-$C_8$alkyl;
each of $R_4$, $R_5$, and $R_6$, are independently selected from the group consisting of unsubstituted or substituted $C_1$-$C_4$alkyl, $C_1$-$C_4$alkoxy, halogen, and CN;
X is H, Hal, or $COOR_2$;
Xb is Hal, $COOR_2$, CN, phenyl, $R_8$-substituted phenyl, $C_3$-$C_{12}$cycloalkyl, or $C_1$-$C_{12}$alkyl-cyclohexyl,
Hal is $CF_3$, or halogen;
$R_2$ is unsubstituted or substituted $C_1$-$C_{12}$alkyl;
$R_8$ is $C_1$-$C_{12}$alkyl with an optionally substituted alkyl moiety, $C_1$-$C_{12}$alkoxy with an optionally substituted alkyl moiety, $C_1$-$C_{12}$alkyl-phenyl with an optionally substituted alkyl moiety, $C_1$-$C_{12}$alkyl-cyclohexyl with an optionally substituted alkyl moiety, $C_1$-$C_{12}$alkoxy-cyclohexyl with an optionally substituted alkyl moiety, $C_3$-$C_{12}$cycloalkyl, phenyl, CN, or Hal;
$R_{12}$ and $R_{13}$ are independently H; Hal; nitro; formyl; SCN; CN; $COOR_2$; $COR_2$; $C_1$-$C_{12}$alkyl; $C_1$-$C_{12}$alkoxy; $C_1$-$C_{12}$alkylthio; $C_1$-$C_{12}$alkyl-$SO_2$; phenyl; phenoxy; phenyl-$SO_2$; phenyl substituted by phenyl, $C_1$-$C_8$alkyl, cyclohexyl, $C_1$-$C_8$alkoxy, or $C_1$-$C_8$alkylthio; phenoxy substituted by phenyl, $C_1$-$C_8$alkyl, cyclohexyl, $C_1$-$C_8$alkoxy, or $C_1$-$C_8$alkylthio; phenyl-$SO_2$ substituted by phenyl, $C_1$-$C_8$alkyl, cyclohexyl, $C_1$-$C_8$alkoxy, or $C_1$-$C_8$alkylthio; $C_2$-$C_{12}$alkyl interrupted by O; $C_3$-$C_{12}$alkoxy interrupted by O; $C_3$-$C_{12}$alkylthio interrupted by O; $C_1$-$C_8$alkyl substituted by CN, $COOR_2$, phenyl, fluoro, or $CF_3$; $C_2$-$C_3$alkenyl substituted by CN, $COOR_2$, phenyl, fluoro, or $CF_3$; $C_1$-$C_8$alkoxy substituted by CN, $COOR_2$, phenyl, fluoro, or $CF_3$; or $C_1$-$C_8$alkylthio substituted by CN, $COOR_2$, phenyl, fluoro, or $CF_3$; or $R_{12}$ and $R_{13}$ together are $C_3$-$C_4$alkylene;
$R_{14}$ is H; Hal; CN; SCN; $COOR_2$; $COR_2$; $C_1$-$C_{12}$alkyl; $C_3$-$C_{12}$cycloalkyl; $C_1$-$C_{12}$alkoxy; $C_1$-$C_{12}$alkylthio; $C_1$-$C_{12}$alkylamino; di($C_1$-$C_{12}$alkyl)amino; pyrrolidinyl; piperidinyl; morpholinyl; phenyl; phenyl-$SO_2$; phenyl substituted by phenyl, $C_1$-$C_8$alkyl, cyclohexyl, $C_1$-$C_8$alkoxy, or $C_1$-$C_8$alkylthio; $C_2$-$C_{12}$alkyl interrupted by O; $C_3$-$C_{12}$alkoxy interrupted by O; $C_3$-$C_{12}$alkylthio interrupted by O; $C_1$-$C_8$alkyl substituted by CN, $COOR_2$, phenyl, fluoro, or $CF_3$; $C_2$-$C_3$alkenyl substituted by CN, $COOR_2$, phenyl, fluoro, or $CF_3$; $C_1$-$C_8$alkoxy substituted by CN, $COOR_2$, phenyl, fluoro, or $CF_3$; or $C_1$-$C_8$alkylthio substituted by CN, $COOR_2$, phenyl, fluoro, or $CF_3$;
$R_{15}$ is H; Hal; $OCF_3$; CN; $COOR_2$; $COR_2$; $C_1$-$C_{12}$alkyl; $C_1$-$C_{12}$alkoxy; $C_1$-$C_{12}$alkylthio; $C_1$-$C_{12}$alkylamino; di($C_1$-$C_{12}$alkyl)amino; $C_1$-$C_{12}$alkyl-CONH; $C_1$-$C_{12}$alkyl-$SO_2$; pyrrolidinyl; di($C_1$-$C_4$alkyl)amino; morpholinyl; phenyl; phenyl-$SO_2$; phenyl substituted by phenyl, $C_1$-$C_8$alkyl, cyclohexyl, $C_1$-$C_8$alkoxy, $C_1$-$C_8$alkylthio, CN, $CF_3$, or $OCF_3$; phenyl-$SO_2$ substituted by phenyl, $C_1$-$C_8$alkyl, cyclohexyl, $C_1$-$C_8$alkoxy, $C_1$-$C_8$alkylthio, CN, $CF_3$, or $OCF_3$; $C_2$-$C_{12}$alkyl interrupted by O; $C_3$-$C_{12}$alkoxy interrupted by O; $C_3$-$C_{12}$alkylthio interrupted by O; $C_1$-$C_8$alkyl substituted by CN, $COOR_2$, $COR_2$, phenyl, $R_8$-substituted phenyl, fluoro, or $CF_3$; $C_2$-$C_3$alkenyl substituted by CN, $COOR_2$, $COR_2$, phenyl, $R_8$-substituted phenyl, fluoro, or $CF_3$; $C_1$-$C_8$alkoxy substituted by CN, $COOR_2$, COR$_2$, phenyl, R$_8$-substituted phenyl, fluoro, or CF$_3$; C$_1$-C$_8$alkylthio substituted by CN, COOR$_2$, COR$_2$, phenyl, R$_8$-substituted phenyl, fluoro, or CF$_3$; or C$_1$-C$_8$alkyl-SO$_2$ substituted by CN, COOR$_2$, COR$_2$, phenyl, R$_8$-substituted phenyl, fluoro, or CF$_3$;

R$_{16}$ and R$_{17}$ are independently H, halogen, nitro, C$_1$-C$_{12}$alkyl, or C$_1$-C$_{12}$alkoxy.

2. The composition of claim 1,
wherein the dye of formula A comprises a red dye and optionally a yellow dye, and
the dye of formula B comprises a blue dye,
which composition is a black dichroic dye composition.

3. The composition of claim 1,
wherein the dye of formula A is of formula A1:

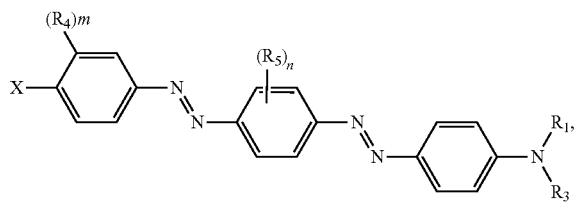
(A1)

wherein m is 0 or 1;
R$_4$ and R$_5$ are independently selected from C$_1$-C$_4$alkyl;
Hal is F, or CF$_3$;
n is from 0 to 2;
either R$_1$ is substituted or unsubstituted C$_1$-C$_{12}$alkyl, substituted or unsubstituted C$_3$-C$_{12}$cycloalkyl, or substituted or unsubstituted C$_3$-C$_5$cycloalkyl interrupted by O, S, or NR'$_3$; and R$_3$ is H, substituted or unsubstituted C$_1$-C$_{12}$alkyl, substituted or unsubstituted C$_3$-C$_{12}$cycloalkyl, or substituted or unsubstituted C$_3$-C$_5$cycloalkyl interrupted by O, S, or NR'$_3$; or
R$_1$ and R$_3$ together are substituted or unsubstituted C$_2$-C$_{12}$alkylene, substituted or unsubstituted C$_2$-C$_8$alkylene interrupted by O, S, NR'$_3$, or any combination thereof, thus forming, together with a nitrogen atom, an aliphatic N-heterocyclic residue of 2 to 12 carbon atoms;
R'$_3$ is H or C$_1$-C$_8$alkyl; and
X is H, Hal, or COOR$_2$.

4. The composition of claim 2,
wherein the yellow dye is present and has formula A, wherein N(R$_1$)R$_3$ is morpholinyl and any of R$_4$, R$_5$, or R$_6$, is methyl; and
in the red dye of formula A, N(R$_1$)R$_3$ is pyrrolidinyl, piperidinyl, or di(C$_1$-C$_4$alkyl)amino, and any of R$_4$, R$_5$, or R$_6$, is methyl; and
the dye of formula B is a blue dye, of any of the formulae B1, B2, B3, or B4:

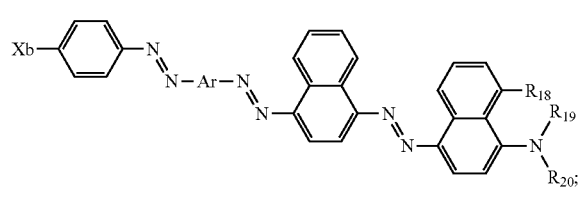
(B1)

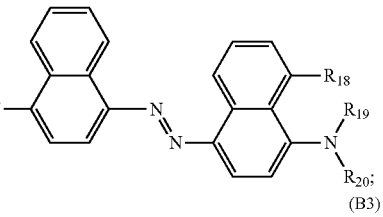
(B2)

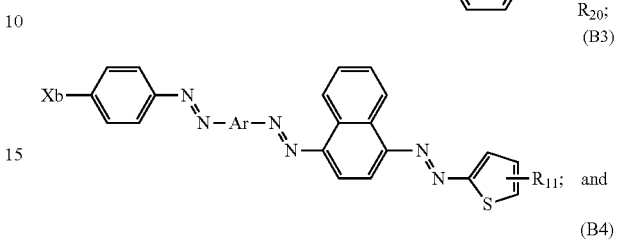
(B3)

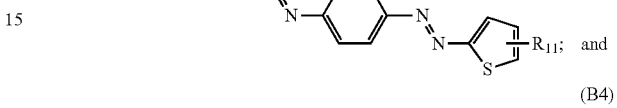
(B4)

wherein,
q is 0 or 1;
Ar is 1,4-phenylene, 1,4-phenylene substituted by methyl, or 1,4-naphthylene;
Ar$_1$ is one of the formulae:

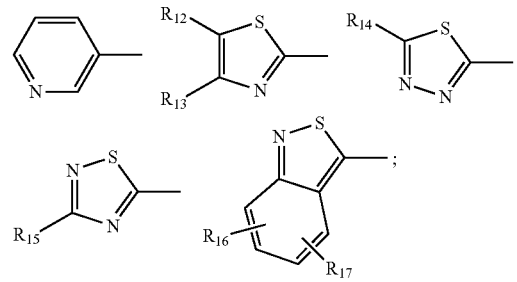

Ar$_3$ is 1,4-phenylene, 1,4-phenylene substituted by one or two methyl, or 1,4-naphthylene;
Xb is Hal, COOR$_2$, CN, phenyl, R$_8$-substituted phenyl, cyclohexyl, or C$_1$-C$_{12}$alkyl-cyclohexyl;
Hal is CF$_3$ or fluoro;
R$_2$ is C$_1$-C$_8$alkyl;
R$_8$ is C$_1$-C$_8$alkyl, cyclohexyl, or C$_1$-C$_8$alkyl-cyclohexyl;
R$_{11}$ is pyrrolidinyl, piperidinyl, di(C$_1$-C$_4$alkyl)amino, or morpholinyl;
R$_{12}$ and R$_{13}$ are independently H; Hal; CN; COOR$_2$; C$_1$-C$_8$alkyl; phenyl; phenyl substituted by phenyl, C$_1$-C$_8$alkyl, cyclohexyl, or C$_1$-C$_8$alkoxy; C$_2$-C$_8$alkyl interrupted by O; or C$_3$-C$_8$alkylthio interrupted by O; C$_1$-C$_8$alkyl substituted by CN or COOR$_2$; vinyl substituted by CN or COOR$_2$; or
R$_{12}$ and R$_{13}$ together are C$_3$-C$_4$alkylene;
R$_{14}$ is CF$_3$; CN; COOR$_2$; C$_1$-C$_8$alkyl; C$_1$-C$_8$alkoxy; C$_1$-C$_8$alkylthio; pyrrolidinyl; di(C$_1$-C$_4$alkyl)amino; morpholinyl; phenyl; phenyl substituted by phenyl or C$_1$-C$_8$alkyl; C$_2$-C$_8$alkyl interrupted by O; C$_1$-C$_8$alkyl substituted by CN, COOR$_2$, phenyl, or CF$_3$; vinyl substituted by CN, COOR$_2$, phenyl, or CF$_3$, or C$_1$-C$_8$alkylthio substituted by CN, COOR$_2$, phenyl, or CF$_3$;

$R_{15}$ is $CF_3$; $OCF_3$; CN; $COOR_2$; $C_1$-$C_8$alkyl; $C_1$-$C_8$alkoxy; $C_1$-$C_8$alkylthio; $C_1$-$C_8$alkyl-$SO_2$; pyrrolidinyl; di($C_1$-$C_4$alkyl)amino; morpholinyl; phenyl; phenyl substituted by phenyl or $C_1$-$C_8$alkyl; $C_2$-$C_8$alkyl interrupted by O; $C_1$-$C_8$alkyl substituted by CN, $COOR_2$, phenyl, or $CF_3$; vinyl substituted by CN, $COOR_2$, phenyl, or $CF_3$; $C_1$-$C_8$alkylthio substituted by CN, $COOR_2$, phenyl, or $CF_3$; or $C_1$-$C_8$alkyl-$SO_2$ substituted by CN, $COOR_2$, phenyl, or $CF_3$;

$R_{16}$ and $R_{17}$ are independently H, halogen, or nitro;

either $R_{18}$ is H or $C_1$-$C_8$alkylamino; and $R_{19}$ is $C_1$-$C_8$alkyl;

or the alkyl groups of $R_{18}$ and $R_{19}$ form a common bridging group $C_1$-$C_3$alkylene; and $R_{20}$ is H or $C_1$-$C_8$alkyl.

5. The composition of claim 1, wherein the dye of formula A comprises a compound A2:

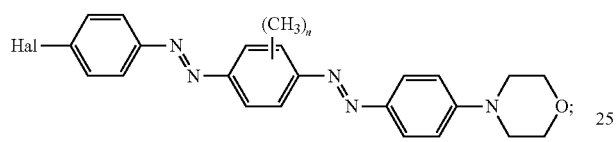

(A2)

and a compound A3:

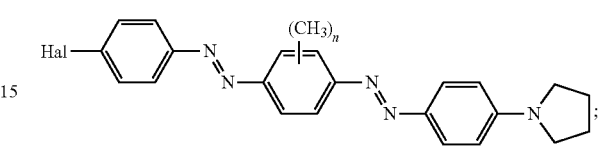

(A3)

and the dye of formula B comprises a compound B6, B6', B7, B8, B10, or any combination thereof:

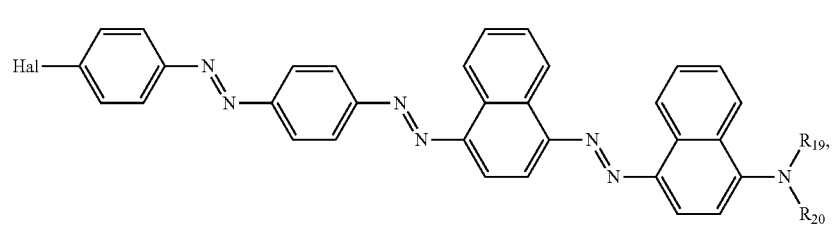

(B6)

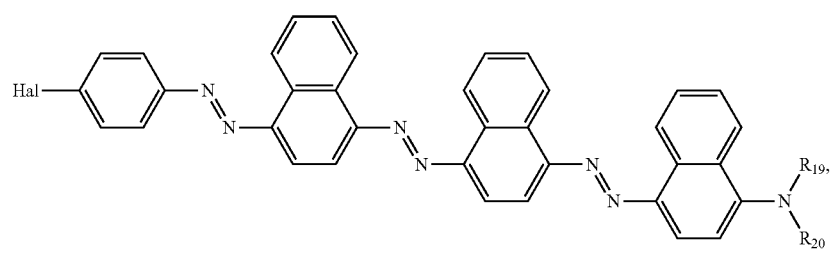

(B6')

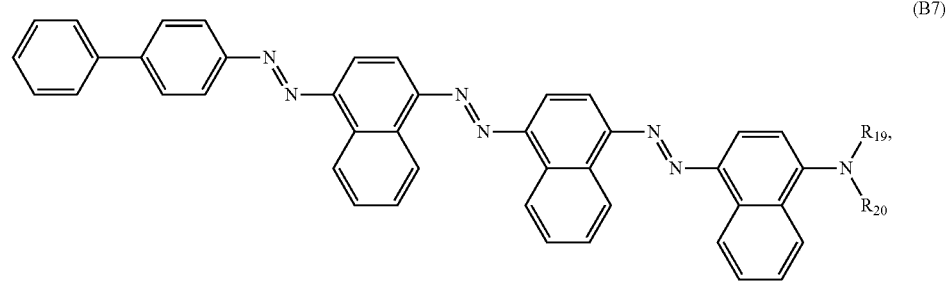

(B7)

-continued (B8)

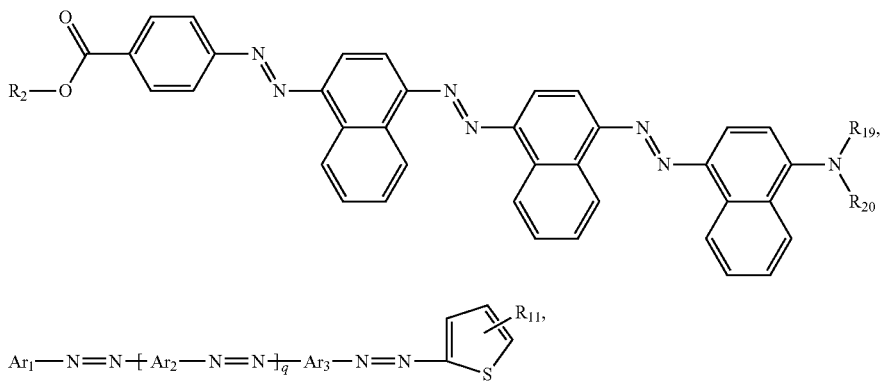

(B10)

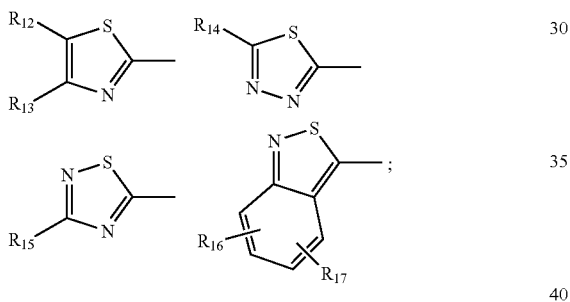

wherein Hal is fluoro or CF$_3$;
n is from 0 to 2;
either R$_{19}$ is branched C$_3$-C$_6$alkyl; and R$_{20}$ is H, or
R$_{19}$ and R$_{20}$ are C$_1$-C$_4$alkyl;
R$_2$ is linear or branched C$_1$-C$_8$alkyl;
q is 0 or 1;
Ar$_1$ is phenyl substituted by Xb, or a heterocyclic residue of one of the formulae:

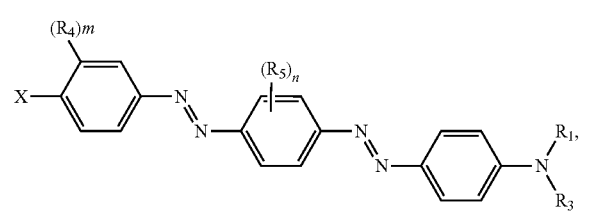

Ar$_2$ and Ar$_3$ are independently 1,4-phenylene, 1,4-phenylene substituted by C$_1$-C$_4$alkyl, or 1,4-naphthylene;
Xb is Hal, COOR$_2$, CN, phenyl, R$_8$-substituted phenyl, C$_3$-C$_{12}$cycloalkyl, C$_1$-C$_{12}$alkyl-cyclohexyl, or C$_1$-C$_{12}$alkoxy-cyclohexyl;
Hal is CF$_3$ or fluoro;
R$_8$ is C$_1$-C$_{12}$alkoxy, C$_3$-C$_{12}$cycloalkyl, phenyl, C$_1$-C$_{12}$alkyl-phenyl, C$_1$-C$_{12}$alkyl-cyclohexyl, or C$_1$-C$_{12}$alkoxy-cyclohexyl;
R$_{11}$ is pyrrolidinyl, piperidinyl, di(C$_1$-C$_4$alkyl)amino, or morpholinyl;
R$_{12}$ and R$_{13}$ are independently H; Hal; CN; COOR$_2$; C$_1$-C$_{12}$alkyl; C$_1$-C$_{12}$alkoxy; C$_1$-C$_{12}$alkylthio; phenyl; phenyl substituted by phenyl, C$_1$-C$_8$alkyl, cyclohexyl, C$_1$-C$_8$alkoxy, or C$_1$-C$_8$alkylthio; C$_2$-C$_{12}$alkyl interrupted by O, C$_3$-C$_{12}$alkoxy interrupted by O; C$_3$-C$_{12}$alkylthio interrupted by O; C$_1$-C$_8$alkyl substituted by CN, COOR$_2$, phenyl, fluoro, or CF$_3$; C$_2$-C$_3$alkenyl substituted by CN, COOR$_2$, phenyl, fluoro, or CF$_3$; C$_1$-C$_8$alkoxy substituted by CN, COOR$_2$, phenyl, fluoro, or CF$_3$; or C$_1$-C$_8$alkylthio substituted by CN, COOR$_2$, phenyl, fluoro, or CF$_3$; or
R$_{12}$ and R$_{13}$ together are C$_3$-C$_4$alkylene;
R$_{14}$ is H; CF$_3$; CN; COOR$_2$; C$_1$-C$_{12}$alkyl; C$_1$-C$_{12}$alkoxy; C$_1$-C$_{12}$alkylthio; pyrrolidinyl; piperidinyl; di(C$_1$-C$_4$alkyl)amino; morpholinyl; phenyl; phenyl substituted by phenyl, C$_1$-C$_8$alkyl, cyclohexyl, C$_1$-C$_8$alkoxy, or C$_1$-C$_8$alkylthio; C$_2$-C$_{12}$alkyl interrupted by O; C$_3$-C$_{12}$alkoxy C$_3$-C$_{12}$alkylthio interrupted by O; C$_1$-C$_8$alkyl substituted by CN, COOR$_2$, phenyl, fluoro or CF$_3$; C$_2$-C$_3$alkenyl substituted by CN, COOR$_2$, phenyl, fluoro or CF$_3$; C$_1$-C$_8$alkoxy substituted by CN, COOR$_2$, phenyl, fluoro or CF$_3$; or C$_1$-C$_8$alkylthio substituted by CN, COOR$_2$, phenyl, fluoro or CF$_3$;
R$_{15}$ is H; CF$_3$; OCF$_3$; CN; COOR$_2$; C$_1$-C$_{12}$alkyl; C$_1$-C$_{12}$alkoxy; C$_1$-C$_{12}$alkylthio; C$_1$-C$_{12}$alkyl-SO$_2$; pyrrolidinyl; di(C$_1$-C$_4$alkyl)amino; morpholinyl; phenyl; phenyl substituted by phenyl, C$_1$-C$_8$alkyl, cyclohexyl, C$_1$-C$_8$alkoxy, or C$_1$-C$_8$alkylthio; C$_2$-C$_{12}$alkyl interrupted by O; C$_3$-C$_{12}$alkoxy C$_3$-C$_{12}$alkylthio interrupted by O; C$_1$-C$_8$alkyl substituted by CN, COOR$_2$, phenyl, fluoro, or CF$_3$; C$_2$-C$_3$alkenyl substituted by CN, COOR$_2$, phenyl, fluoro, or CF$_3$; C$_1$-C$_8$alkoxy substituted by CN, COOR$_2$, phenyl, fluoro, or CF$_3$; C$_1$-C$_8$alkylthio substituted by CN, COOR$_2$, phenyl, fluoro, or CF$_3$, or C$_1$-C$_8$alkyl-SO$_2$ substituted by CN, COOR$_2$, phenyl, fluoro, or CF$_3$; and
R$_{16}$ and R$_{17}$ are independently H, halogen, nitro, C$_1$-C$_{12}$alkyl, or C$_1$-C$_{12}$alkoxy.

6. The composition of claim 1, wherein the dye of formula A is of formula A4:

(A4)

wherein X is H;
m is 1;
n is 0, 1, or 2;
R$_4$ and R$_5$ are methyl;
the moiety —N(R$_1$)R$_3$ is pyrrolidinyl; and
the dye of formula B is one compound of formulae B1, B2, B3, or B4:

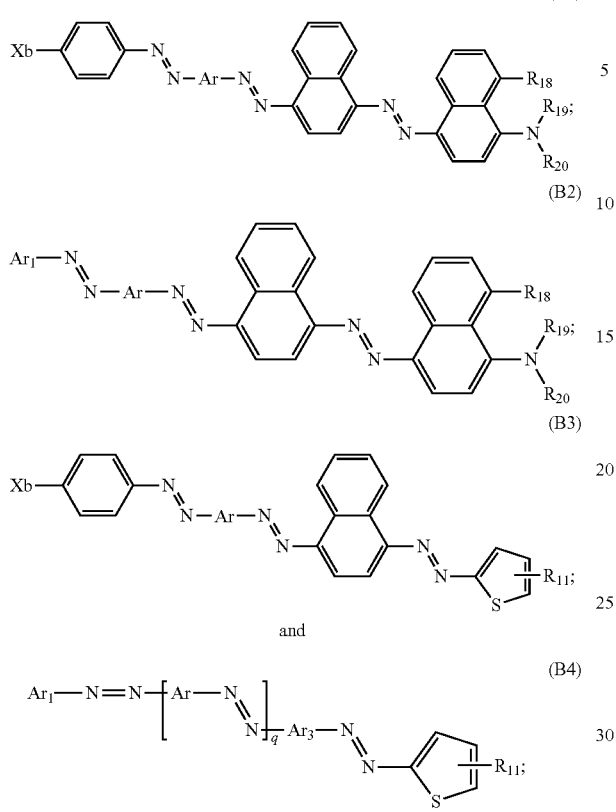

wherein
q is 0 or 1;
Ar is 1,4-phenylene, 1,4-phenylene substituted by methyl, or 1,4-naphthylene;
$Ar_1$ is one of the formulae:

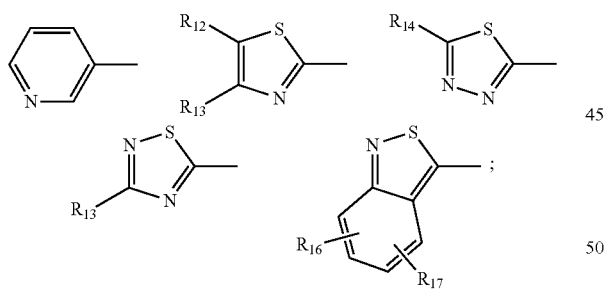

$Ar_3$ is 1,4-phenylene, 1,4-phenylene substituted by one or two methyl, or 1,4-naphthylene;
Xb is Hal, $COOR_2$, CN, phenyl, $R_8$-substituted phenyl, cyclohexyl, or $C_1$-$C_{12}$alkyl-cyclohexyl;
Hal is $CF_3$ or fluoro;
$R_2$ is $C_1$-$C_8$alkyl;
$R_8$ is $C_1$-$C_8$alkyl, cyclohexyl, or $C_1$-$C_8$alkyl-cyclohexyl;
$R_{11}$ is pyrrolidinyl, piperidinyl, di($C_1$-$C_4$alkyl)amino, or morpholinyl;
$R_{12}$ and $R_{13}$ are independently H; Hal; CN; $COOR_2$; $C_1$-$C_8$alkyl; phenyl; phenyl substituted by phenyl, $C_1$-$C_8$alkyl, cyclohexyl, or $C_1$-$C_8$alkoxy; $C_2$-$C_8$alkyl interrupted by O; or $C_3$-$C_8$alkylthio interrupted by O; $C_1$-$C_8$alkyl substituted by CN or $COOR_2$; vinyl substituted by CN or $COOR_2$; or $R_{12}$ and $R_{13}$ together are $C_3$-$C_4$alkylene;
$R_{14}$ is $CF_3$; CN; $COOR_2$; $C_1$-$C_8$alkyl; $C_1$-$C_8$alkoxy; $C_1$-$C_8$alkylthio; pyrrolidinyl; di($C_1$-$C_4$alkyl)amino; morpholinyl; phenyl; phenyl substituted by phenyl or $C_1$-$C_8$alkyl; $C_2$-$C_8$alkyl interrupted by O; $C_1$-$C_8$alkyl substituted by CN, $COOR_2$, phenyl, or $CF_3$; vinyl substituted by CN, $COOR_2$, phenyl, or $CF_3$ or $C_1$-$C_8$alkylthio substituted by CN, $COOR_2$, phenyl, or $CF_3$;
$R_{15}$ is $CF_3$; $OCF_3$; CN; $COOR_2$; $C_1$-$C_8$alkyl; $C_1$-$C_8$alkoxy; $C_1$-$C_8$alkylthio; $C_1$-$C_8$alkyl-$SO_2$; pyrrolidinyl; di($C_1$-$C_4$alkyl)amino; morpholinyl; phenyl; phenyl substituted by phenyl or $C_1$-$C_8$alkyl; $C_2$-$C_8$alkyl interrupted by O; $C_1$-$C_8$alkyl substituted by CN, $COOR_2$, phenyl, or $CF_3$; vinyl substituted by CN, $COOR_2$, phenyl, or $CF_3$; $C_1$-$C_8$alkylthio substituted by CN, $COOR_2$, phenyl, or $CF_3$; or $C_1$-$C_8$alkyl-$SO_2$ substituted by CN, $COOR_2$, phenyl, or $CF_3$;
$R_{16}$ and $R_{17}$ are independently H, halogen, or nitro;
either $R_{18}$ is H or $C_1$-$C_8$alkylamino; and
$R_{19}$ is $C_1$-$C_8$alkyl;
or the alkyl groups of $R_{18}$ and $R_{19}$ form a common bridging group $C_1$-$C_3$alkylene; and
$R_{20}$ is H or $C_1$-$C_8$alkyl.

7. The composition of claim 1, further comprising a liquid crystal material, wherein the dyes are dissolved.

8. The composition of claim 1, wherein a ratio of total weight parts of the dye of formula (A) to the dye of formula (B) is from 0.1:20 to 5:1.

9. The composition of claim 7, comprising:
from 1 to 20 parts by weight in total of the dye of formula (B),
from 0.1 to 5 parts by weight in total of the dye of formula (A),
based on from 50 to 2000 parts by weight in total of liquid crystal material.

10. A liquid crystal display comprising the composition of claim 1.

11. The liquid crystal display of claim 10 comprising the composition in a polarizing film.

12. A compound of formula B10:

wherein
q is 0 or 1;
$Ar_1$ is phenyl substituted by Xb, or a heterocyclic residue of one of the formulae:

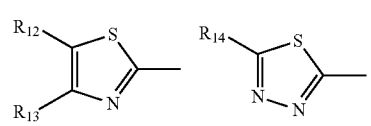

-continued

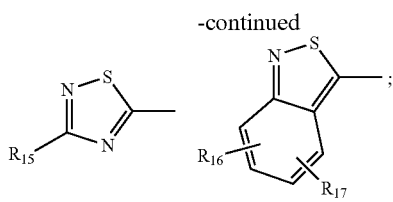

Ar$_2$ and Ar$_3$ are independently 1,4-phenylene, 1,4-phenylene substituted by C$_1$-C$_4$alkyl, or 1,4-naphthylene;

Xb is Hal, COOR$_2$, CN, phenyl, R$_8$-substituted phenyl, C$_3$-C$_{12}$cycloalkyl, C$_1$-C$_{12}$alkyl-cyclohexyl, or C$_1$-C$_{12}$alkoxy-cyclohexyl;
Hal is CF$_3$ or fluoro;
R$_2$ is C$_1$-C$_8$alkyl;
R$_8$ is C$_1$-C$_{12}$alkyl, C$_1$-C$_{12}$alkoxy, C$_3$-C$_{12}$cycloalkyl, phenyl, C$_1$-C$_{12}$alkyl-phenyl, C$_1$-C$_{12}$alkyl-cyclohexyl, or C$_1$-C$_{12}$alkoxy-cyclohexyl;
R$_{11}$ is pyrrolidinyl, piperidinyl, di(C$_1$-C$_4$alkyl)amino, or morpholinyl;
either R$_{12}$ and R$_{13}$ are independently H; Hal; CN; COOR$_2$; C$_1$-C$_{12}$alkyl; C$_1$-C$_{12}$alkoxy; C$_1$-C$_{12}$alkylthio; phenyl; phenyl substituted by phenyl, C$_1$-C$_8$ alkyl, cyclohexyl, C$_1$-C$_8$alkoxy, or C$_1$-C$_8$alkylthio; C$_2$-C$_{12}$alkyl interrupted by O; C$_3$-C$_{12}$alkoxy interrupted by O; C$_3$-C$_{12}$alkylthio interrupted by O; C$_1$-C$_8$alkyl substituted by CN, COOR$_2$, phenyl, fluoro, or CF$_3$; C$_2$-C$_3$alkenyl substituted by CN, COOR$_2$, phenyl, fluoro, or CF$_3$; C$_1$-C$_8$alkoxy substituted by CN, COOR$_2$, phenyl, fluoro, or CF$_3$; C$_1$-C$_8$alkylthio substituted by CN, COOR$_2$, phenyl, fluoro, or CF$_3$; or R$_{12}$ and R$_{13}$ together are C$_3$-C$_4$alkylene;
R$_{14}$ is H; CF$_3$; CN; COOR$_2$; C$_1$-C$_{12}$alkyl; C$_1$-C$_{12}$alkoxy; C$_1$-C$_{12}$alkylthio; pyrrolidinyl; piperidinyl; di(C$_1$-C$_4$alkyl)amino; morpholinyl; phenyl; phenyl substituted by phenyl, C$_1$-C$_8$alkyl, cyclohexyl, C$_1$-C$_8$alkoxy, or C$_1$-C$_8$alkylthio; C$_2$-C$_{12}$alkyl interrupted by O; C$_3$-C$_{12}$alkoxy interrupted by O; C$_3$-C$_{12}$alkylthio interrupted by O; C$_1$-C$_8$alkyl substituted by CN, COOR$_2$, phenyl, fluoro, or CF$_3$; C$_2$-C$_3$alkenyl substituted by CN, COOR$_2$, phenyl, fluoro, or CF$_3$; C$_1$-C$_8$alkoxy substituted by CN, COOR$_2$, phenyl, fluoro, or CF$_3$; or C$_1$-C$_8$alkylthio substituted by CN, COOR$_2$, phenyl, fluoro, or CF$_3$;
R$_{15}$ is H; CF$_3$; OCF$_3$; CN; COOR$_2$; C$_1$-C$_{12}$alkyl; C$_1$-C$_{12}$alkoxy; C$_1$-C$_{12}$alkylthio; C$_1$-C$_{12}$alkyl-SO$_2$; pyrrolidinyl; di(C$_1$-C$_4$alkyl)amino; morpholinyl; phenyl; phenyl substituted by phenyl, C$_1$-C$_8$alkyl, cyclohexyl, C$_1$-C$_8$alkoxy, C$_1$-C$_8$alkylthio, CN, CF$_3$, or OCF$_3$; C$_2$-C$_{12}$alkyl interrupted by O; C$_3$-C$_{12}$alkoxy C$_3$-C$_{12}$alkylthio interrupted by O; C$_1$-C$_8$alkyl substituted by CN, COOR$_2$, COR$_2$, phenyl, fluoro, or CF$_3$; C$_2$-C$_3$alkenyl substituted by CN, COOR$_2$, COR$_2$, phenyl, fluoro, or CF$_3$; C$_1$-C$_8$alkoxy substituted by CN, COOR$_2$, COR$_2$, phenyl, fluoro, or CF$_3$; C$_1$-C$_8$alkylthio substituted by CN, COOR$_2$, COR$_2$, phenyl, fluoro, or CF$_3$; or C$_1$-C$_8$alkyl-SO$_2$ substituted by CN, COOR$_2$, COR$_2$, phenyl, fluoro, or CF$_3$;

R$_{16}$ and R$_{17}$ are independently H, halogen, nitro, C$_1$-C$_{12}$alkyl, or C$_1$-C$_{12}$alkoxy,
with the proviso that a compound of formula:

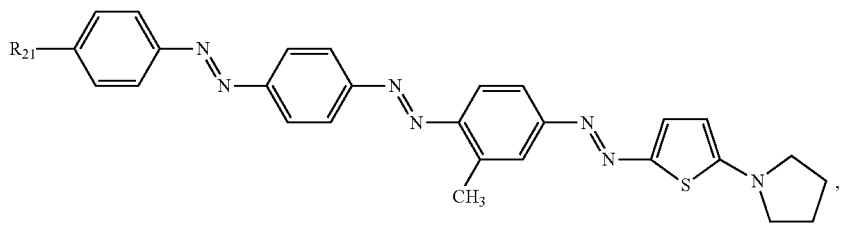

wherein R$_{21}$ is F, CF$_3$, or CN, is excluded.

13. The composition of claim 5, wherein the compound of formula B10 is of formula B11, B12, or B13:

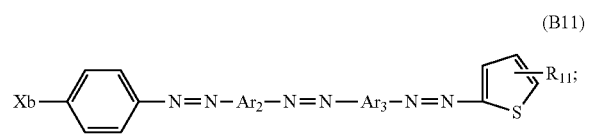

(B11)

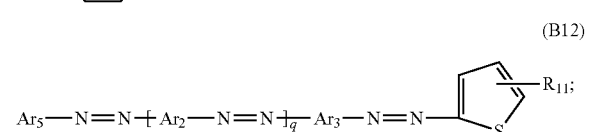

(B12)

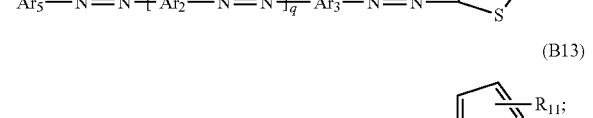

(B13)

wherein
q is 0 or 1;
Ar$_5$ is a heterocyclic residue of the formula:

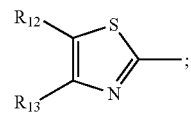

Ar$_6$ is a heterocyclic residue of one of the formulae:

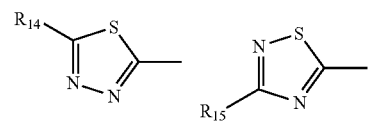

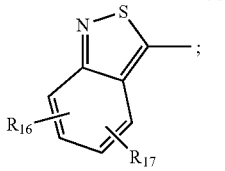

wherein
Xb is Hal, COOR$_2$, CN, phenyl, or R$_8$-substituted phenyl;
Hal is CF$_3$ or fluoro;
R$_2$ is C$_1$-C$_8$alkyl;
R$_8$ is C$_1$-C$_8$alkyl, cyclohexyl, phenyl, C$_1$-C$_8$alkyl-phenyl, or C$_1$-C$_8$alkyl-cyclohexyl;
R$_{11}$ is pyrrolidinyl, di(C$_1$-C$_4$alkyl)amino, or morpholinyl;
either R$_{12}$ and R$_{13}$ are independently H; Hal; CN; COOR$_2$; C$_1$-C$_8$alkyl; phenyl; phenyl substituted by phenyl, C$_1$-C$_8$alkyl, cyclohexyl, or C$_1$-C$_8$alkoxy; C$_2$-C$_8$alkyl interrupted by O; C$_3$-C$_8$alkylthio interrupted by O; C$_1$-C$_8$alkyl substituted by CN or COOR$_2$; or vinyl substituted by CN or COOR$_2$; or R$_{12}$ and R$_{13}$ together are C$_3$-C$_4$alkylene;
R$_{14}$ is CF$_3$; CN; COOR$_2$; C$_1$-C$_8$alkyl; C$_1$-C$_8$alkoxy; C$_1$-C$_8$alkylthio; pyrrolidinyl; di(C$_1$-C$_4$alkyl)amino; morpholinyl; phenyl; phenyl substituted by phenyl or C$_1$-C$_8$alkyl; C$_2$-C$_8$alkyl interrupted by O; C$_1$-C$_8$alkyl substituted by CN, COOR$_2$, phenyl, or CF$_3$; vinyl substituted by CN, COOR$_2$, phenyl, or CF$_3$; or C$_1$-C$_8$alkylthio substituted by CN, COOR$_2$, phenyl, or CF$_3$;
R$_{15}$ is CF$_3$; OCF$_3$; CN; COOR$_2$; C$_1$-C$_8$alkyl; C$_1$-C$_8$alkoxy; C$_1$-C$_8$alkylthio; C$_1$-C$_8$alkyl-SO$_2$; pyrrolidinyl; di(C$_1$-C$_4$alkyl)amino; morpholinyl; phenyl; phenyl substituted by phenyl or C$_1$-C$_8$alkyl; C$_2$-C$_8$alkyl interrupted by O; C$_1$-C$_8$alkyl substituted by CN, COOR$_2$, phenyl, or CF$_3$; vinyl substituted by CN, COOR$_2$, phenyl, or CF$_3$; C$_1$-C$_8$alkylthio substituted by CN, COOR$_2$, phenyl, or CF$_3$; or C$_1$-C$_8$alkyl-SO$_2$ substituted by CN, COOR$_2$, phenyl, or CF$_3$;
R$_{16}$ and R$_{17}$ are independently H, halogen, or nitro.

14. A process for the preparation of a polarizing film or a liquid crystal display, comprising:
dissolving the composition of claim 1 in liquid crystal material.

15. The composition of claim 1, wherein Ar$_4$ is of formula:

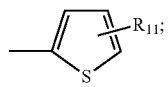

wherein R$_{11}$ is NR'R", with R' and R" independently selected from the group consisting of H, C$_1$-C$_4$alkyl, C$_3$-C$_{12}$cycloalkyl, phenyl, and substituted phenyl, or R' and R" are together a common bridging group C$_1$-C$_8$alkylene, C$_2$-C$_8$alkylene interrupted by O, S, NR'$_3$, or any combination thereof.

16. The composition of claim 1, wherein Hal is CF$_3$ or fluoro.

17. The composition of claim 15, wherein R$_{11}$ is pyrrolidinyl, piperidinyl, di(C$_1$-C$_4$alkyl)amino, or morpholinyl.

18. The composition of claim 1, wherein any substituent of alkyl moieties is selected from the group consisting of halogen, CF$_3$, CN, OH, C$_1$-C$_4$alkoxy, and phenyl; C$_1$-C$_8$dialkylamino; or a N-bonded aliphatic or aromatic heterocyclic ring containing from 2 to 5 carbon ring atoms and optionally one oxygen ring atom besides the bonding nitrogen atom.

* * * * *